(12) United States Patent
Ishikawa et al.

(10) Patent No.: US 8,125,116 B2
(45) Date of Patent: Feb. 28, 2012

(54) ALTERNATOR FOR VEHICLE AND ROTATING ELECTRICAL MACHINE

(75) Inventors: Toshio Ishikawa, Hitachinaka (JP); Minoru Yabuki, Naka-gun (JP); Yoshihisa Ishikawa, Hitachinaka (JP); Yuji Enomoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 189 days.

(21) Appl. No.: 12/141,639

(22) Filed: Jun. 18, 2008

(65) Prior Publication Data

US 2008/0315702 A1 Dec. 25, 2008

(30) Foreign Application Priority Data

Jun. 19, 2007 (JP) ................................. 2007-160848

(51) Int. Cl.
*H02K 1/06* (2006.01)
(52) U.S. Cl. ................................. 310/216.045; 310/257
(58) Field of Classification Search ........... 310/216.004, 310/216.045, 257, 263
See application file for complete search history.

(56) References Cited

U.S. PATENT DOCUMENTS

| 1,255,607 | A | * | 2/1918 | Hensley | 310/40 R |
|---|---|---|---|---|---|
| 2,557,249 | A | * | 6/1951 | Aske | 310/112 |
| 3,549,918 | A | * | 12/1970 | Van Hout et al. | 310/49.17 |
| 3,591,819 | A | * | 7/1971 | Laing | 310/216.065 |
| 3,921,017 | A | * | 11/1975 | Hallerback | 310/216.027 |
| 3,956,651 | A | * | 5/1976 | Brammerlo | 310/216.024 |
| 4,142,120 | A | * | 2/1979 | Hallerback | 310/59 |
| 4,207,483 | A | * | 6/1980 | Baer | 310/49.07 |
| 4,255,684 | A | * | 3/1981 | Mischler et al. | 310/216.031 |
| 4,381,747 | A | * | 5/1983 | Kobayashi et al. | 123/339.26 |
| 4,714,853 | A | * | 12/1987 | Palmero et al. | 310/257 |
| 5,177,384 | A | * | 1/1993 | Furuki | 310/49.16 |
| 5,208,503 | A | * | 5/1993 | Hisey | 310/216.054 |
| 5,270,605 | A | * | 12/1993 | Lefrancois et al. | 310/263 |
| 5,962,947 | A | * | 10/1999 | Suzuki et al. | 310/257 |
| 6,028,377 | A | * | 2/2000 | Sakamoto | 310/12.17 |

(Continued)

FOREIGN PATENT DOCUMENTS

JP 2-159949 A 6/1990

(Continued)

OTHER PUBLICATIONS

Japanese Office Action dated Mar. 2, 2010 (One (1) page).

*Primary Examiner* — Tran Nguyen
(74) *Attorney, Agent, or Firm* — Crowell & Moring LLP

(57) ABSTRACT

An alternator for vehicle includes a stator that outputs an AC voltage and a rotor that includes a field coil and a rotor core. The stator includes a plurality of phase stators that are disposed side-by-side along the rotational axis and individually output AC voltages. The phase stators include an even number of stator tabs alternately extending from one outer side of a phase stator coil toward another outer side of the phase stator coil and extending from the other outer side toward the one outer side along the rotational axis. The rotor includes a field coil and a rotor core at which an even number of rotor tabs are formed along the circumferential direction so as to alternately extend from one outer side of the field coil toward another outer side of the field coil along the rotational axis and extend from the other outer side toward the one outer side along the rotational axis. A phase stator core at each phase stator is formed by laminating a plurality of magnetic sheets.

16 Claims, 54 Drawing Sheets

U.S. PATENT DOCUMENTS

| | | | |
|---|---|---|---|
| 6,153,953 A * | 11/2000 | Isozaki et al. | 310/216.112 |
| 6,188,159 B1 * | 2/2001 | Fan | 310/216.037 |
| 6,259,176 B1 * | 7/2001 | Isozaki et al. | 310/49.32 |
| 6,479,911 B1 * | 11/2002 | Koike et al. | 310/49.24 |
| 6,744,156 B2 * | 6/2004 | Doi | 310/49.47 |
| 6,909,208 B2 * | 6/2005 | Suzuki et al. | 310/49.13 |
| 7,199,500 B2 * | 4/2007 | Yoshida | 310/257 |
| 7,638,919 B2 * | 12/2009 | Pulnikov | 310/257 |
| 7,649,298 B2 * | 1/2010 | Enomoto et al. | 310/257 |
| 7,701,109 B2 * | 4/2010 | Ishikawa et al. | 310/257 |
| 7,714,466 B2 * | 5/2010 | Kitamura et al. | 310/49.51 |
| 7,714,475 B2 * | 5/2010 | Enomoto et al. | 310/216.067 |
| 7,759,837 B2 * | 7/2010 | Ishikawa et al. | 310/257 |
| 2006/0055274 A1 * | 3/2006 | Kim | 310/216 |
| 2006/0208601 A1 | 9/2006 | Enomoto et al. | |
| 2007/0075605 A1 | 4/2007 | Enomoto et al. | |
| 2007/0145854 A1 | 6/2007 | Enomoto et al. | |
| 2007/0296285 A1 | 12/2007 | Enomoto et al. | |
| 2008/0315700 A1 * | 12/2008 | Ishikawa et al. | 310/156.66 |

FOREIGN PATENT DOCUMENTS

| | | |
|---|---|---|
| JP | 3-117357 U | 12/1991 |
| JP | 6-31377 U | 4/1994 |
| JP | 2000-184682 A | 6/2000 |
| JP | 2005-130685 A | 5/2005 |
| JP | 2005-151741 A | 6/2005 |
| JP | 2005-151785 A | 6/2005 |
| JP | 2007-124884 A | 5/2007 |
| JP | 2008-29141 A | 2/2008 |
| JP | 2008-29142 A | 2/2008 |
| WO | WO 2007/043161 A1 | 4/2007 |

* cited by examiner

FIG.13
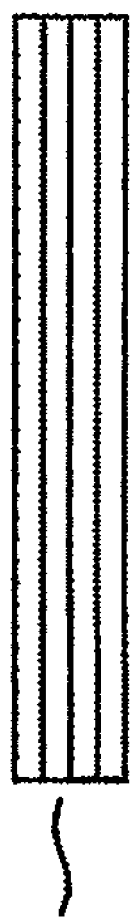
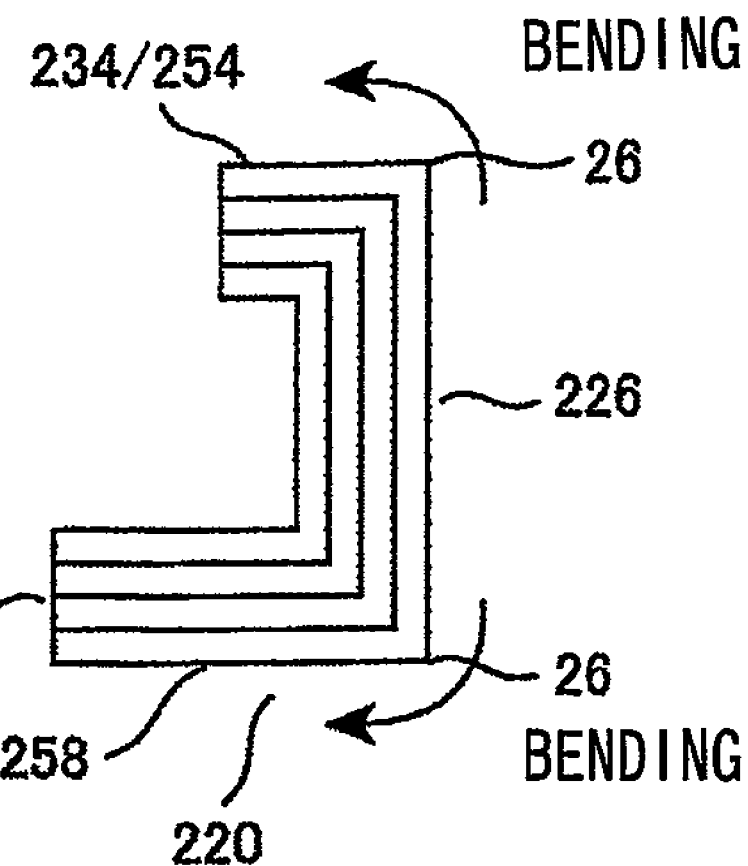

FIG.14
PROCESS 1
BENDING
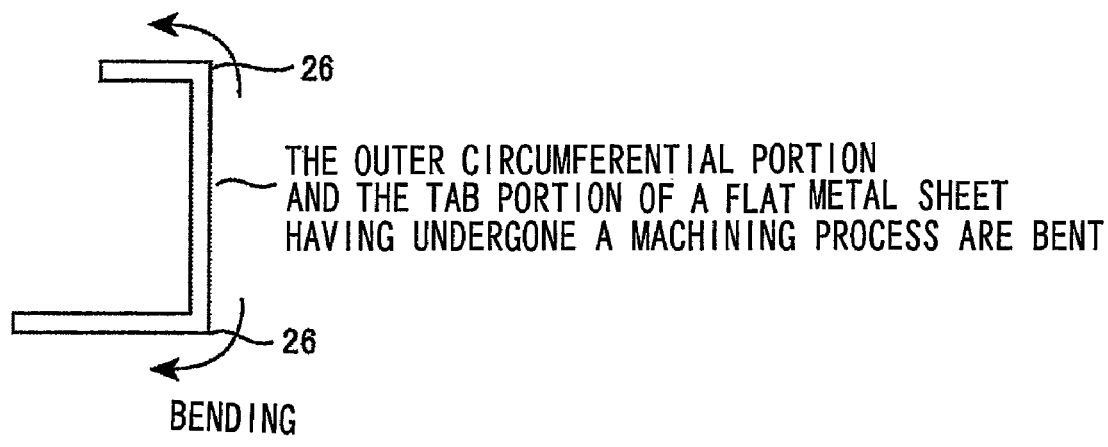
THE OUTER CIRCUMFERENTIAL PORTION AND THE TAB PORTION OF A FLAT METAL SHEET HAVING UNDERGONE A MACHINING PROCESS ARE BENT
BENDING
PROCESS 2　　PROCESS 3
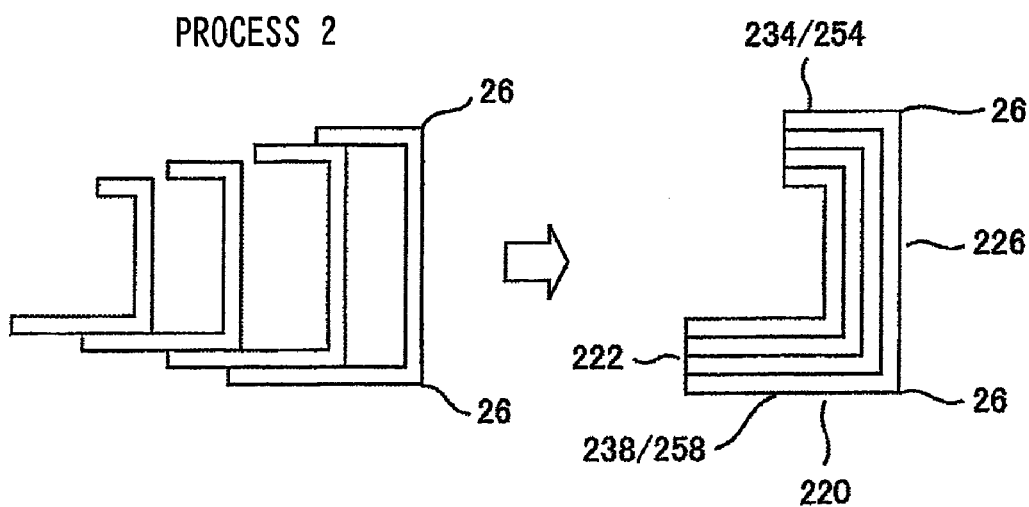

RELATIONSHIP BETWEEN
GAP BETWEEN PHASE AND PHASE
RATIO AND INDUCTION VOLTAGE

GAP BETWEEN PHASE AND
PHASE RATIO (G1/B1)

RELATIONSHIP BETWEEN
GAP BETWEEN PHASE AND PHASE
RATIO AND RIPPLE VOLTAGE

GAP BETWEEN PHASE AND
PHASE RATIO (G1/B1)

RELATIONSHIP BETWEEN ROTOR TAB
MAGNETIC POLE GAP RATIO AND INDUCTION VOLTAGE

RELATIONSHIP BETWEEN ROTOR TAB
MAGNETIC POLE GAP RATIO AND OUTPUT VOLTAGE

RELATIONSHIP BETWEEN NUMBER OF POLES AND INDUCTION VOLTAGE

RELATIONSHIP BETWEEN NUMBER OF POLES AND OUTPUT CURRENT

Sv > S

θv > θ

220

220

220

220

220

220

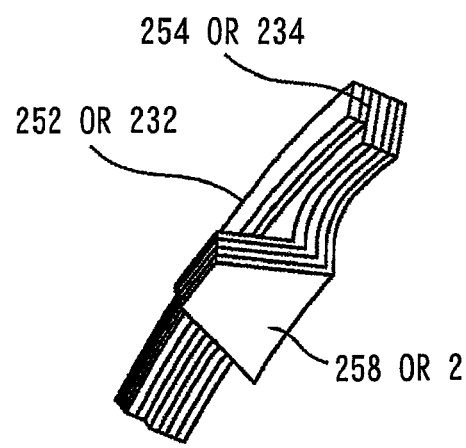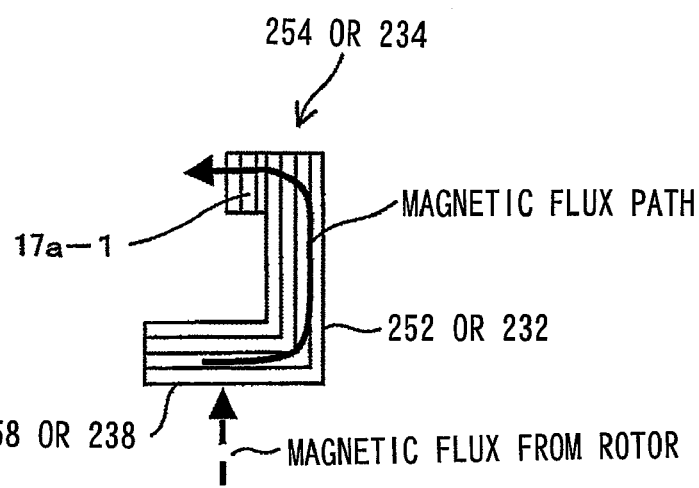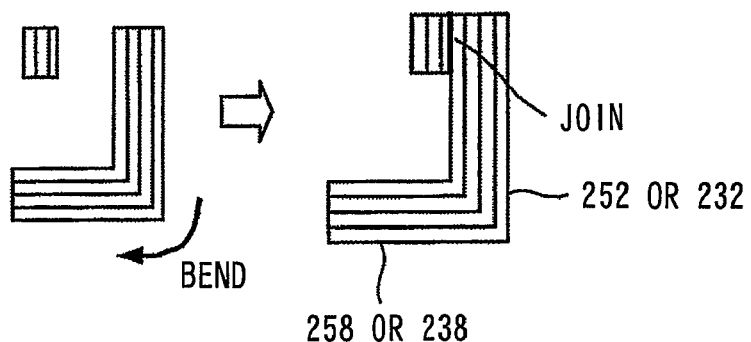

252 OR 232

BEND R AT BENT PORTION: R1
RADIUS OF STATOR COIL : R2
※R1≦R2

252 OR 232

BEND R AT BENT PORTION: R1
ANGLE R AT STATOR COIL : R2
※R1≦R2

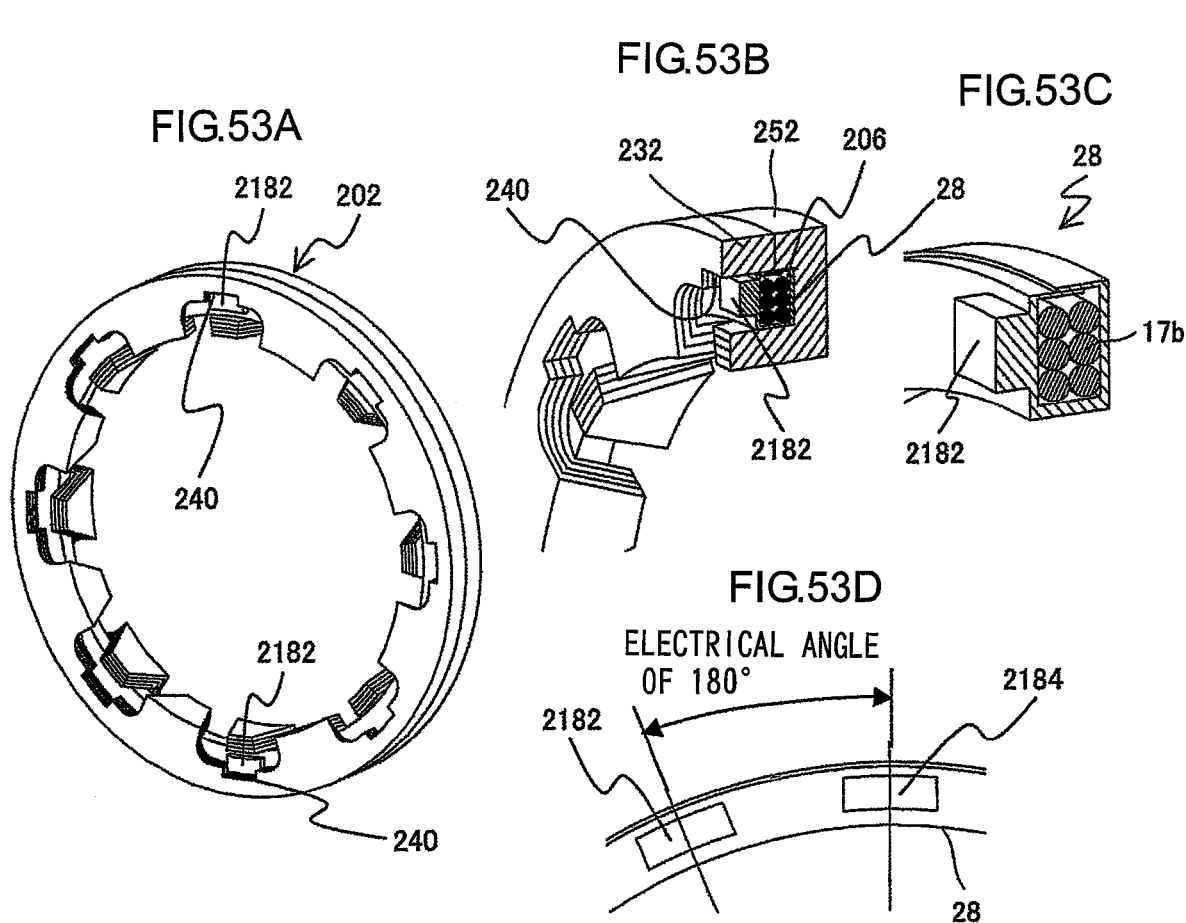

RELATIONSHIP OF WIDTH/PITCH RATIO TO
EDDY CURRENT LOSS AND INDUCTION VOLTAGE

RELATIONSHIP OF DEPTH/WIDTH RATIO TO
EDDY CURRENT LOSS AND INDUCTION VOLTAGE 202
258
258
238
DIRECTION OF ROTOR ROTATION
348

258
348
238
348
DIRECTION OF ROTOR ROTATION

238
θ1
θ2 BEVEL 348
BEVEL 348
Bi
Bo
Bd

ALTERNATOR FOR VEHICLE AND ROTATING ELECTRICAL MACHINE

CROSS-REFERENCE TO RELATED APPLICATION

The present application relates to subject matters described in a co-pending patent application Ser. No. 11/950,595 filed on Dec. 5, 2007 entitled "ROTATING ELECTRICAL MACHINE" and a co-pending patent application Ser. No. 12/026,658 filed on Feb. 6, 2008 entitled "INDUCTION MACHINE".

INCORPORATION BY REFERENCE

The disclosure of the following priority application is herein incorporated by reference:

Japanese Patent Application No. 2007-160848 filed Jun. 19, 2007

BACKGROUND OF THE INVENTION

1. Field of the Invention

The present invention relates to an alternator or a rotating electrical machine to be installed in an automobile.

2. Description of Related Art

An alternator for vehicle or a rotating electrical machine includes a stator and a rotatably supported rotor. The stator is constituted with a stator core with numerous slots formed therein over the entire periphery thereof along the circumferential direction and a stator coil disposed inside the numerous slots. While the stator coil needs to be inserted in the numerous slots formed at the stator core to achieve this structure, the stator coil cannot be inserted in the slots through a simple process, posing a significant obstacle to achieving better productivity. For this reason, an alternator or a rotating electrical machine assuming a structure that does not include any slots and has the stator coil disposed along the circumference of a rotational axis can be manufactured more easily.

Structures with the stator coil disposed on a plane perpendicular to the rotational axis, instead of winding the stator coil through slots formed at the stator core, are known in the related art. Japanese Laid Open Patent Publication No. 2005-151785 (patent reference literature 1) and Japanese Laid Open Patent Publication No. H2-159949 (patent reference literature 2) each discloses such a structure.

For instance, the synchronous generator disclosed in patent reference literature 1 includes a rotor constituted with three separate permanent magnets each corresponding to one of; a U-phase, a V-phase and a W-phase, and stators each paired up with one of the three permanent magnets in the U-phase, the V-phase and the W-phase. Since the power output of this synchronous generator fluctuates greatly under conditions in which the rotation rate changes significantly, its structure cannot be adopted in, for instance, alternators for vehicles.

Patent reference literature 2 discloses an alternator for vehicle that includes an annular stator coil. While an alternator for vehicle must assure high output, a technology for obtaining high output is not described in relation to the alternator for vehicle disclosed in the literature.

While a rotating electrical machine assuming a structure with a stator coil disposed along the circumference of the rotational axis is often utilized in an extremely small motor that does not impose rigorous requirements with respect to the output characteristics at present, such a rotating electrical machine is not adopted in applications requiring high output characteristics. In particular, the structure has not been adopted in the compact rotating electrical machines for vehicle required to assure high efficiency. In addition, it has not been adopted for practical use in alternators for vehicles with greatly variable rotation speeds, which are, nevertheless, required to provide high performance over the full range of rotation speeds, from low speed to high speed.

The present invention is to provide a rotating electrical machine or an alternator that assures outstanding output characteristics.

SUMMARY OF THE INVENTION

A rotating electrical machine or an alternator according to a first aspect of the present invention includes: a stator that outputs a U-phase voltage, a V-phase voltage and a W-phase voltage; a rotor rotatably mounted further inward relative to the stator, that comprises a field coil and a rotor core; and a field current control circuit that controls a field current flowing through the field coil, wherein: the stator comprises a U-phase stator that outputs the U-phase voltage, a V-phase stator that outputs the V-phase voltage and a W-phase stator that outputs the W-phase voltage, with the U-phase stator, the V-phase stator and the W-phase stator disposed along a rotational axis of the rotor; the U-phase stator, the V-phase stator and the W-phase stator each comprise a phase stator coil wound along a circumferential direction and a phase stator core that forms a magnetic circuit on two outer sides of the phase stator coil along the axial direction and also on an outer circumferential side of the phase stator coil and comprises an even number of stator tabs disposed along the circumferential direction so as to alternately extend from one outer side along the rotational axis toward another outer side and extend from the other outer side toward the one outer side along the rotational axis; the rotor core forms a magnetic circuit on an inner side along a radius of the rotor winding and also on two outer sides of the rotor winding along the rotational axis and comprises an even number of rotor tabs disposed along the circumferential direction so as to alternately extend from one outer side toward another outer side along the rotational axis and extend from the other outer side toward the one outer side along the rotational axis; the rotor tabs each comprise a surface facing opposite the stator tabs at the U-phase stator, the V-phase stator and the W-phase stator, disposed along the rotational axis; the phase stator cores at the U-phase stator, the V-phase stator and the W-phase stator are each formed by laminating a plurality of sheets constituted of a magnetic material; and a clearance is formed or a nonmagnetic material is disposed between the phase stator core of each of the U-phase stator, the V-phase stator and the W-phase stator and the phase stator core belonging to an adjacent phase stator.

A rotating electrical machine or an alternator according to a second aspect of the present invention includes: a stator that outputs three-phase alternating currents; a rotor rotatably mounted further inward relative to the stator, that comprises a field coil and a rotor core; and a field current control circuit that controls a field current flowing through the field coil, wherein: the stator comprises three phase stators, each of which outputs one of the three-phase alternating currents, disposed along a rotational axis of the rotor; the phase stators each comprise a phase stator coil wound along a circumferential direction and a phase stator core that comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion; the rotor core is constituted with one rotor core disposed on one outer side of the rotor winding along the rotational axis and another rotor core disposed on another outer side of the rotor winding along the rotational axis; the one rotor core comprises rotor tabs extending toward the other rotor core and the other rotor core comprises other rotor tabs extending toward the one rotor core; the rotor tabs at the one rotor core and the rotor tabs at the other rotor core are alternately disposed along the circumferential direction and a sum of a number of rotor tabs at the one rotor core and a number of rotor tabs at the other rotor core matches a number of stator tabs at each of the phase stator cores; the rotor tabs each comprise a surface facing opposite the stator tabs at the three phase stators disposed along the rotational axis; the phase stator core at each of the phase stators is formed by laminating one on top of another a plurality of sheets constituted of a magnetic material; and a clearance is formed or a nonmagnetic member is disposed between the phase stator core of each of the phase stators and the phase stator core belonging to an adjacent phase stator.

A rotating electrical machine or an alternator includes: a stator that outputs three-phase alternating currents; a rotor rotatably mounted further inward relative to the stator, that comprises a field coil and a rotor core; and a field current control circuit that controls a field current flowing through the field coil, wherein: the stator comprises three phase stators, each of which outputs one of the three-phase alternating currents, disposed along a rotational axis of the rotor; the phase stators each comprise a phase stator coil wound along a circumferential direction and a phase stator core that comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion; a stator recess is formed between adjacent stator tabs set next to each other at the one phase stator core side portion and the other phase stator core side portion, a stator tab extending from the other phase stator core side portion is set at a position at which the stator recess is formed at the one phase stator core side portion along the circumferential direction and a stator tab extending from the one phase stator core side portion is set at a position at which the stator recess is formed at the other phase stator core side portion along the circumferential direction; the rotor core comprises one rotor core disposed on one outer side of the rotor winding along the rotational axis and another rotor core disposed on another outer side of the rotor winding along the rotational axis; the one rotor core comprises rotor tabs extending toward the other rotor core and the other rotor core comprises other rotor tabs extending toward the one rotor core; the rotor tabs at the one rotor core and the rotor tabs at the other rotor core are alternately disposed along the circumferential direction and a sum of a number of rotor tabs at the one rotor core and a number of rotor tabs at the other rotor core matches a number of stator tabs at each of the phase stator core; one recess is formed between rotor tabs formed next to each other at the one rotor core, another recess is formed between other rotor tabs formed next to each other at the other rotor core, the other rotor tabs are each set at a position at which the one recess at the one rotor core is formed along the circumferential direction and the rotor tabs at the one rotor core are each set at a position at which the other recess is formed along the circumferential direction; the rotor tabs each comprise a surface facing opposite the stator tabs at the three phase stators disposed along the rotational axis; and the phase stator core at each of the phase stators is formed by laminating a plurality of sheets constituted of a magnetic material.

Other features characterizing the present invention will be described in reference to embodiments.

The present invention provides a rotating electrical machine or an Alternator assuring outstanding characteristics.

BRIEF DESCRIPTION OF THE DRAWINGS

FIG. 13 illustrates a stator core manufacturing method;

FIG. 14 illustrates a stator core manufacturing method;

FIGS. 42A to 42C illustrate a stator core base member that may be used in a twenty-third embodiment;

FIGS. 53A to 53D show a stator achieved in a thirty-second embodiment;

DESCRIPTION OF PREFERRED EMBODIMENTS

Figure 1:
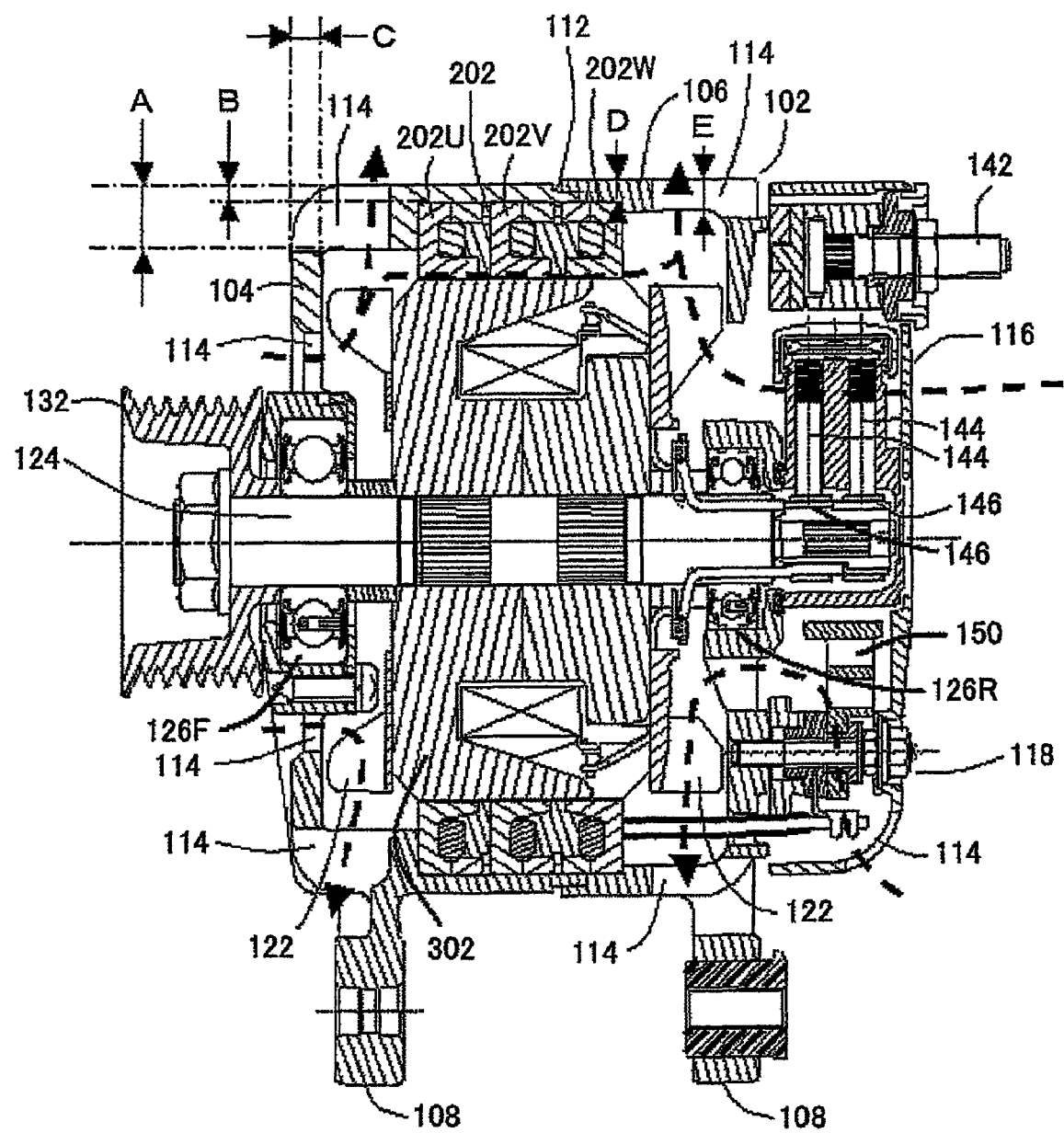
FIG. 1 is a sectional view taken through a side surface of an alternator for vehicle.

The embodiments described below can achieve additional advantages by addressing several issues in addition to the issues discussed earlier. Accordingly, before describing the embodiments, the issues addressed in the embodiments and the resulting advantages are explained.

(Improvement in the Electrical Characteristics)

In the embodiments of the Alternator to be described below, the stator includes a U-phase stator, a V-phase stator and a W-phase stator disposed along the rotational axis, with the phase stators each constituted with a stator coil and stator tabs set over predetermined intervals over the entire circumference of the stator coil along the circumferential direction on the side toward the rotor. The rotor is constituted with a field coil wound around the rotational axis and rotor tabs disposed on the outer circumferential side of the field coil. The rotor tabs range in alternate directions along the rotational axis and a magnetic flux generated through the field coil magnetizes the rotor tabs so that the alternate rotor tabs achieve opposite polarities. The rotor tabs each face opposite the U-phase stator, the V-phase stator and the W-phase stator, disposed along the rotational axis. The single field coil generates magnetic fluxes to interlink with the coils at all the phase stators arrayed along the rotational axis.

In the structure described above, the single field coil is commonly utilized in conjunction with the U-phase stator, the V-phase stator and the W-phase stator. The field coil utilized commonly in conjunction with all the phase stators is allowed to assume a greater number of turns compared to the number of turns that can be assumed at individual field coils that may be provided exclusively in conjunction with one of the phase stators. The common field coil provided in conjunction with all the phase stators may assume a greater sectional area, which, in turn, allows a large electrical current to be supplied.

In any case, the structure achieved in such an embodiment assures a strong magnetic flux. As a result, an improvement in the power generation characteristics is achieved over a low rotation speed range. In addition, the structure embodying the present invention is advantageous in that it only requires a relatively small field coil installation space.

If the U-phase stator, the V-phase stator and the W-phase stator are disposed with ample intervals between them along the rotational axis, the rotor tabs will need to range over a greater length and in such a case, the operation at a high rotation rate is bound to be significantly affected by the centrifugal force. If, on the other hand, the U-phase stator, the V-phase stator and the W-phase stator are disposed close to one another, a greater extent of leakage flux will occur at the magnetic circuit in the phase stator located at the middle position. This will result in a reduction in the quantity of the interlink magnetic flux, leading to a failure to achieve balanced outputs from the U-phase stator, the V-phase stator and the W-phase stator in the alternator. There is also a concern that an imbalance in the mechanical braking torque may occur. In the case of an on-vehicle alternator in particular, a reduction in the output from the phase stator disposed at the middle position may compromise the power generation characteristics at low rotation speed.

The extent to which the output is reduced or the extent of the imbalance is minimized by adopting the following measures in the embodiments.

(1) The magnetic flux at the phase stator disposed at the middle position among the phase stators disposed along the axial direction is intensified with a permanent magnet, so as to prevent an electrical or mechanical imbalance among the U-phase, the V-phase and the W-phase.

(2) The magnetic reluctance in the magnetic circuit of the phase stator assuming the middle position, among the phase stators disposed along the axial direction is reduced from both sides so as to prevent an electrical or mechanical imbalance among the U-phase, the V-phase and the W-phase.

In addition, layered steel sheets instead of iron powder are utilized to constitute the stator core in the embodiments described below, so as to improve the output characteristics by assuring better magnetic characteristics. In addition to assuring better electrical characteristics compared to those achieved in an alternator adopting a core structure constituted with compressed iron powder, an improvement in mechanical reliability is achieved in the alternator with the laminated core. Such an alternator can also be produced with better productivity. Namely, an alternator manufactured by molding compressed iron powder is bound to be larger and since there is a limit to the density of iron within the core, the magnetic characteristics are negatively affected. For this reason, the power generation characteristics of the alternator manufactured by using iron powder will be notably compromised during low speed rotation. Such deterioration in the characteristics can be minimized through the embodiments to be described below.

The phase stators each include stator tabs ranging along the rotational axis, and the base of each stator tab gradually widens along the circumferential direction to connect to the outer circumference of the phase stator. In addition, the area between the base of a given tab and the base of the next tab is notched to a greater extent along the radial direction and thus, this area assumes a recessed shape along the radial direction. Such a shape helps reduce the extent of leakage flux and also reduces the magnetic reluctance in the magnetic circuit.

(Improvement in Productivity)

While the advantages related to the improvement in the electrical characteristics have been explained above, the present invention can also achieve an advantage from a different viewpoint, i.e., an improvement in the productivity. Since the stator core in the embodiments described below, formed as a laminated core, can be manufactured without utilizing a device for compressing iron powder with great force, better productivity is assured.

In addition, stator cores with identical shapes can be used as the stator cores at the phase stators assuming different phases, i.e., the U-phase, the V-phase and the W-phase. In other words, since the laminated cores can be formed in a single shape, an improvement in productivity is achieved.

(Efficient Material Utilization)

In some of the embodiments described below, a phase stator core is formed by connecting along the circumferential direction split cores separated from one another along the circumferential direction instead of using an integrated phase stator core that is continuous along the circumferential direction. Since core pieces separated along the circumferential direction are used as stator material, the core pieces can be formed from steel sheets with minimal waste. When a stator material that is continuous along the circumferential direction is formed by using steel sheets, the material will need to be discarded over areas where holes at which the rotor is to be mounted, a reformed and thus, material wastage is bound to be significant. By connecting along the circumferential direction the split core pieces separated from one another along the circumferential direction to form a stator core, the maximum yield of the core piece material from the steel sheets is assured without having to discard any portions of the material over the area where the rotor is to be mounted. As a result, waste of material is minimized.

In addition, as no magnetic circuit is formed between tabs disposed adjacent to one another along the circumferential direction on one side of the stator coil at the core of a phase stator, i.e., since the magnetic circuit is formed between a tab on one side of the stator coil and another tab disposed on the other side of the stator coil, which is adjacent to the tab on the one side, and no magnetic circuit is formed between adjacent tabs disposed on the same side, the stator core can be achieved by forming the tabs on one side or on the other side in separate groups and integrating the separate tab groups on the one side or the other side through welding or the like, without degrading the magnetic characteristics. Thus, by constituting the stator core with split pieces formed as described above, the steel sheet material can be utilized with maximum efficiency and minimum wastage without degrading the magnetic characteristics.

Other advantages will be explained in reference to specific examples in the description of the embodiments provided below.

First Embodiment

Figure 2:
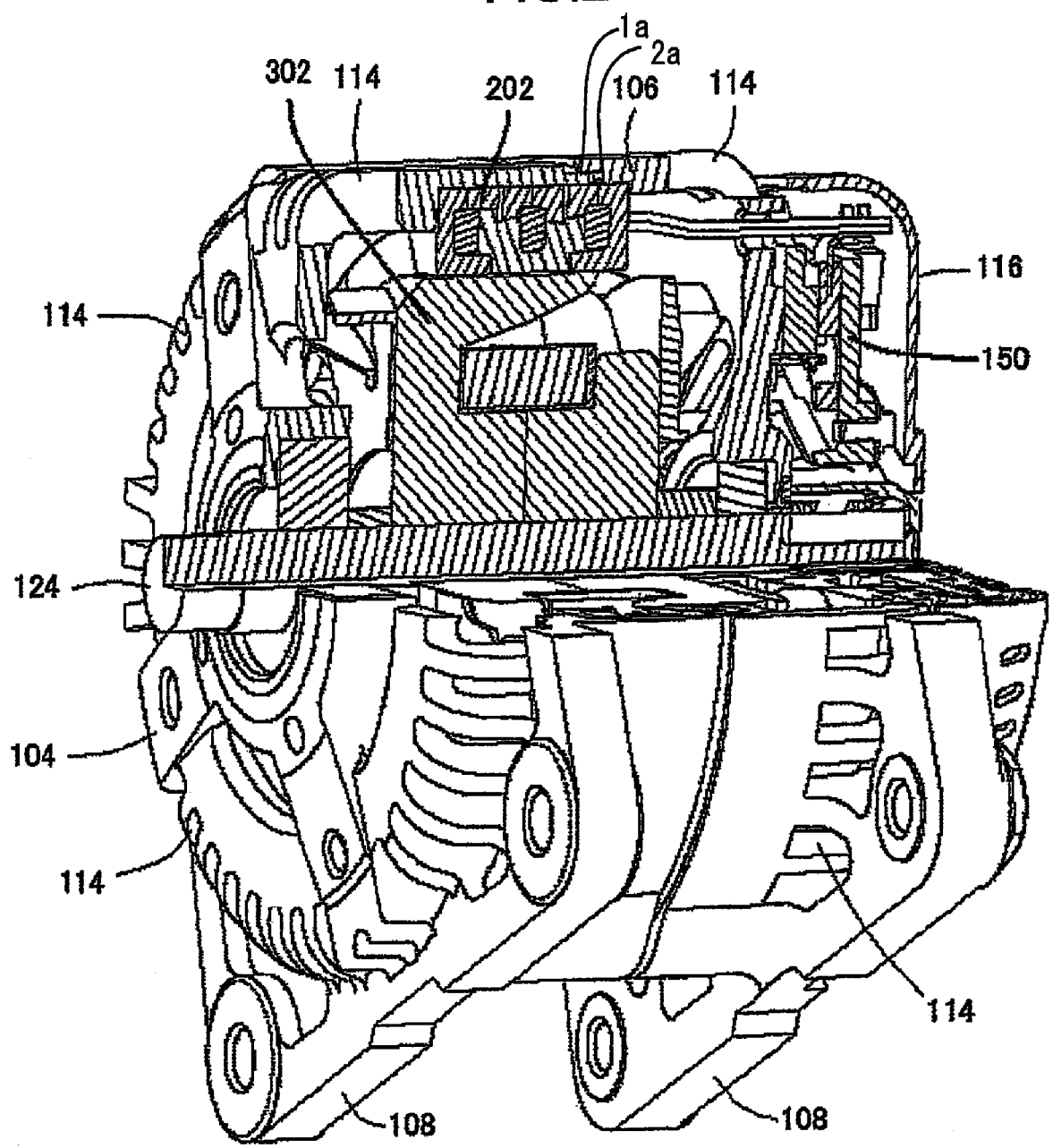
FIG. 2 is a perspective with part of the alternator for vehicle shown in a sectional view.
Figure 3:
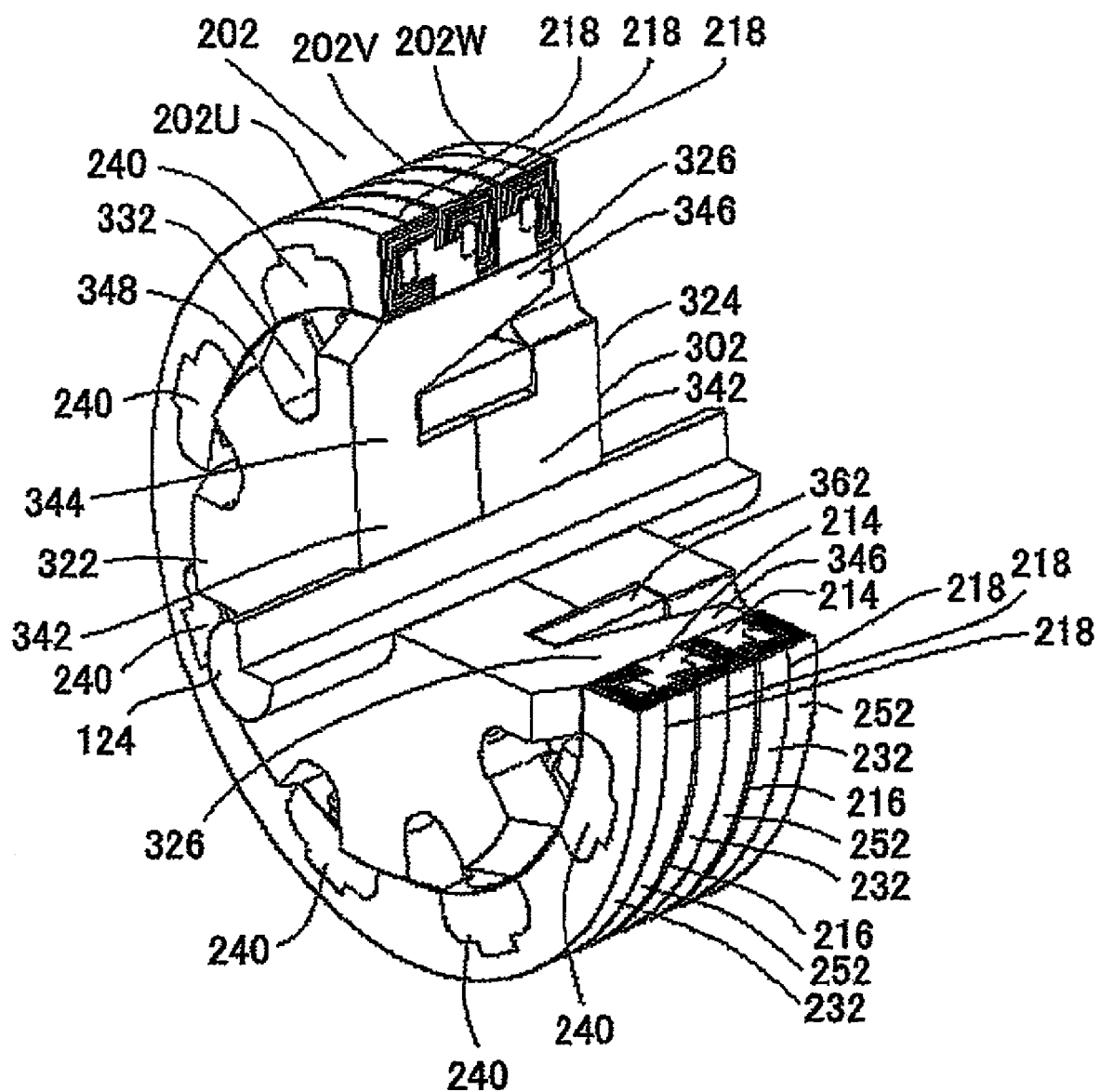
FIG. 3 is a perspective showing part of a rotor and a stator in a sectional view.
Figure 4:
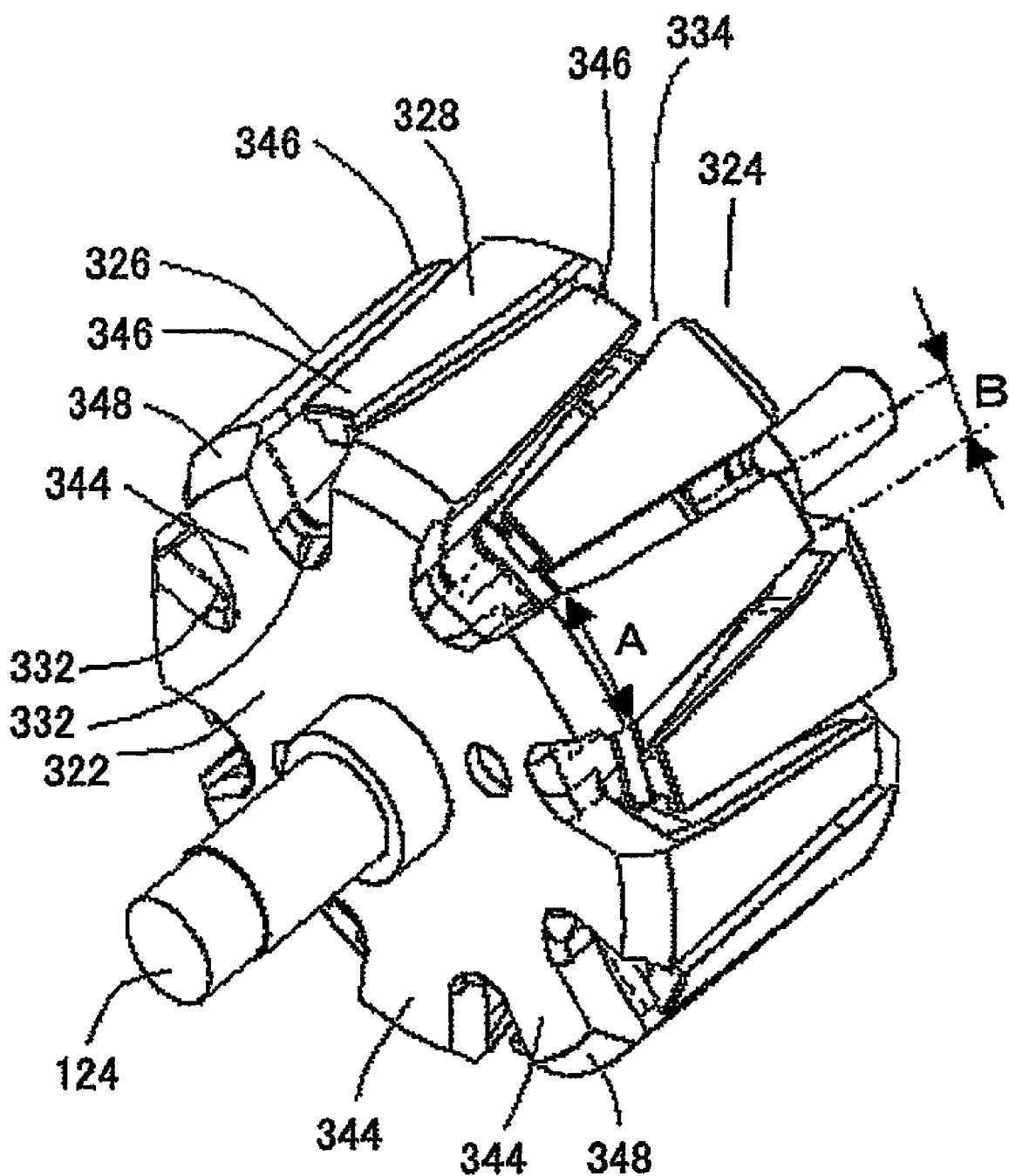
FIG. 4 is a perspective of the rotor.
Figure 5:
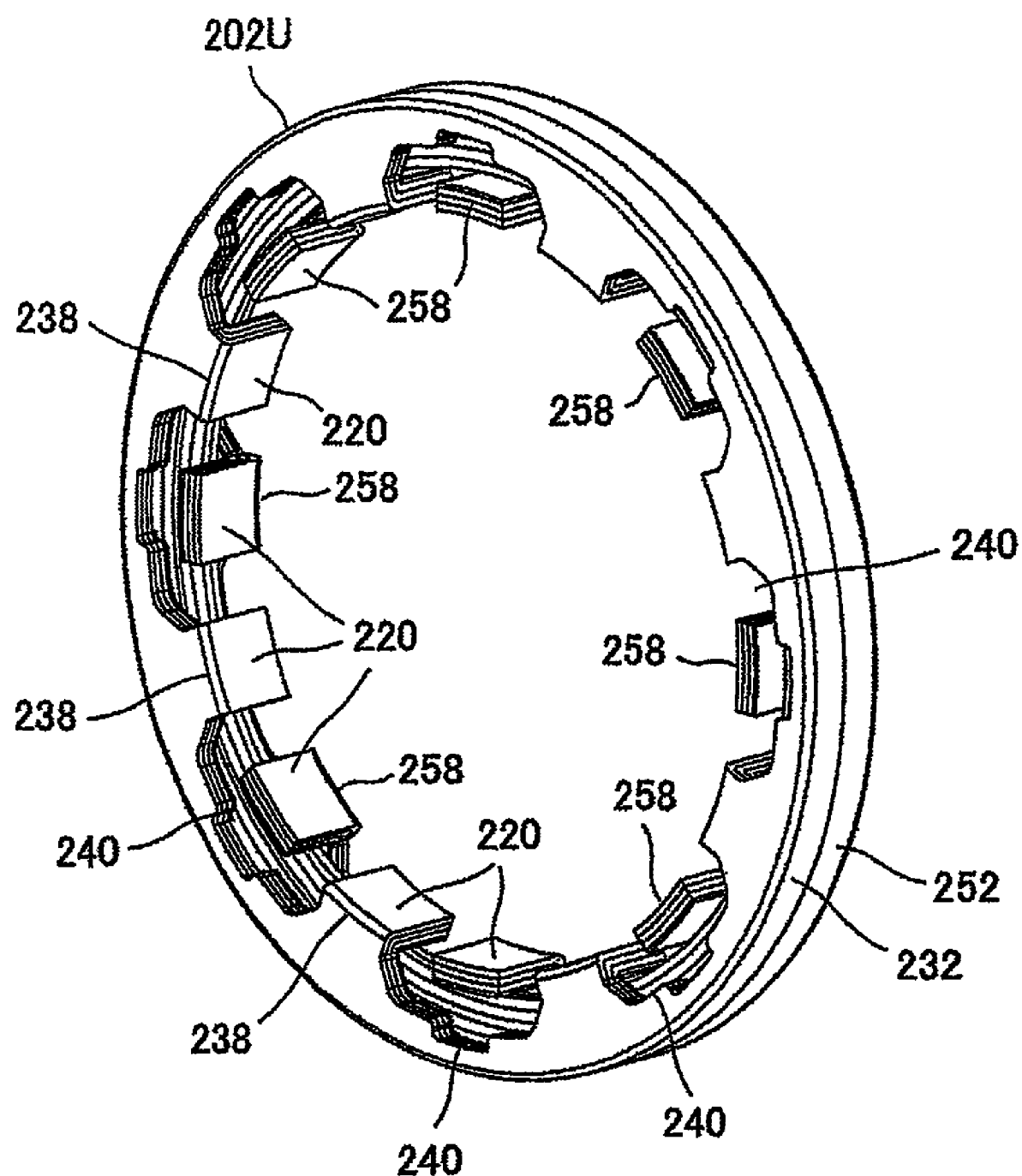
FIG. 5 illustrates a stator corresponding to a single phase.
Figure 6:
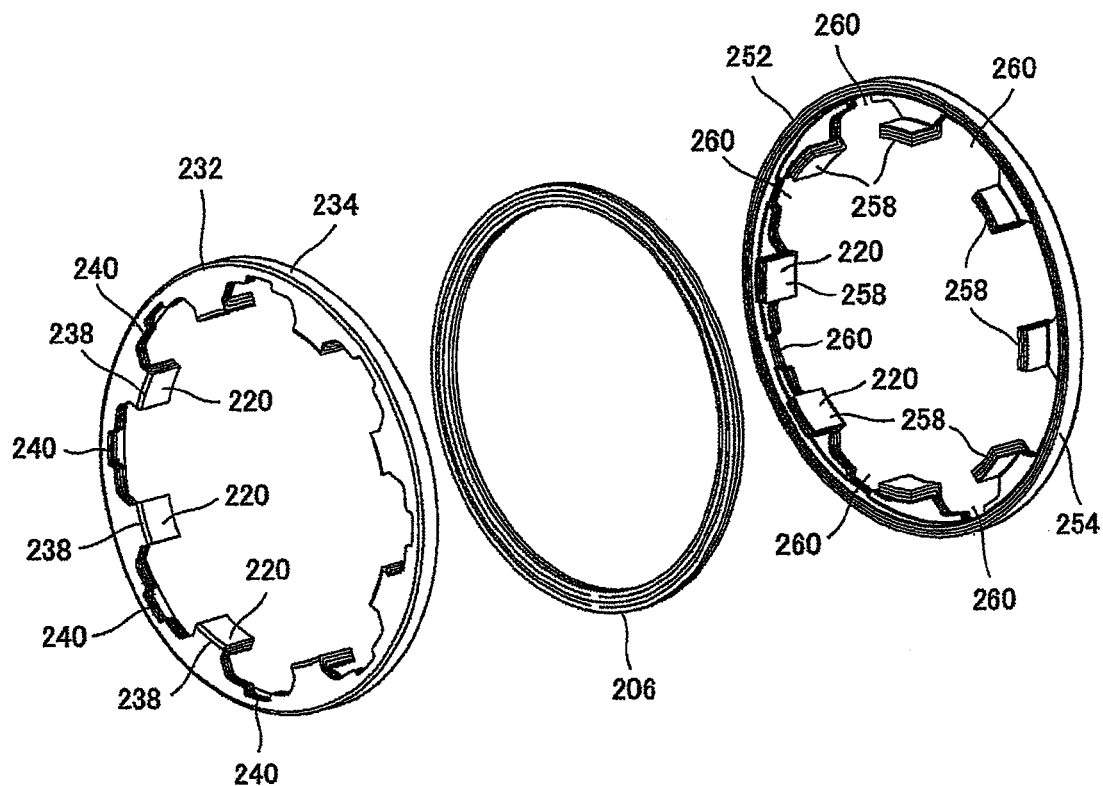
FIG. 6 illustrates a stator corresponding to a single phase.
Figure 7:
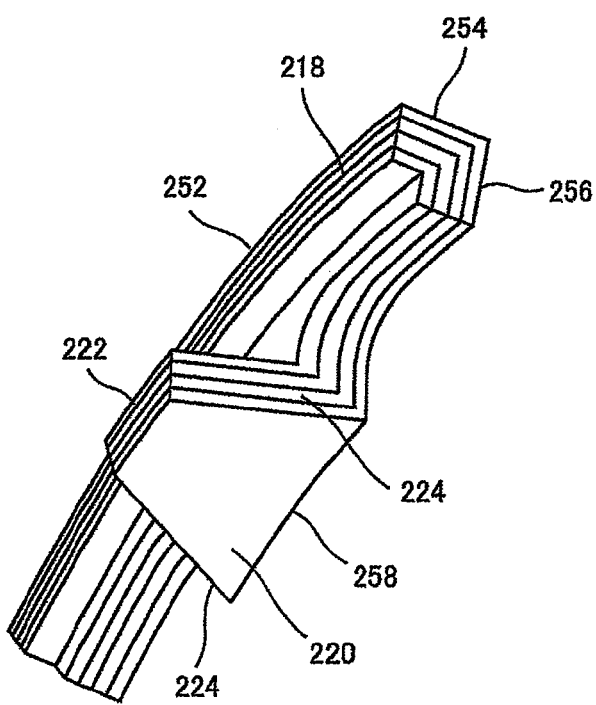
FIG. 7 illustrates a stator corresponding to a single phase.

In reference to FIGS. 1 through 16, the first embodiment of the present invention is explained. FIG. 1 is a sectional view of an alternator for vehicle taken through a side surface thereof. FIG. 2 is a partial perspective showing the alternator for vehicle in a sectional view. FIG. 3 is a perspective showing the rotor and the stator in a sectional view in part. FIG. 4 is a perspective of the rotor. FIG. 5 is a partial perspective of a stator corresponding to a single phase, and FIG. 6 is a perspective showing the individual components constituting the phase stator in FIG. 5. FIG. 7 is a cutaway perspective of an area of a stator core base member used to form the stator core, which is to constitute one of the stator tab magnetic poles.

Figure 8A:
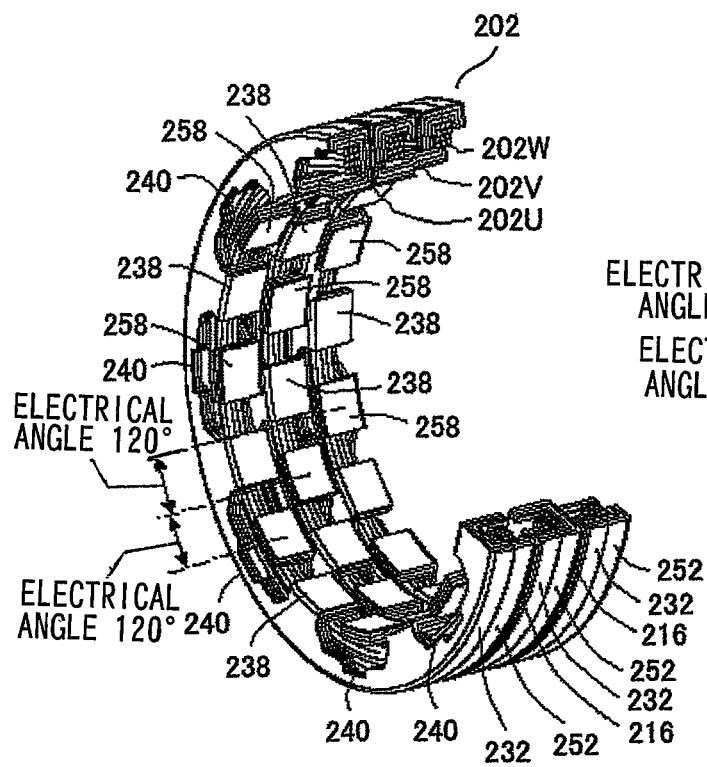
FIGS. 8A and 8B illustrate the stator achieved by integrating the stators corresponding to the three phases.
Figure 8B:
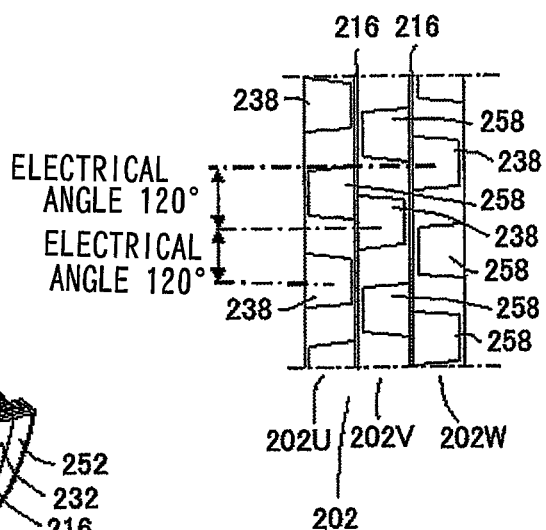
Figure 9:
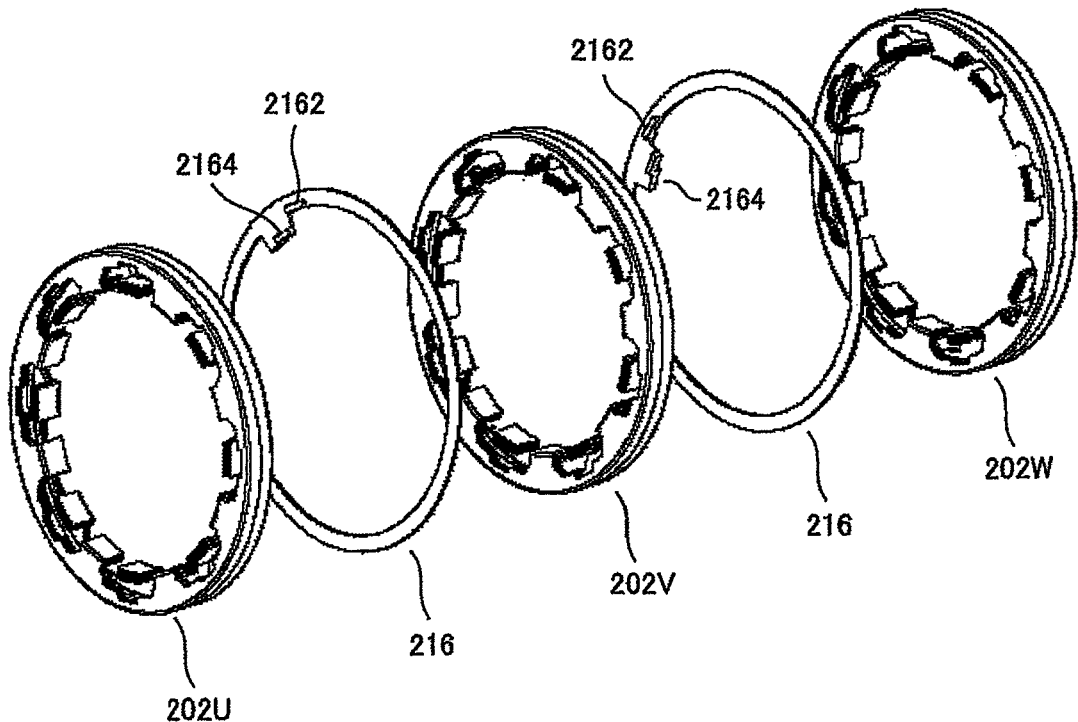
FIG. 9 is a perspective showing the stators corresponding to the individual phases.
Figure 10:
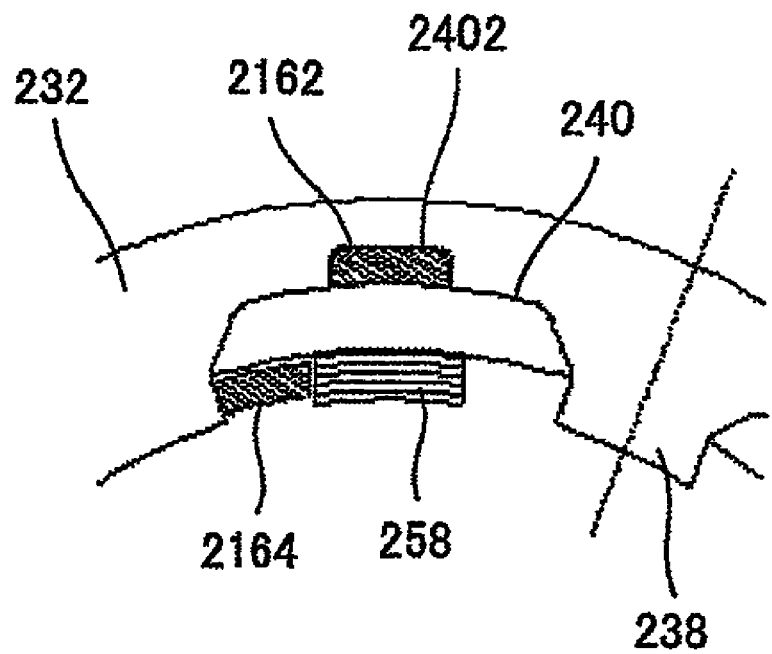
FIG. 10 illustrates a link plate positioning structure.
Figure 11:
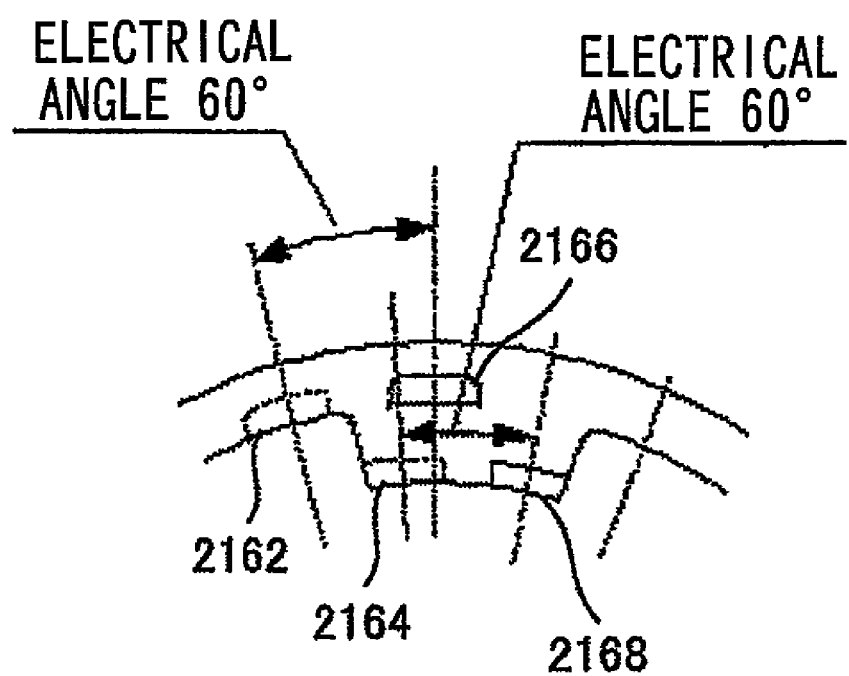
FIG. 11 illustrates the link plate positioning structure.
Figure 12:
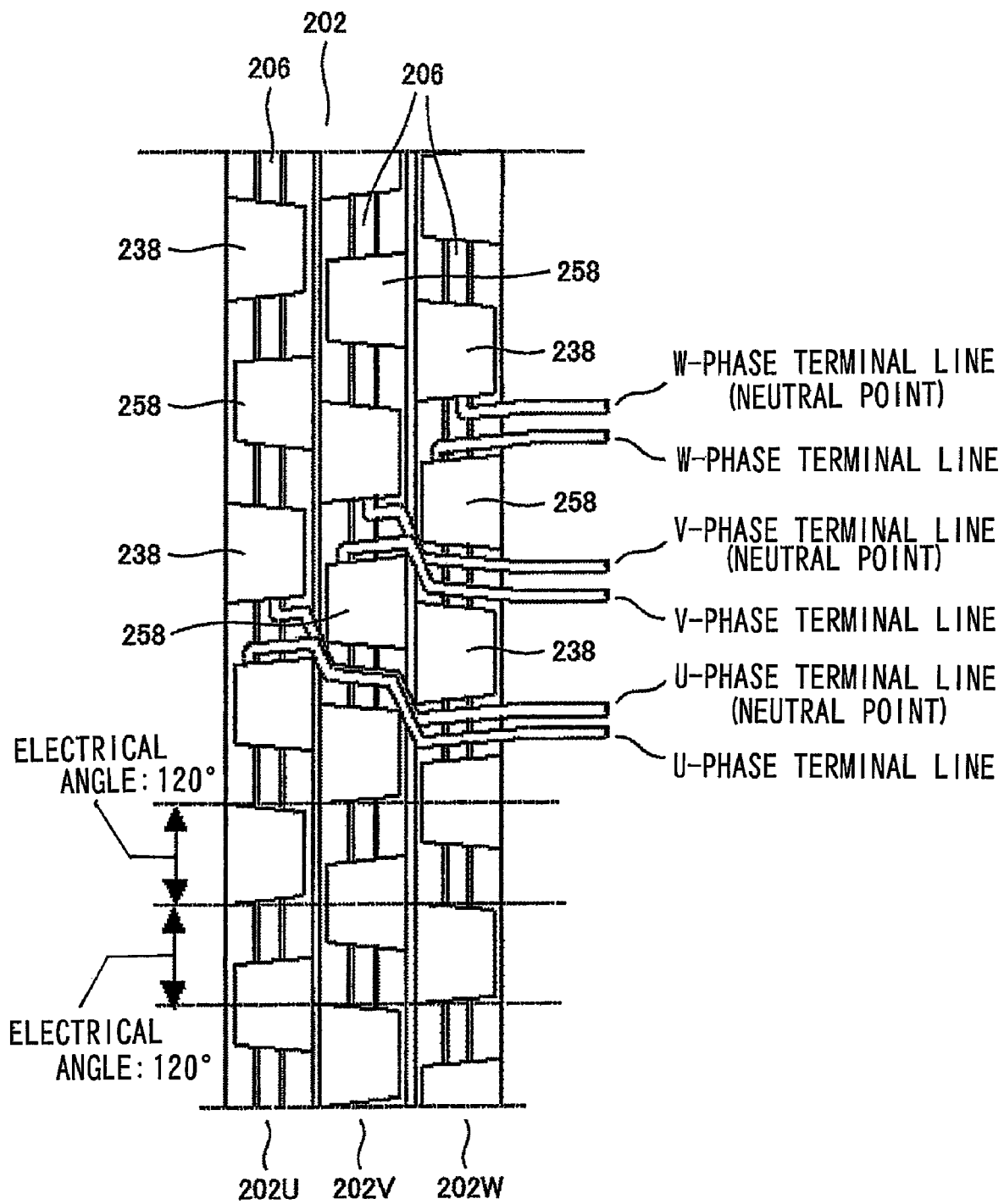
FIG. 12 shows how terminals of the stator coils may be laid out.
Figure 15A:
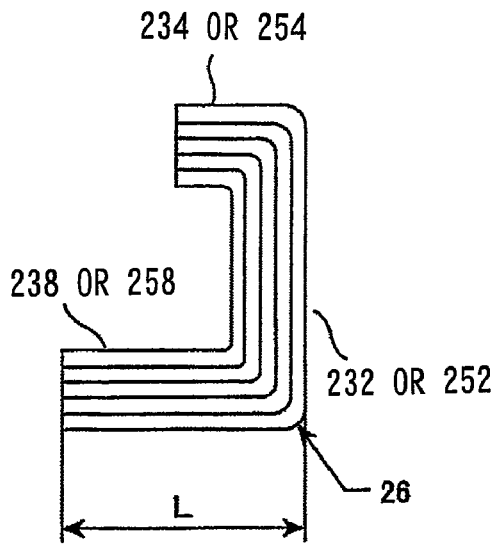
FIGS. 15A and 15B show the relationship between the output current and the bend R ratio.
Figure 15B:
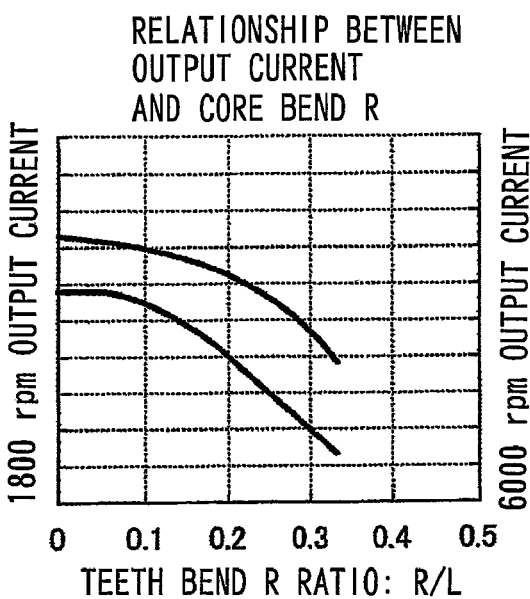
Figure 16:
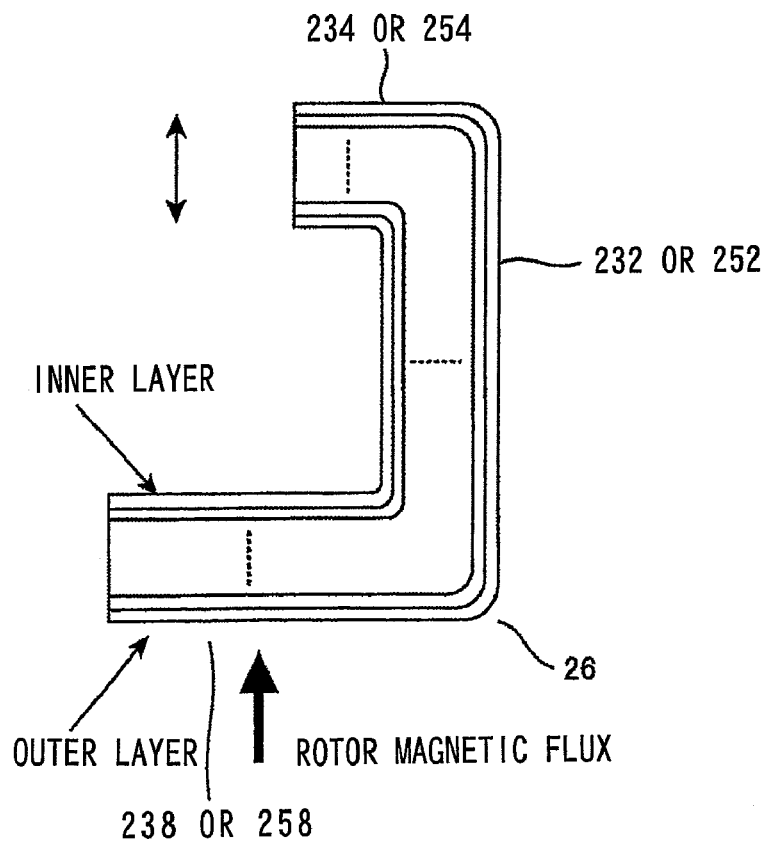
FIG. 16 indicates a specific number of steel sheets layered one on top of another in a sectional view taken through a side surface of the member used to constitute a stator core.

FIG. 8(a) is a partial perspective of a stator in a sectional view. FIG. 8(b) is a view of the stator taken from the inner circumferential side. FIG. 9 is a perspective of the stator constituted with phase stators. FIG. 10 shows in an enlargement the area over which a stator core is positioned along the circumferential direction. FIG. 11 shows in an enlargement the area over which the link plate is positioned along the circumferential direction. FIG. 12 shows how terminals of the stator coil 206 are laid out. FIG. 13 illustrates a first method that may be adopted when manufacturing stator cores and a second method that may be adopted when manufacturing stator cores. FIG. 14 illustrates another method that may be adopted when manufacturing stator cores. FIG. 15(a) is a sectional view of the stator core base member taken through a side surface thereof to facilitate an explanation of the bend R ratio at a bent portion. FIG. 15(b) presents a graph of the relationship between the output current and the bend R ratio. FIG. 16 is a sectional view of the stator core base member taken over a side surface, illustrating a specific number of layers over which the steel sheets are stacked.

The alternator for vehicle shown in FIGS. 1 and 2 includes a housing 102, a stator 202 disposed inside the housing 102 and a rotor 302 disposed inward relative to the stator 202. The housing 102 includes a front bracket 104 and a rear bracket 106, and the front bracket 104 and the rear bracket 106 each includes a locking portion 108 with which the alternator for vehicle is locked onto the vehicle. The alternator is thus locked onto an engine mechanism of the vehicle via the locking portions 108.

The front bracket 104 and the rear bracket 106 respectively include bearings 126F and 126R, which rotatably support a shaft 124. The rotor 302 is fixed to the shaft 124 and a pulley 132 is fixed with a nut to an end of the shaft 124. The rotation of the engine is communicated via a belt to the pulley 132 and thus, the shaft 124 is caused to rotate at a rate in proportion to the rotation speed at the engine. As the shaft 124 rotates, the quantity or the direction of the interlink magnetic flux created by the magnetic flux generated at the rotor 302 and a stator coil 206 in the stator 202 changes, inducing an AC current at the stator coil 206. While the rotation of the engine is communicated to the pulley 132 through the belt, various types of torque pulsations such as rotational fluctuations are also communicated to the pulley 132 via the belt. For this reason, the bearing 126F mounted at the front bracket 104 assumes a greater outer diameter than the bearing 126R mounted at the rear bracket 106.

The front bracket 104, which assures a sufficient level of strength to withstand the stress applied to the pulley 132, has a function of firmly holding the stator 202 and releasing the heat generated at the stator 202 to the outside. When the front bracket 104 has a wall thickness A at the side of the stator 202 and a wall thickness B at the bottom surface thereof, i.e., toward the outer circumferential side of the stator 202 over the area on the outer circumferential side along the radial direction, the wall thickness A is greater than the wall thickness B. In addition, a fitting portion 112, constituted with an annular stage, at which the rear bracket 106 can be fitted, is formed along the outer circumference at the end of the front bracket 104 toward the rear bracket 106. In addition, assuming that the front bracket 104 has a wall thickness C over the area toward the end surface along the axial direction, the wall thickness A is greater than the wall thickness C and the wall thickness C is greater than the wall thickness B.

Over the area of the rear bracket 106 toward its outer circumference along the radial direction, too, a wall thickness D of the rear bracket 106 further toward the front bracket 104 is smaller than a wall thickness E assumed at the bottom, as in the front bracket 104. In addition, a fitting portion 2a, constituted with an annular stage at which a staged portion 1a of the front bracket 104 can be fitted, is formed along the inner circumference at an end of the area with the wall thickness D. It is to be noted that the wall thickness E assumed at the rear bracket 106 is greater than the wall thickness B assumed at the front bracket 104.

The rotor 302 and fans 122 each disposed on either side of the rotor 302, are mounted at the shaft 124. Openings 114 are formed on the outer circumferential side along the rotational axis and along the radius both at the front bracket 104 and the rear bracket 106. Thus, as the fans 122 rotate, air is drawn into the housing 102 through the openings 114 formed along the axial direction and the air thus drawn into the housing 102 is then discharged along the radial direction. The front bracket 104 and the rear bracket 106 are both formed by using an aluminum alloy through a forming method such as die casting.

The fans 122 mounted on the two sides of the rotor 302 rotate as one with the rotor 302. As the two fans 122 rotate, centrifugal force causes air to flow from the inner side toward the outer side along the radial direction so that the air is taken in through the openings 114 of the front bracket 104 and the rear bracket 106 formed along the rotational axis and the air thus taken in is then discharged through the openings 114 located along the outer circumferential direction. The air is used to cool the interior of the alternator, the front bracket 104 and the rear bracket 106. It is to be noted that the front-side fan 122 has blades smaller than those at the rear-side fan 122 and thus, it distributes air at a lower flow rate.

At the end of the rear bracket 106 along the axial direction, a rear cover 116 having a smaller wall thickness than either bracket is mounted via a plurality of screws 118. FIG. 1 shows only one screw used to mount the rear cover 116. The rear cover 116 is constituted of a resin or an aluminum alloy. A terminal 142 to be connected with another on-vehicle device disposed outside the alternator, such as a battery or an engine control device, is located at the rear cover 116. In addition, brushes 144 through which a DC current is communicated as a field current to slip rings 146 from the terminal 142 are held at the rear cover 116 and a control device 150 that controls the field current is also disposed at the rear cover. As described above, the terminal 142 and the control device 150 are both disposed at the rear cover 116 and thus, the essential elements of the electrical circuit are all present at the rear cover 116. Since this allows electrical circuit components to be mounted in the production line and the rear cover 116 to be subsequently mounted at the housing 102 of the alternator, an improvement in productivity is achieved. In addition, since the electrical production process and the stator/rotor assembly process can be performed separately, the reliability is improved. Moreover, since the rear cover 112 can be mounted at the housing 102 after undergoing necessary inspection, productivity improves in this aspect as well.

The slip rings 146 are disposed at the shaft 124 and the field current controlled by the control device 150 is supplied to the slip rings 146 via the brushes 144. The field current is then supplied to a field coil of the rotor 302 from the slip rings 146 through a connecting line.

FIG. 3 is a partial sectional view of the stator 202 and the rotor 302 in the alternator shown in FIGS. 1 and 2, provided in a perspective and FIG. 4 is an external view of the rotor 302 in a perspective. The stator 202, at which three-phase AC power is induced, includes a U-phase stator 202U used to generate U-phase power, a V-phase stator 202V used to generate V-phase power and a W-phase stator 202W used to generate W-phase power. The U-phase stator 202U, the V-phase stator 202V and the W-phase stator 202W each include a stator core 232 and another stator core 252. These stator cores each have a joining surface (a joining surface 218 shown in FIG. 7) to be detailed later, and the joining surface 218 of one stator core 232 and the joining surface 218 of the other stator core 252 are in contact with each other. Since a magnetic circuit is formed as the joining surfaces 218 come into contact with each other, it is desirable to connect the joining surfaces with a minimum level of magnetic reluctance. While the joining surfaces 218 may be simply set in contact with each other, an increase in the magnetic reluctance that may occur due to an air gap can be inhibited by placing them in contact and applying high pressure. Alternatively, they may be welded together. However, if the stator cores cannot readily be welded together over the entire joining surfaces 218, the stator cores may be fixed to each other by welding the individual stator cores at a plurality of positions on the outer circumferential side while the joining surfaces 218 are set in contact with each other.

A phase stator coil is disposed between the two stator cores at each phase stator. The interlink magnetic fluxes at the phase stator coil pass through the magnetic circuit formed by the two stator cores. The direction of the interlink magnetic flux changes as the rotor 302 disposed inside the stator 202 rotates. As the strength and direction of the magnetic flux change, an AC voltage is induced at each phase stator coils. Each stator core includes stator tabs used to exchange a magnetic flux with the rotor tabs as detailed later, and also stator recesses formed to reduce the extent of leakage flux. FIG. 3 only shows stator recesses 240 formed at one of the stator cores, i.e., the stator core 232 at the U-phase stator 202U and other stator recesses are not visible in FIG. 3. Link plates 216 constituted of a nonmagnetic material are disposed between the U-phase stator 202U and the V-phase stator 202V and between the V-phase stator 202V and the W-phase stator 202W.

The rotor 302, which includes a field coil is rotatably disposed further inward relative to the stator 202 with a gap. The rotor 302 includes a rotor core 322 and another rotor core 324 both constituted of a magnetic material. Both rotor cores 322 and 324 are fixed onto the shaft 124 through serration coupling so that both rotor cores 322 and 324 rotate as one with the shaft 124. The rotor cores 322 and 324 are formed in shapes identical to each other and these rotor cores, set so as to face opposite each other, are fixed onto the shaft 124. Rotor tabs 326 are formed at one of the rotor cores, i.e., the rotor core 322, whereas rotor tabs 328 are formed at the other rotor core 324 and a shaft-side portion 342 is formed on the inside of each of the rotor cores 322 and 324. The shaft-side portions 342 of the rotor core 322 and the other rotor core 324 face opposite each other and come in contact with each other at a central area along the rotational axis of the rotor.

In addition, a rotor winding 362 wound around along the circumference of the rotor 302 is disposed inside the rotor 302 between the rotor tabs 326 and 328 and the shaft-side portions 342 of the individual rotor cores.

The rotor tabs 326 at the one rotor core and the rotor tabs 328 at the other rotor core are respectively disposed at outer positions in the shaft-side portions 342 along the rotational axis at the two rotor cores 322 and 324. As shown in FIG. 3, the tabs each assume a substantially L-shaped section along the radial direction. The outer circumferential surfaces of the rotor tabs 326 and 328 face opposite the inner circumferential surfaces of stator tabs to be detailed later, so as to exchange magnetic fluxes between these surfaces. The number of rotor tabs at the rotor 302 matches the number of tabs present along the circumferential direction at the U-phase stator, the V-phase stator or the W-phase stator. Namely, the sum of the numbers of rotor tabs 326 and the rotor tabs 328 at the two rotor cores 322 and 324 matches the number of tabs provided at each phase stator.

The front end of each rotor tab extends halfway through the phase stator furthest away among the three-phase stators disposed side by side along the rotational axis. Namely, the rotor tabs 326 at the stator core 322 shown in FIGS. 3 and 4 have surfaces facing opposite tabs at the U-phase stator 202U and the V-phase stator 202V and surfaces partially facing opposite tabs at the W-phase stator 202W. In addition, the front ends of the rotor tabs 326 at the stator core 322 extend to reach part of the tabs at the W-phase stator 202W.

The rotor tabs 328 at the stator core 324 have surfaces facing opposite tabs at the W-phase stator 202W and the V-phase stator 202V and surfaces partially facing opposite tabs at the U-phase stator 202U. The front ends of the rotor tabs 328 at the stator core 324 extend to reach part of the tabs at the U-phase stator 202U. In order to allow magnetic fluxes that are to interlink with the phase stator coils at the individual phase stators to be supplied from the tabs at either rotor core of the rotor 302, the front ends of the rotor tabs 326 at the rotor core 322 should have surfaces that face opposite the tabs at the W-phase stator 202W over their entirety. However, the results obtained by conducting a simulation related to the magnetic flux density have revealed that the strength of magnetic flux traveling through front end portions 346 of the rotor tabs 326 at the rotor core 322 is extremely small. They have also revealed that the strength of magnetic flux traveling through front end portions 346 of the rotor tabs 328 at the other rotor core 324, too, is extremely small. This means that the strength of magnetic flux to interlink with the stator coils does not increase significantly even if the front ends of the tabs at both rotor cores 322 and 324 are formed so as to range to the positions at which they face opposite the tabs at all the phase stators constituting the three-phase stator. In other words, the results of the simulation have revealed that the power output will not significantly increase even if the rotor tabs at either rotor core are lengthened.

The rotation speed at an alternator for vehicle is expected to change over a wide range, from the rotation speed equivalent to the rotor stopped state to a high rotation rate up to approximately 18,000 rpm. Accordingly, the high-speed rotation operation in the alternator for vehicle should be supported smoothly as well. The level of centrifugal force generated at the rotor tabs increases in the high-speed range of 15,000~18,000 rpm. Under such circumstances, the front ends of the tabs become deformed to range toward the stator. More marked deformation occurs when the tabs have a greater length. Accordingly, the length is reduced by eliminating any tab presence over the area where power generation efficiency is low, thereby reducing the extent of deformation attributable to centrifugal force in the embodiment. By minimizing the extent of deformation in this manner, the measurement of the space present between the rotor tabs and the stator tabs, taken along the radial direction, can be reduced, which, in turn, lowers the magnetic reluctance. In other words, while the reduction in the length of the tabs reduces the area over which the rotor tabs face opposite the stator tabs and thus lowers the power output, the distance over which the clearance between the rotor 302 and the stator 202 ranges can be reduced so as to lower the magnetic reluctance. In the embodiment achieved by factoring in these points, the front ends of the rotor tabs 326 or 328 only extend halfway through the tabs at the W-phase stator or the U-phase stator.

As described earlier, the field coil 362, i.e., the rotor winding is wound around the rotational axis between the shaft-side portions 342 and the rotor tabs at the rotor cores 322 and 324.

Thus, the two ends of the field coil extend toward the slip rings 146 along the shaft 124 and the two ends of the field coil are each connected to one of the slip rings 146. In this structure, a magnetic flux is generated via the field coil 362 with a DC current supplied to the field coil 362 from the brushes 144 via the slip rings 146. The magnetic flux thus generated then magnetizes the rotor tabs 326 and 328 at the two rotor cores 322 and 324 to achieve different polarities. It is to be noted that the electrical current supplied to the field coil 362 is controlled so that the three-phase voltage induced at the stator coils 206 each achieve a predetermined target voltage. The three-phase voltages induced at the stator coil 206 are determined in correspondence to the rotation speed of the rotor 302, which, in turn, changes frequently in correspondence to the vehicle driving condition. For this reason, unless the field current supplied to the field coil 362 is controlled, the three-phase voltage induced at the stator coil 206 change frequently as the rotation speed of the rotor 302 changes. In other words, the field coil needs to be controlled at all times in order to sustain three-phase voltages induced at the stator coil 206 at the target voltage. The control circuit and the control method to be adopted for purposes of field current control are to be described in detail later.

FIG. 4 presents an external view of the rotor 302 in FIG. 3 in a perspective. The two rotor cores 322 and 324 constituting the rotor 302 each include 8 rotor tabs, and thus a total of 16 rotor tabs are present at the rotor 302. While each of the rotor cores 322 and 324 in the embodiment includes eight tabs, the present invention is not limited to this example and a desired power output may be obtained in conjunction with 6~12 tabs formed at each rotor core 322 and 324. As explained earlier, the quantity of rotor tabs should match the number of tabs formed at each of the phase stators constituting the stator 202.

Over a base area 344 of the rotor core 322, rotor recesses 332 are formed along the circumferential direction between the individual rotor tabs 326. The rotor tabs 328 at the other rotor core 324 extend toward the rotor core 322 from the other rotor core 324 along the rotational axis and the front end portions 346 of the rotor tabs 328 at the other rotor core 324 are each positioned at one of the rotor recesses 332 along the circumferential direction. Although not shown in FIG. 4, rotor recesses 334 are formed along the circumferential direction between the individual rotor tabs 328 at the other rotor core 324 over its base area 344. The front end portions 346 of the rotor tabs 326 are each positioned at one of the rotor recesses 334 at the other rotor core 324 along the circumferential direction.

As shown in FIG. 4, the width A of each of the rotor tabs 326 at the rotor core 322 and the rotor tabs 328 at the other rotor core 324, measured along the circumferential direction at the base areas 344 is greater than the width B of the front end portion 346 of the tabs measured along the circumferential direction. In other words, the surface of each rotor tab facing toward the stator 202 assumes a substantially trapezoidal shape, tapering toward the front end. In addition, as shown in FIG. 3, the inner circumferential side of each rotor tab is tilted so that the width of the rotor tab measured along the radial direction is gradually reduced toward the front end. The rotor tabs formed as described above at the two rotor cores 322 and 324 are disposed so as to alternate along the circumferential direction, with the centers of the individual tabs along the circumference of the rotor 302 substantially aligned with the centers of the individual rotor recesses 332 along the circumferential direction.

Next, in reference to FIGS. 5 through 10, the structure adopted in the stator 202 is described. FIG. 5 presents an external view of the U-phase stator 202U in a perspective, FIG. 6 presents a development of the U-phase stator 202U in FIG. 5, FIG. 7 shows a stator tab in an enlargement, FIGS. 8A and 8B show the positional relationship among the stator tabs at the individual phase stators, FIG. 9 is a development of the stator 202 and FIG. 10 illustrates how the positional relationship between the phase stators is adjusted.

As explained earlier, the stator 202 includes the U-phase stator 202U, the V-phase stator 202V and the W-phase stator 202W via which a three-phase AC voltage in the U-phase, the V-phase and the W-phase is generated, respectively. Since these phase stators assume substantially identical structures and achieve substantially identical functions and advantages, a specific structure that may be adopted in these phase stators is described by quoting the U-phase stator 202U as a typical example. The U-phase stator 202U includes a stator core 232 and another stator core 252 with a stator coil 206 disposed between the stator cores, as shown in FIG. 6. The figure does not include an illustration of an output end of the stator coil 206. The stator core at the U-phase stator 202U in the embodiment is constituted with two split stator cores, i.e., the stator core 232 and the other stator core 252, which are separated from each other along the axial direction. The stator core 232 and the other stator core 252, separated from each other as described above, respectively include a ring-shaped stator core outer circumferential portion 234 with its section taken along the radial direction assuming an L-shape and a ring-shaped stator core outer circumferential portion 254 with its section taken along the radial direction assuming an L-shape, both located on the outer circumferential side. The stator core 232 and the other stator core 252 in the embodiment have identical shapes but they are set to face different directions. Thus, since the stator 202 can be manufactured by forming stator cores in a uniform shape, the productivity of the alternator manufacturing process is ultimately improved.

The stator core 232 in the embodiment includes eight stator tabs 238 with a section taken along the radial direction assuming an L-shape, set over equal intervals, whereas the other stator core 252 in the embodiment includes eight stator tabs 258 set over equal intervals. Stator recesses 240 and stator recesses 260 are respectively formed between the stator tabs disposed with equal intervals at the stator core 232 and between the stator tabs disposed with equal intervals at the stator core 252. In the integrated state achieved by inverting the stator core 232 and the other stator core 252 by 180° relative to each other, the stator tabs 238 at the stator core 232 are aligned with the stator recesses 260 at the other stator core 252 along the circumferential direction and the stator tabs 258 at the other stator core 252 are aligned with the stator recesses 240 at the stator core 232 along the circumferential direction. This structure reduces the extent of leakage flux that may occur between the stator core 232 and the other stator core 252 and since this in turn increases the quantity of interlinked magnetic flux at the stator coil, the power generation efficiency is improved.

The surfaces of the stator tabs at the stator core 232 and the other stator core 252 facing opposite the rotor 302, assume a substantially trapezoidal shape with the front end slightly narrower than the base portion, rather than a right angle quadrangular shape. Thus, as the rotor 302 rotates, the area facing opposite the rotor tabs gradually increases and then gradually decreases. Since the strength of magnetic flux interlinking with the stator coil 206 changes so as to gradually increase and then gradually decrease, a voltage having a waveform more similar to a sine wave than a rectangular wave is generated and thus, a reduction in higher harmonics is achieved in the voltage.

The stator tabs 238 at the stator core 232 and the stator tabs 258 at the other stator core 252 are identical to each other in shape and, accordingly, a tab 258 at the other stator core 252 is shown in an enlargement in FIG. 7 as a typical example. The tab 258 is formed as an integrated part of the other stator core 252 and the stator core 252 and stator tabs 258 are formed by layering numerous steel sheets by layering three to seventeen steel sheets, and preferably by layering a predetermined number of steel sheets within a range of five to fifteen steel sheets. The stator core is magnetic metal sheet material that has undergone press machining to facilitate the production process. The machineability will be compromised if the metal sheet material is too thin and a greater number of metal sheets will have to be layered one on top of another. Accordingly, steel sheets with the thickness thereof set within a range of 0.2 mm~1.0 mm should be used. By layering three metal sheets with a relatively large thickness or layering 15~17 thinner metal sheets, the occurrence of an eddy current can be inhibited. At the same time, a sufficient sectional area to inhibit magnetic saturation can be assured in the magnetic circuit. This structure will also assure good machineability. The metal sheets used as the material may be constituted of a magnetic metal. The characteristics of the alternator can be further improved by using metal sheets constituted with electromagnetic sheet steel material. For instance, ideal performance can be assured by using silicon steel sheets constituted of silicon steel containing a few percent of silicon, e.g., silicon content within a range of 2%~6%.

In the embodiment, electromagnetic steel sheets are used and each steel sheet is bent so that the section of the stator cores 232 and 252 at the outer circumferential portions 234 and 254, taken along the radial direction, assumes an L shape. The stator tabs at the two stator cores 232 and 252 are formed by bending the steel sheets so that they all have a section taken along the radial direction assuming an L shape. As shown in FIG. 7, as a predetermined number of steel sheets, preferably within a range of 3~17 steel sheet, having been bent are layered one on top of another, a section through which magnetic flux is to travel can be created in the magnetic circuit. The stator core 232 or the other stator core 252 with the stator tabs is formed by layering the steel sheets as described above. It is to be noted that the stator core 232 and the other stator core 252 adopting the layered structure are set in contact at their joining surfaces 218 and are then fixed together through welding or the like to form the integrated stator.

The steel sheets normally used to form the stator cores 232 and 252 in the alternator for vehicle are cold-rolled steel sheets (SPCC). While such standard issue steel sheets may be used, electromagnetic steel sheets (35H300) are used in the embodiment. The specific electrical resistance of the electromagnetic steel sheets (35H300) is approximately 3~4 times that of cold-rolled steel sheets (SPCC). As a result, better efficiency is assured through a reduction in the incidence of eddy current. With t indicating the thickness of the steel sheet, f indicating the frequency, Bm indicating the maximum magnetic flux density, ρ indicating the specific resistance of the electromagnetic steel sheets and ke indicating a proportional constant, the eddy current loss Pe may be expressed as an (1) below. The expression indicates that as the specific resistance p of the electromagnetic steel sheets increases, the eddy current loss Pe decreases to achieve a reduction in the extent of the eddy current loss. By reducing the eddy current loss, the efficiency is improved. In addition, the reduction in the eddy current loss Pe leads to reduced heat generation.

$$Pe = ke\frac{(tfBm)^2}{\rho} \quad (1)$$

FIG. 8A is a perspective showing the stator 202 in a partial sectional view. As shown in FIG. 8A, the stator 202 includes the phase stators 202U, 202V and 202W, with a link plate 216 disposed between the phase stators 202U and 202V and another link plate 216 disposed between the phase stators 202V and 202W. Inside each phase stator, a phase stator coil formed by winding a conductor coated with an insulating film along the circumferential direction is disposed and the phase stator coil is fixed between the corresponding phase stator cores with an insulating resin such as varnish. The winding ends of the individual phase stator coils are drawn out and are guided to the control device 150 shown in FIG. 1. The voltage induced at the windings undergoes full-wave rectification at a rectifier at the control device 150 before it is output to the outside. While the stator coil 206 are each constituted with a conductor having a round section in the embodiment, the stator coils may instead be constituted with angular wire having a rectangular section. It is to be noted that an insulating member constituted with insulating paper may be disposed between the phase stator cores and the stator coil 206 and the insulating member thus disposed may then be fixed with an insulating resin.

In FIG. 8B, illustrating the positional arrangement assumed for the stator tabs, an integrated unit constituted with the U-phase stator 202U, the V-phase stator 202V and the W-phase stator 202W, with the stator tabs at the U-phase stator 202U, the stator tabs at the V-phase stator 202V and the stator tabs at the W-phase stator 202W offset from one another by an electrical angle of 120°, is shown.

FIG. 9 shows the stator 202 in a development. A link plate 216 is disposed between the U-phase stator 202U and the V-phase stator 202V, and a similar link plate 216 is disposed between the V-phase stator 202V and the W-phase stator 202W. In the embodiment, the link plates 216 are utilized to hold the V-phase stator 202V at an offset position relative to the U-phase stator 202U by rotating the V-phase stator 202V by a predetermined electrical angle relative to the U-phase stator 202U and to hold the W-phase stator 202W at an offset position relative to the V-phase stator 202V by rotating it by a predetermined electrical angle relative to the V-phase stator 202V. The predetermined electrical angle by which the phase stators are offset relative to one another is an electrical angle of 120°. Since the link plates 216 are used to position the phase stators with an offset relative to each other so as to achieve the specific positional relationship described above, the phase stators can be positioned very easily and accurately, which in turn, improves the work efficiency. In addition, since they can be positioned without requiring a specific component, the manufacturing costs can be minimized. It is to be noted that while the link plates 216, which need to be constituted of a nonmagnetic material, may be formed by using, for instance, an aluminum sheet. Alternatively, they may be formed by using a resin substrate. However, an aluminum substrate assures better heat radiating characteristics.

FIG. 9 shows two projections 2162 and 2164 projecting along the axial direction at one of the surfaces of each link plate 216 at a specific position along the circumference of the link plate 216. Although not shown in FIG. 9, two projections 2166 and 2168 are formed at each link plate at the rear surface, i.e., the other surface, at a position offset from the two projections 2162 and 2164 by the predetermined electrical angle, i.e., 120°. While two projections are formed at each of the two surfaces in the embodiment, only one projection may be formed at each surface, or a greater number of projections may be formed along the circumferential direction.

FIG. 10 shows one of the link plates 216, which is positioned relative to and locked onto the U-phase stator 202U with its first projection 2162 and second projection 2164 inserted at clearances formed at the U-phase stator 202U, in a view from a side of the U-phase stator 202U. The first projection 2162 of the link plate 216 is inserted at a recess 2402 formed at the center of a stator recess 240 in the U-phase stator core 232 and the second projection 2164 is inserted between a tab 258 of the other stator core 252 of the U-phase stator 202U and the stator core 232. The U-phase stator 202U and the link plate 216 are thus positioned relative to each other.

FIG. 11 shows the link plate 216 viewed over the other surface. The first projection 2166 at the other surface is formed at a position rotated relative to the position of the first projection 2162 at the one surface by a predetermined electrical angle, i.e., 60°, whereas the second projection 2168 at the other surface is formed at a position rotated relative to the position of the second projection 2164 at the one surface by a predetermined electrical angle, i.e., 60°. The link plate 216 and the V-phase stator 202V are positioned relative to each other and locked onto each other in a manner similar to that with which the U-phase stator 202U and the link plate 216 are positioned relative to each other and, as a result, the V-phase stator 202V is held at a position rotated by 60° of electrical angle relative to the position of the U-phase stator 202U.

The V-phase stator 202V is locked onto the other link plate 216 in a similar manner and the W-phase stator 202W, offset by an extent equivalent to an electrical angle of 120°, is locked onto the other link plate 216. Via the link plates 216 assuming identical shapes, the V-phase stator 202V is fixed at a position equivalent to an electrical angle of 120° turn relative to the U-phase stator 202U and the W-phase stator 202W is fixed at a position equivalent to an electrical angle of 120° relative to the V-phase stator 202V. The use of identical link plates 216 assures outstanding productivity. In addition, the use of identical link plates facilitates automation of the production process, since the U-phase stator 202U and the V-phase stator 202V can be positioned relative to each other and the V-phase stator 202V and the W-phase stator 202W can be positioned relative to each other through a uniform method. In this regard, too, better productivity is assured.

FIG. 12 shows how the terminal lines of the stator coil 206 wound at the three-phase stators, i.e., the U-phase stator 202U, the V-phase stator 202V and the W-phase stator 202W, disposed side-by-side along the rotational axis are drawn out in a view of the stator tabs taken from the rotor side. While the stator coil 206 and the various terminal lines are covered and fixed by resin and are, therefore, not visible in reality, FIG. 12 omits the resin so as to illustrate the stator coils 206 and the terminal lines clearly. The stator coil 206 at the W-phase stator 202W extends through the clearance between the stator tabs 238 at one stator core and the stator tabs 258 at the other stator core in the W-phase stator 202W toward the rear cover 116 and is connected to the control device 150 in FIG. 1, which is disposed on the rear side. It is further connected to the terminal 142 via a rectifier circuit (not shown).

In addition, the stator coil 206 at the V-phase stator 202V extends toward the rear cover 116 through the clearance between the stator tabs 238 at one of the stator cores of the V-phase stator 202V and the stator tabs 258 at the other stator core of the W-phase stator 202W and is connected to the control device 150 in FIG. 1 disposed on the rear side. Likewise, the stator coil 206 at the U-phase stator 202U extends toward the rear cover 116 through the clearance between the stator tabs 238 at one of the stator cores of the U-phase stator 202U and the stator tabs 258 at the other stator core of the V-phase stator 202V and is connected to the control device 150 in FIG. 1 disposed on the rear side. The stator coils 206 at the U-phase stator 202U, the V-phase stator 202V and the W-phase stator 202W are connected through a star connection as described later and the terminal lines corresponding to the individual phases, which are notated with "neutral point" in FIG. 12, are electrically connected as neutral points in the star connections. The terminal lines corresponding to the individual phases, which are not notated with (neutral point) in FIG. 12, are electrically connected to the full-wave rectifier circuit, and an output end of the full-wave rectifier circuit is connected to the terminal 142 in FIG. 1. The individual stator coil 206 can be connected through a simple procedure by using the clearance formed between the individual tabs as described above. Finally, the windings can be held firm with ease by coating them with a resin or the like. While a high level of electrical current flows, the voltage value is kept at a lower level and thus, dielectric breakdown does not occur readily even though the stator coils are connected by using the space between the individual stator tabs.

In reference to FIG. 13, a method that may be adopted when manufacturing the stator cores 232 and 252 at each phase stator is described. There are two methods that may be adopted when manufacturing the stator cores 232 and 252. One of them is now explained in reference to FIG. 13A. A stator core base member 226, which is a flat sheet having a multiple-layer structure, is formed through press machining or etching. While the figure shows a stator core base member with a four-layer structure for purposes of simplification, an optimal number of steel sheets may be selected within the range of 3~17 as explained earlier, to constitute the stator core base member. Next, the outer circumferential portion 234 or 254 and the stator tabs 238 or 258 of the stator core are formed by bending the stator core base member, as shown in FIGS. 6 and 7. During the bending process, an inner metal sheet and an outer metal sheet become offset relative to each other over the tab area and the outer circumferential area. For this reason, following the bending process, front end surfaces 222 of the stator tabs 238 or 258 are leveled off through machining. Likewise, the joining surface 218 of the stator core outer circumference portion 234 or 254 is leveled off through machining. This method is advantageous in that the stator core can be formed with ease by bending a plurality of steel sheets at once. However, the method requires a highly advanced machining technique since gaps tend to form readily between the individual metal sheets at a bent area as numerous metal sheets layered one on top of another are bent at once. A rotor-side surface 220 of each stator tab is a crucial surface at which a magnetic flux is exchanged with the rotor 302. It is essential to minimize the distance between the rotor surface and the surface 220 in order to keep the magnetic reluctance at a lower level. If a bent portion 26 has a significant curvature or a significant space is formed between the individual metal sheets at the bent portion 26, the area of the rotor-side surface 220 of the stator tab, which faces opposite the rotor 302, becomes reduced, which may lead to lowered generator efficiency.

FIG. 14 shows another manufacturing method that may be adopted when manufacturing the stator 202. A single metal sheet or a layered assembly formed by using a small number of metal sheets layered one on top of another, each constituted with a flat magnetic sheet having undergone a machining process, is bent in process 1. The figure shows single metal sheets individually undergoing the bending process. In process 2, metal sheets having undergone the bending process are layered one on top of another, and in process 3, the layered assembly constituted with the required number of metal sheets is fixed as an integrated unit. From the viewpoint of productivity, the layered metal sheets should be fixed together through welding. Since a metal sheet to be set on the inner side of the layered assembly does not need to be very long and a metal sheet to be set on the outer side in the layered assembly needs to be larger, the initial machining process should be executed by adjusting the dimensions accordingly. If it is difficult to adjust the lengths of the metal sheets accurately, a process of adjusting the lengths through trimming may be performed during process 3 before or after the layered assembly is fixed as an integrated unit, so as to correct the shape of the layered assembly into the desired shape. The integrated stator core with a layered structure formed as described above is basically identical in its structure to the finished stator core product formed as described in reference to FIG. 13. In FIGS. 13 and 14, the same reference numerals are assigned to portions and surfaces assuming identical structures or functions. Through the second method, the bent portions 26 can be formed relatively easily and the metal sheets can be bent to substantially a right angle. By forming the bent portions at substantially a right angle as described above, the area of the rotor-side surface 220 at each stator tab to face opposite the rotor surface can be increased. As a result, magnetic fluxes are allowed to travel more easily between the rotor 302 and the stator 202, which, in turn, improves the electrical characteristics and the efficiency. Since the method requires steel sheets to be formed in a plurality of shapes, the number of dies of varying types required in the manufacturing process is bound to increase. However, the method is advantageous in that the subsequent bending process is better facilitated. In addition, little or no space will be formed between the metal sheets and thus, the structure is less likely to be adversely affected by vibration or the like.

Next, in reference to FIG. 15, the relationship between the bend ratio with which a bent portion at a stator tab 238 or 258 of one stator core 232 or the other stator core 252 is formed and the output current from the alternator is described. The bend ratio of the bent portion as referred to in the description of the embodiment is the ratio R/L with L representing the maximum length of the stator tab 238 or 258 in FIG. 15A measured along the axial direction and R representing the radius of the bent portion. Assuming that the length L has a constant value determined in correspondence to the design requirements, the ratio takes on a larger value when a greater local area is formed at the bent portion and takes on a smaller value when the bent portion is formed with an angle closer to a right angle. Since the bent portion does not form a true circular arc, it does not have the radius R to be exact. However, the radius R is calculated by approximating the shape of the bent portion to a circular arc. FIG. 15B indicates the relationship between the bend ratio and the output current determined through a simulation. Tendencies substantially identical to each other are observed when the rotor 302 rotates at 6000 rpm and when the rotor rotates at 1800 rpm. Namely, the output current starts to decrease once the bend ratio becomes equal to 0.1. When the bend ratio is equal to or greater than 0.2, the output current decreases drastically. This means that it is crucial to set the bend ratio equal to or less than 0.2 and it is more desirable to set the bend ratio equal to or less than 0.1. It is assumed that a greater bend ratio results in a lower output since the area of the tab facing opposite the rotor tab decreases to allow an increase in the magnetic reluctance and an increase in the leakage flux when the bend ratio is significant.

Next, in reference to FIG. 16, the number of metal sheets that should be layered one on top of another to form the layered assembly is explained. With E representing the induction voltage (V), Ø representing the magnetic flux (wb), N representing the number of turns at the stator coil 206, S representing the sectional area (mm$^2$) of the stator core 232/252, B representing the magnetic flux density (T), n representing the rotation rate (rpm) of the rotor 302 and P representing the number of poles, the induction voltage may be expressed as in (2). Expression (2) indicates that the sectional area of the stator core 232/252 and the induction voltage are in proportion to each other. This means that by increasing the sectional area of the stator core 232/252 through an increase in the number of metal sheets used to constitute the layered assembly, the induction voltage can be raised. However, if an excessively large number of metal sheets are used to constitute the layered assembly, the magnetic reluctance at the layered surface is found to increase and, under such circumstances, the magnetic flux from the rotor cannot readily reach the inner layer. In this case, the induction voltage will not be high. While the ideal number of metal sheets that should be used to form the layered assembly should be determined in correspondence to the gap to be allowed between the layers, test results indicate that when a layering ratio m/hs, with m representing the number of layers and hs representing the total thickness of the layered assembly, is equal to or less than 0.1, the induction voltage stops rising. This means that the greatest possible number of metal sheets should be layered within the range over which the layering ratio is equal to or greater than 0.1. In addition, the sum of the gaps present between the individual layers should not exceed 0.2 mm.

$$E = N \cdot S \cdot B \cdot 2\pi \cdot n \cdot P / 120 \times e^{jwt} \quad (2)$$

Next, the operations executed in the embodiment are described.

As torque is communicated to the pulley 132 from the engine crankshaft via the belt, the rotor 302 is caused to rotate via the shaft 124. As a DC current is supplied via the slip rings 146 and the brushes 144 to the field coil 362 disposed at the rotor 302, a magnetic flux corresponding to the level of the DC current supplied thereto is generated at the field coil 362. As a result, the rotor tabs 326 and the rotor tabs 328 ranging toward the alternate sides at the rotor 302 become magnetized to form N poles and S poles respectively. The magnetic flux generated at the field coil 362 (equivalent to a rotor winding) travels through the stator tabs 238 at one of the stator cores of a phase stator in the stator 202 from the rotor tabs 326 at the rotor core 322, travels around the stator coil 206, travels through the other stator tabs 258 and then reaches the rotor tabs 328 at the other rotor core 324, having become magnetized to form the S poles. Similar magnetic circuits are also formed at the other phase stators. As the rotor 302 rotates, different stator tabs come to face opposite the rotor tabs and thus, the direction of the magnetic flux passing through the magnetic circuit is ultimately inverted as the rotor 302 rotates. The inversion of the magnetic flux in the magnetic circuit circulating between the rotor 302 and the stator 202 as the rotor rotates alters the magnetic flux originating from the rotor 302 and interlinking with the stator coil 206. As a result, an AC voltage is induced at the stator coil 206 at each of the U-phase stator, the V-phase stator and the W-phase stator, and as a whole, a three-phase AC voltage is induced.

The AC voltage thus generated is output from the terminal 142 as a DC voltage after undergoing full-wave rectification at the full-wave rectifier to be detailed later. The rectified DC voltage achieves a level within a predetermined range, e.g., approximately 14.3V and the electrical current supplied to the field coil 362 is controlled via the control circuit so as to output a DC voltage at the required predetermined level regardless of how the engine rotation speed may change.

The stator 202 structured as described above, with the stator cores thereof formed by using a layered metal sheet material constituted with, for instance, layers of silicon steel sheets, assures a sufficient level of strength in the stator cores to withstand use in automotive applications in which the alternator is likely to be installed close to a vibration source such as the engine. In addition, since the electrical current cannot flow through readily along the layering direction, i.e., since the electrical resistance increases along the layering direction, the extent of eddy current formation can be reduced. The reduction in the eddy current, in turn, makes it possible to reduce the extent of heat generation.

The stator cores in the embodiment are formed by using a steel sheet material constituted with electromagnetic steel sheets. The steel sheets are layered from the inner side toward the outer side at the stator tab magnetic poles in the embodiment. In other words, the layered surface is formed to face opposite the rotor. Thus, the electrical resistance does not increase significantly over the stator tab magnetic pole areas, allowing an eddy current to be generated readily. However, the eddy current loss can be reduced in the embodiment in which a higher specific resistance is achieved by constituting the stator cores with steel sheet material constituted with electromagnetic steel sheets.

In addition, desirable magnetic characteristics are achieved by layering silicon steel sheets and ultimately, desirable power generation characteristics are achieved through the use of silicon steel sheets. In addition, since the stator coil 206 assumes a simple structure, the manufacturing efficiency can be improved.

Furthermore, at the stator tab magnetic pole, a bent portion is formed to range from the side surface along the axial direction through the area to face opposite the rotor 302. In other words, since the stator tab magnetic pole with a section thereof substantially assuming an L shape is formed by layering steel sheets in succession, the strength of the stator tab magnetic pole can be further improved. In addition, the number of steel sheets used to form the stator core can be minimized.

In addition, the stator core in the embodiment is formed by connecting two split stator core base members, separated from each other along the axial direction. Thus, the stator coil 206 can be mounted with ease and the steel sheets can also be formed with greater ease.

Moreover, the surface facing opposite the rotor 302 at the stator tab magnetic pole in the embodiment is a flat surface. As a result, the formation of the stator cores is facilitated and also, since the magnetic flux is allowed to flow more easily along the axial direction at the stator tab magnetic pole, better efficiency is assured.

The stator 202 in the embodiment includes phase stators corresponding to a plurality of phases, disposed side-by-side along the axial direction via link plates constituted of a nonmagnetic material. At each link plate, positioning projections used to position the phase stators as they come in contact with recesses and projections formed along the radius at the stator cores are formed. The use of such link plates reduces the extent of leakage flux occurring between the individual phase stators and also makes it possible to accurately position the phase stators along the circumferential direction. Moreover, the link plates can also each be used to position along the circumferential direction the pair of stator core base members constituting the stator core at each phase stator in the embodiment.

In the embodiment, the stator coil 206 in the individual phases are connected to the rectifier through the clearance between the stator tab magnetic poles, without having to form holes at the stator cores, which would adversely affect the magnetic circuits. While noise tends to manifest readily in a stator assuming a complex shape, the stator described above adopts a simple structure and thus, the extent of noise generation can be reduced. It is to be noted that since the clearance between the stator tab magnetic poles is filled with a nonmagnetic resin, the stator coil 206 are held firmly and, at the same time, the individual phase stators and stator core base members can be fixed together. In addition, the strength of the stator including the stator tab magnetic poles can be further improved by the resin. Since the resin is charged to a level substantially flush with the stator tab magnetic poles in the embodiment, the level of air blast occurring as the rotor rotates, too, can be lowered. It is desirable that the surfaces of the stator tab magnetic poles not be coated with resin, to minimize the clearance between the stator tab magnetic poles and the rotor, which, in turn, allows the magnetic flux to pass through with ease.

Second Embodiment

Figure 17A:
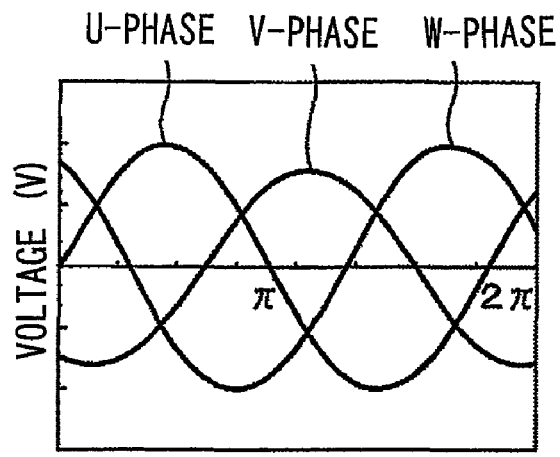
FIGS. 17A and 17B show output waveforms of the voltages induced in the individual phases.
Figure 17B:
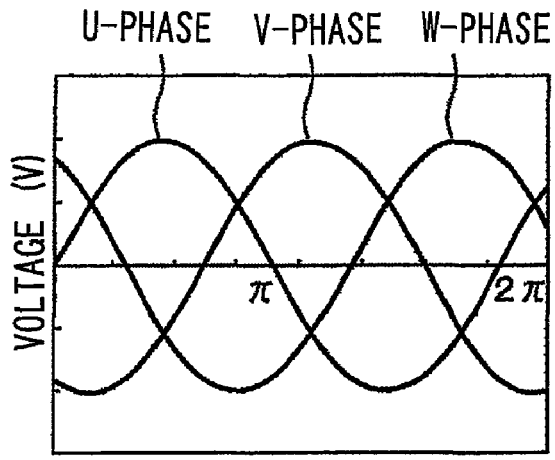
Figure 18:
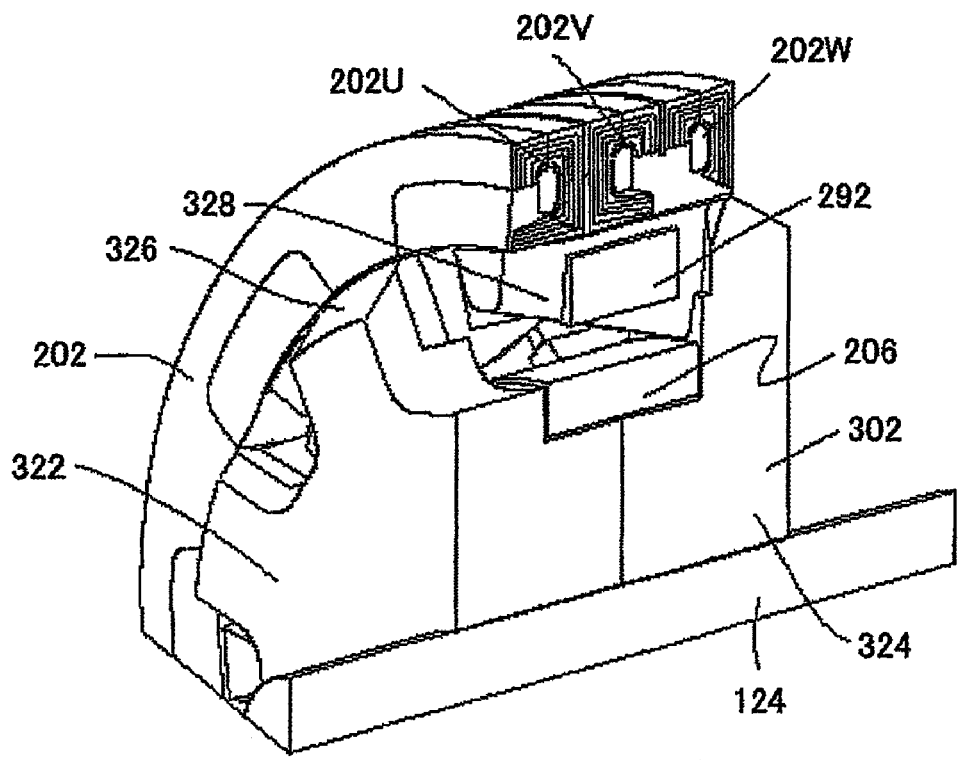
FIG. 18 is a perspective showing the rotor and the stator achieved in a second embodiment in a sectional view taken through their side surfaces.

In reference to FIGS. 17 and 18, the second embodiment is described. FIG. 17A shows the waveforms of output voltages induced at the individual stator coil 206 in the first embodiment, whereas FIG. 17B shows the waveforms of output voltages induced in the individual phases in the second embodiment. FIG. 18 is a perspective showing the rotor 302 and the stator 202 achieved in the second embodiment in a sectional view over their side surfaces. It is to be noted that the same terms and reference numerals are assigned to structural elements identical to those in the first embodiment to preclude the necessity for a repeated explanation thereof.

As explained earlier, the phase stators each corresponding to the U-phase, the V-phase and the W-phase constituting the stator 202 in the first embodiment are disposed so that the stator core 232 at one of the phase stators is set next to the stator core 252 at another phase stator via a link plate 216. However, a magnetic flux leak is bound to occur even via the nonmagnetic link plate 216 between the stator core at one phase stator and the stator core at another phase stator set next to each other. As the magnetic flux leaks to the stator cores 232 and 252 at the adjacent phase stators, the strength of the magnetic flux in the stator cores at the phase stator (V-phase) disposed between the phase stators disposed at the two ends along the axial direction (the U-phase stator and the W-phase stator) becomes lower than the strengths of the magnetic fluxes in the cores at the phase stators at the two ends. As a result, the AC voltage output from the phase stator disposed in the middle is lower than the level of the AC voltages output from the phase stators (the U-phase stator and the W-phase stator) disposed at the two ends along the axial direction as shown in FIG. 17A. This, in turn, results in the occurrence of a ripple voltage manifesting as a relatively large voltage fluctuation in the DC voltage having undergone rectification at the rectifier. There is also the possibility that the voltage of the generated power to the output itself becomes lowered.

The second embodiment shown in FIG. 18 adopts a structure in which the strength of the magnetic flux in the stator cores at the phase stator at the middle position (V-phase) disposed between the U-phase and the W-phase stators disposed at the two ends along the axial direction is boosted relative to the strength of the magnetic fluxes at the phase stators (the U-phase and the W-phase stator) disposed at the two ends along the axial direction. More specifically, a permanent magnet is disposed at the rotor 302 over each area to face opposite a stator tab 238 at one of the stator cores or a stator tab 258 at the other stator core in the phase stator at the middle position (V-phase), so as to increase the magnetic flux density. In the embodiment, a permanent magnet 292 with a substantially quadrangular section taken along the axial direction is fixed at the rotor 302 over each area between rotor tabs to face opposite a tab at the V-phase stator 202V. The permanent magnet 292 is polarized, so that a pole achieving the same polarity as the magnetic pole formed at the rotor tab faces opposite the magnetic pole as the field coil 362 is excited. Thus, the strength of magnetic flux interlinking with the phase stator coil at the V-phase stator 202V is selectively boosted, which increases the voltage induced at the V-phase stator compared to that shown in FIG. 17A to a level substantially equal to the level of the voltages induced in the other phases, as shown in FIG. 17B. The difference among the outputs provided through the individual phase stators can be corrected by using such permanent magnets 292. While the magnets 292 used to correct the discrepancy in the output level may be the standard permanent magnet, it is particularly desirable to use ferrite magnets. The internal electrical resistance at a ferrite magnet is significant and thus the occurrence of, for instance, an eddy current can be minimized by using a ferrite magnet to improve the efficiency and reduce the extent of heat generation. While a rare-earth magnet assures a higher strength of magnetic flux density than a ferrite magnet, the magnetic flux density level achieved via the ferrite magnet is high enough to regulate the output levels of the individual phase stators to a uniform level. It is to be noted that the permanent magnet 292 should assume a length taken along the axial direction substantially equal to the length of the V-phase stator 202V measured along the axial direction and be held at a position facing opposite the V-phase stator 202V. However, the length of the permanent magnet does not need to be exactly equal to the length of the V-phase stator 202V along the axial direction as long as the magnetic flux loss due to leakage at the V-phase stator 202V can be made up to match the strength of magnetic flux at the U-phase stator 202U and the W-phase stator 202W.

As described above, the levels of the voltages induced at the stator coil 206 at the various phase stators are adjusted to a substantially uniform level and, as a result, the DC ripple voltage resulting from the conversion can be minimized. In addition, since the magnetic flux loss due to leakage flux is compensated for, an advantage is achieved in that the voltages can be induced at a higher level to be output from the generator even at a low rotation rate.

The magnets 292 functioning as an output balancing means in the second embodiment are disposed between the rotor tab magnetic poles and are each constituted with a permanent magnet disposed so as to face opposite at least the phase stator other than the phase stators disposed at the two ends along the axial direction. Thus, a balancing function can be achieved without having to greatly modify the shapes of the rotor and the stator.

In addition, the permanent magnets are disposed so as to face opposite the phase stator other than the phase stators disposed at the two ends along the axial direction in the second embodiment. This means that a balancing means can be provided by using permanent magnets assuming a simple shape, which, in turn, makes it possible to minimize fluctuations in the power generation output through inexpensive measures.

Third Embodiment

Figure 19:
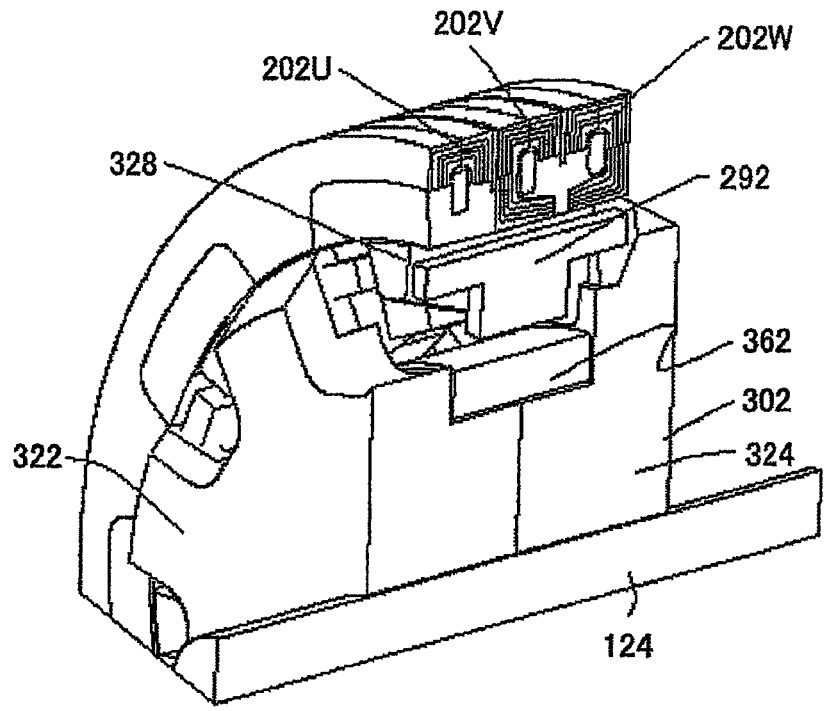
FIG. 19 is a perspective showing the rotor and the stator achieved in a third embodiment in a sectional view taken through their side surfaces.

The third embodiment of the present invention is explained in reference to FIG. 19. FIG. 19 is a perspective of the rotor 302 and the stator 202 achieved in the third embodiment in a sectional view taken through the side surfaces thereof. The same terms and reference numerals are assigned to structural elements identical to those in the first embodiment so as to preclude the necessity for a repeated explanation thereof. Apart from the shape of the permanent magnets 292, the third embodiment is substantially identical to the second embodiment. The permanent magnets 292 in the third embodiment each assume a large wall thickness over the area corresponding to the V-phase stator 202V and assume a small wall thickness over the areas corresponding to the U-phase stator 202U and the W-phase stator 202W so as to form a substantially T-shaped section along the axial direction. As a result, the magnetic flux interlinking with the stator coil 206 of the V-phase stator 202V is greater than the magnetic fluxes interlinking with the stator coil 206 at the other phase stators. The overall generator output is thus boosted by the permanent magnets 292. In particular, since the voltage output from the V-phase stator 202V is raised with respect to the voltages output from the other phase stator coil 206, the extent of discrepancy among the voltages output in correspondence to the individual phase is minimized.

As described above, the permanent magnets used in the third embodiment assume a shape with which a stronger magnetic flux is generated to interlink with the phase stator coil disposed in the middle along the axial direction relative to the strength of the magnetic flux generated to interlink with the phase stator coils at the two ends along the axial direction, thereby substantially equalizing the levels of the voltages induced in the individual phases. More specifically, a single permanent magnet assuming a smaller wall thickness at the two ends along the axial direction, simply needs to be disposed between each pair of adjacent rotor tab magnetic poles to achieve uniformity among the levels of the induction voltages and increase the overall generator output.

Fourth Embodiment

Figure 20:
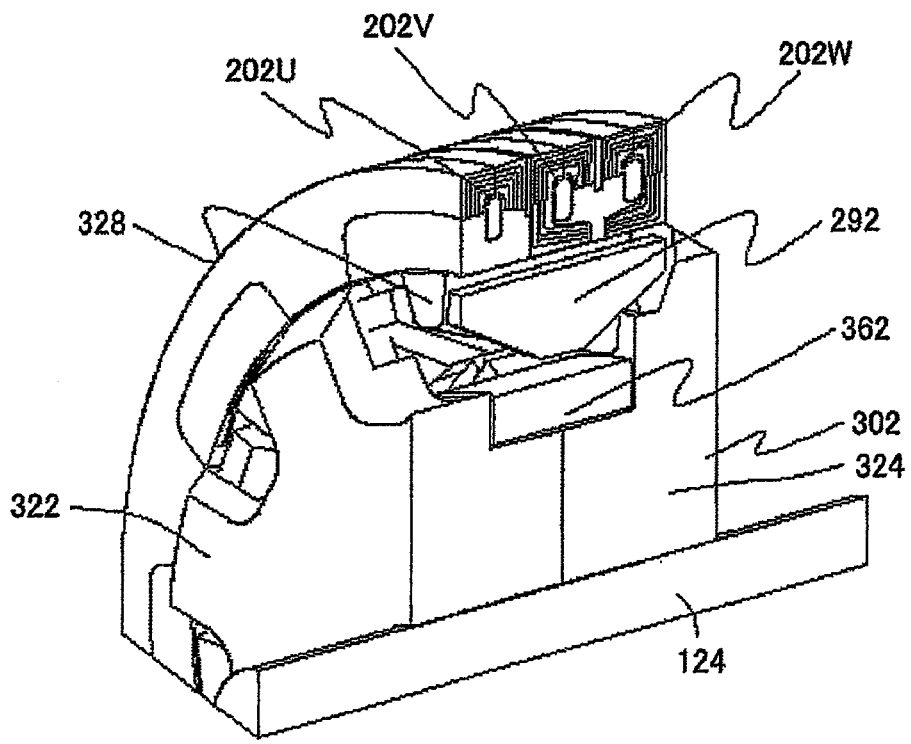
FIG. 20 is a perspective showing the rotor and the stator achieved in a fourth embodiment in a sectional view taken through their side surfaces.

The fourth embodiment of the present invention is explained in reference to FIG. 20. FIG. 20 is a perspective of the rotor 302 and the stator 202 achieved in the fourth embodiment in a sectional view taken through the side surfaces thereof. The same terms and reference numerals are assigned to structural elements identical to those in the first embodiment so as to preclude the necessity for a repeated explanation thereof. Apart from the shape of the permanent magnets 292, the fourth embodiment shown in FIG. 20 is substantially identical to the third embodiment. The permanent magnets 292 in the fourth embodiment are formed so as to have a substantially trapezoidal-section taken along the axial direction, the width of which increases toward the outer circumferential side. The area of each permanent magnets corresponding to the V-phase stator 202V is equivalent to the shorter side of the trapezoid on the inner side and the width of the trapezoid taken along the axial direction gradually increases so that the width continuously increases from the shorter side located on the inner circumferential side toward the outer circumferential side. Each permanent magnet 292, having a function similar to that described in reference to FIG. 19, generates a greater strength of magnetic flux over the area corresponding to the tab at the V-phase stator 202V, assumes a smaller length along the radial direction over the areas corresponding to the U-phase stator 202U and the W-phase stator 202W and thus generates weaker magnetic fluxes over the areas corresponding to the U-phase stator 202U and the W-phase stator 202W. In other words, the magnetic flux to interlink with the stator coil 206 at the V-phase stator 202V achieves a greater strength than the strengths of the magnetic fluxes to interlink with the other stator coil 206. Such permanent magnets 292 increase the overall generator output and also increase the voltage output from the V-phase stator 202V to a greater extent so as to achieve a level substantially matching the level of the voltages output via the stator coil 206 in the other phases. Consequently, the extent of discrepancy among the levels of the voltages output in correspondence to the individual phases is minimized. In addition, since the strength of magnetic flux generated at the permanent magnet 292 in the fourth embodiment continuously increases toward the two ends along the axial direction, the discrepancy among the levels of the voltages induced in the individual phases is reduced as explained above and also, the extent of leakage flux can be more effectively reduced over the third embodiment. Furthermore, since the permanent magnets 292 do not assume a drastically constricted shape, stress is not allowed to concentrate at any particular part of the permanent magnets 292 and thus, better mechanical strength is assured.

Fifth Embodiment

Figure 21:
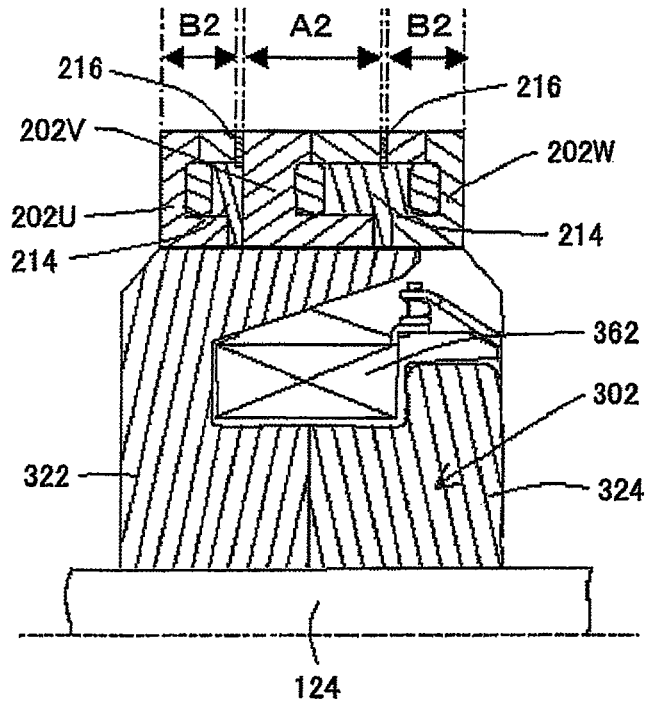
FIG. 21 is a perspective showing the rotor and the stator achieved in a fifth embodiment in a sectional view taken through their side surfaces.

The fifth embodiment of the present invention is explained in reference to FIG. 21. FIG. 21 illustrates the rotor 302 and the stator 202 achieved in the fifth embodiment in a sectional view taken through the side surfaces thereof. The same terms and reference numerals are assigned to structural elements identical to those in the first embodiment so as to preclude the necessity for a repeated explanation thereof. In the fifth embodiment, which is achieved as a variation of the first embodiment, the V-phase stator 202V is formed in a shape different from the shape of the U-phase stator 202U and the W-phase stator 202W, instead of forming a balancing means constituted with permanent magnets 292 disposed between the rotor tab magnetic poles, as in the second and third embodiments. In more specific terms, the length A2 of the stator cores 232 and 252 at the V-phase stator 202V, measured along the rotational axis, is set greater than the length B2 of the stator cores 232 and 252 at the U-phase stator 202U and the W-phase stator 202W measured along the axial direction, so as to allow a magnetic flux to pass with greater ease, i.e., with greater strength, through the space between the rotor 302 and the stator cores 232 and 252 at the V-phase stator 202V, compared to the strength of magnetic flux traveling through the space between the rotor 302 and the stator cores 232 and 252 at both the U-phase stator 202U and the W-phase stator 202W. It is to be noted that the stator cores 232 and 252 at the V-phase stator 202V are formed so as to assume a greater length along the axial direction compared to the stator cores at the U-phase stator 202U and the W-phase stator 202W and also to increase the length at the stator tabs and a greater area facing opposite the rotor 302. In other words, the stator cores at the V-phase stator 202V are formed so that the area of the tabs at the V-phase stator 202V is greater than the area of the tabs formed at the U-phase stator 202U and the W-phase stator 202W.

In the fifth embodiment, the discrepancy among the levels of the voltages induced in the individual phases is minimized by assuming a structure in which the magnetic flux is allowed to pass with greater ease through the space between the rotor 202 and the phase stator at the middle position than the magnetic fluxes traveling through the space between the rotor 202 and the phase stators disposed at the two ends along the axial direction. In particular, since the stator cores at the middle stator are formed to have a greater length along the axial direction than the stator cores at the phase stators disposed at the two ends along the axial direction, the discrepancy among the levels of the voltages induced in the individual phases can be effectively reduced without having to add a new member in the fifth embodiment.

Sixth Embodiment

Figure 22:
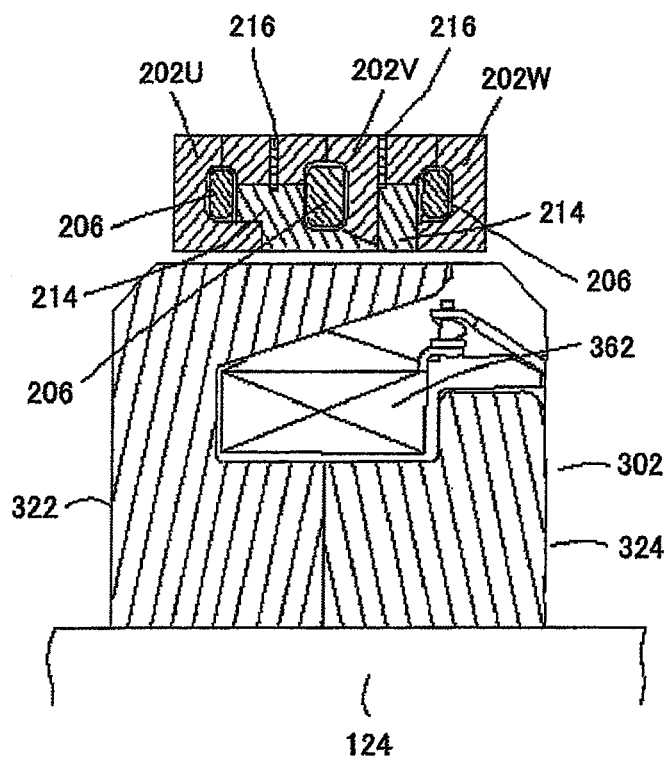
FIG. 22 is a perspective showing the rotor and the stator achieved in a sixth embodiment in a sectional view taken through their side surfaces.

The sixth embodiment of the present invention is explained in reference to FIG. 22. FIG. 22 illustrates the rotor 302 and the stator 202 achieved in the sixth embodiment in a sectional view taken through the side surfaces thereof. The same terms and reference numerals are assigned to structural elements identical to those in the first embodiment so as to preclude the necessity for a repeated explanation thereof. The sixth embodiment includes a structure (hereinafter referred to as a balancing means) for reducing the extent of discrepancy among the AC outputs by assuming a greater number of turns at the stator coil 206 in the V-phase stator 202 compared to the number of turns at the stator coil 206 in the U-phase stator 202U and the W-phase stator 202W. For this reason, the stator cores 232 and 252 at the V-phase stator 202V are formed to allow the corresponding stator coil 206 to assume a greater number of turns than the U-phase stator coil and the W-phase stator coil. Other structural features are substantially identical to those described earlier, e.g., those adopted in the first embodiment, and thus, a repeated explanation is omitted.

As described above, the balancing means in the sixth embodiment is achieved by assuming a greater number of turns at the stator coil 206 at the phase stator at the middle position compared to the number of turns at the stator coils at the phase stators disposed at the two ends along the axial direction. As a result, the levels of the voltages induced in the individual phases can be balanced with minimum modification. It is to be noted that while the stator coil 206 at the phase stator at the middle position alone may be modified without altering the stator cores corresponding to the individual phases, the levels of the voltages induced for output can be maximized by increasing the annular space in which the stator coil 206 is wound through the stator cores at the V-phase stator 202V compared to the corresponding spaces at the U-phase stator 202U and the W-phase stator 202W and winding the stator coil 206 with a greater number of turns in correspondence to the V-phase in the greater annular space compared to the number of turns at the stator coils in the other phases, as shown in FIG. 22.

Seventh Embodiment

Figure 23A:
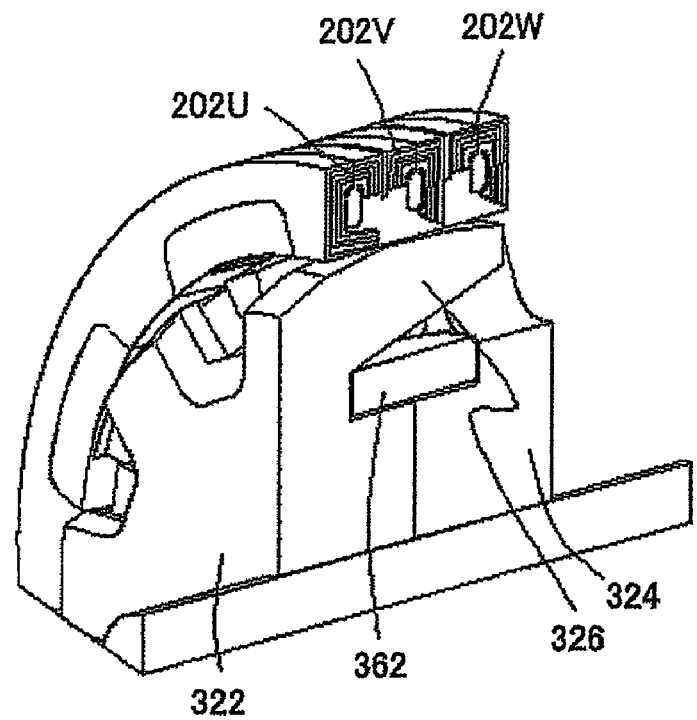
FIGS. 23A and 23B illustrate the rotor and the stator achieved in a seventh embodiment.
Figure 23B:
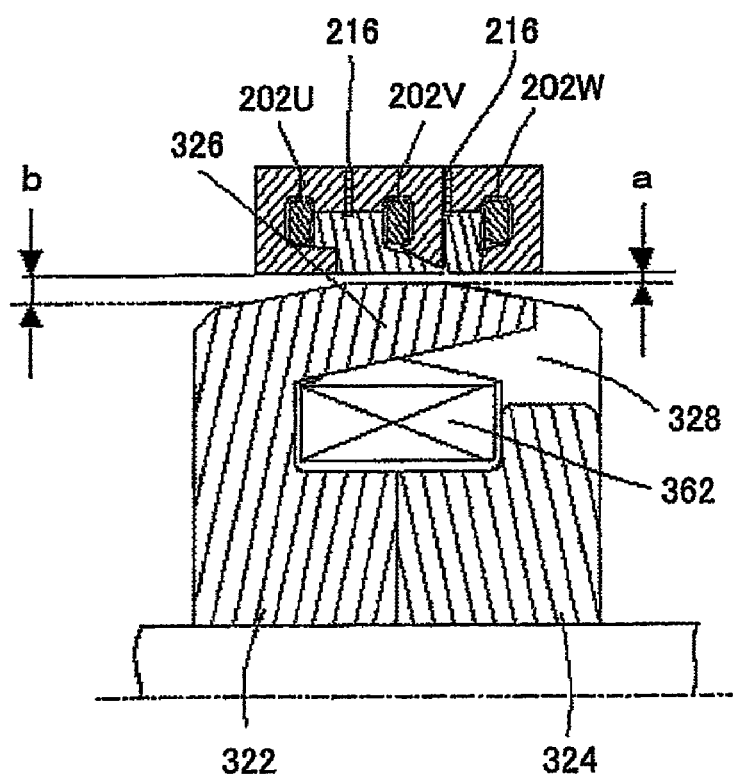

The seventh embodiment of the present invention is explained in reference to FIGS. 23A and 23B. FIG. 23A is a perspective of the rotor 202 and the stator 302 achieved in the seventh embodiment in a sectional view taken through their side surfaces and FIG. 23B is a sectional view taken through the side surfaces of the rotor 202 and the stator 302. It is to be noted that the same terms and reference numerals are assigned to structural elements identical to those in the first embodiment to preclude the necessity for a repeated explanation thereof.

In the seventh embodiment, the structure (balancing means) for minimizing the extent of the discrepancy among the output levels at the individual phase stators is formed by setting a smaller clearance a between the rotor tabs and the V-phase stator 202V and setting a greater clearance b over which the rotor tabs are set apart from the U-phase stator 202U and the W-phase stator 202W along the radial direction, as shown in FIGS. 23A and 23B. This balancing means is formed by notching each rotor tab at both ends located along the axial direction facing opposite the U-phase stator 202U and the W-phase stator 202W in a tapered shape. Other structural features of the seventh embodiment are substantially identical to those of the first embodiment and thus, a repeated explanation is omitted. While the rotor tabs assume a substantially trapezoidal shape over their outer circumferential surfaces, they may assume a continuously projecting shape or a staged projection shape instead.

As described above, with the balancing means achieved in the seventh embodiment by setting a smaller clearance between the stator tab magnetic poles at the stator cores at the phase stator at the middle position and the rotor 302 compared to the clearance between the rotor 302 and the stator magnetic poles of the stator cores at the phase stators disposed at the two ends along the axial direction, the magnetic reluctance attributable to the clearance between the rotor 302 and the phase stator at the middle position is reduced relative to the magnetic reluctance attributable to the clearance between the rotor 302 and the phase stators disposed at the two ends along the axial direction, thereby allowing the magnetic flux to pass more easily through the clearance between the rotor and the phase stator at the middle position. As a result, the extent of discrepancy among the levels of the voltages induced in correspondence to the individual phases can be minimized. In addition, the balancing means can be formed simply by machining rotor tab magnetic poles in the related art without requiring any additional parts or redesign of parts. In particular, by forming the rotor tab magnetic poles so as to achieve a tapered shape or a continuously projecting shape over their outer circumferential surfaces without creating any stage at the rotor tab magnetic poles, a sufficient level of strength to withstand any centrifugal force that may apply thereto can be assured.

Eighth Embodiment

Figure 24A:
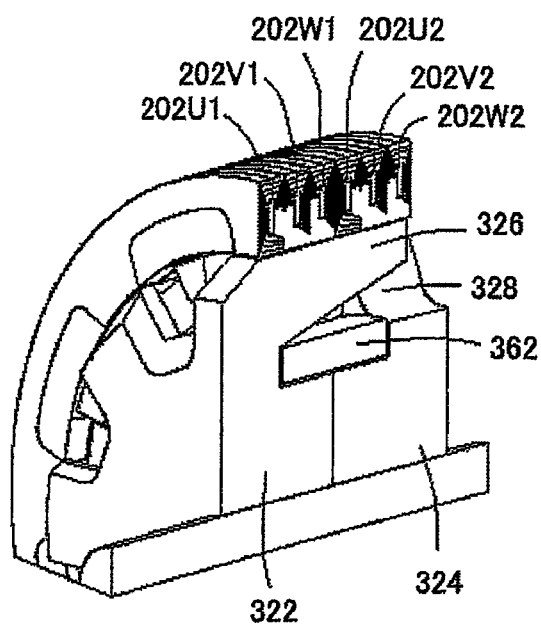
FIGS. 24A to 24D illustrate the rotor and the stator achieved in an eighth embodiment.
Figure 24B:
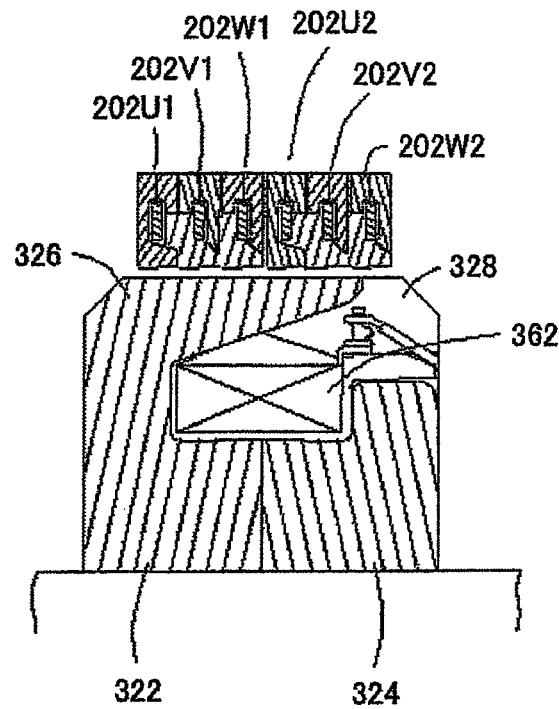
Figure 24C:
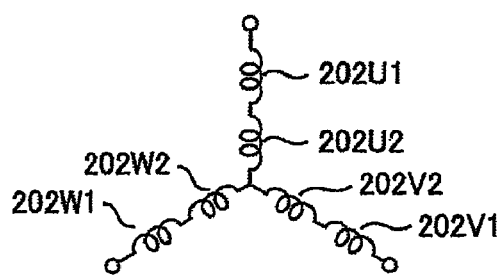
Figure 24D:
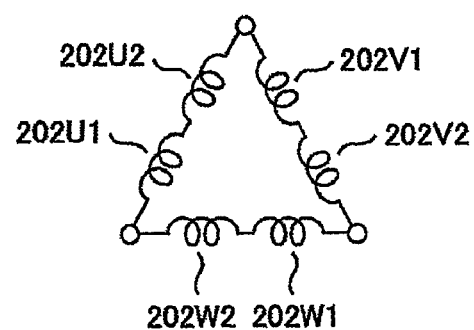

The eighth embodiment of the present invention is explained in reference to FIGS. 24A and 24B. FIG. 24A is a perspective of the rotor 302 and the stator 202 achieved in the eighth embodiment in a sectional view taken through their side surfaces and FIG. 24B is a sectional view taken through the side surfaces of the rotor 202 and the stator 302. FIG. 24C presents an example of a connection pattern through which the stator coil 206 may be connected in the eighth embodiment. FIG. 24D presents another example of a connecting pattern that may be adopted when connecting the stator coil 206 in the eighth embodiment. It is to be noted that the same terms and reference numerals are assigned to structural elements identical to those in the first embodiment to preclude the necessity for a repeated explanation thereof.

In the eighth embodiment, a pair of phase stators are installed in correspondence to each of the U-phase, the V-phase and the W-phase. Namely, as shown in FIGS. 24A and 24B, six phase stators are disposed side-by-side via link plates 216 in the order of a first U-phase stator 202U1, a first V-phase stator 202V1, a first W-phase stator 202W1, a second U-phase stator 202U2, a second V-phase stator 202V2 and a second W-phase stator 202W2, starting from one end along the axial direction. In addition, the stator coil 206 of the phase stators corresponding to a given phase among the various phase stators are connected in series, as shown in FIGS. 24C and 24D. The stator coils corresponding to the various phases may be connected through a star connection as shown in FIG. 24C or a delta (Δ) connection as shown in FIG. 24D. The extent of discrepancy among the levels of the outputs in the individual phases is minimized by adopting the structure described above in the eighth embodiment.

As described earlier, the level of the voltage induced at a phase stator other than the phase stators disposed at the two ends along the axial direction is greater, i.e., the voltage induced at the phase stator at the middle position is greater. In particular, a greater extent of leakage flux occurs at a phase stator disposed with a plurality of other phase stators present next to it or disposed between other phase stators than at a phase stator disposed next to just one other phase stator. For this reason, the voltages induced via the first U-phase stator 202U1 and the second W-phase stator 202W2 located at the two ends along the axial direction are the highest, and the level of the voltages induced at the first V-phase stator 202V1 and the second V-phase stator 202V2, each having a single phase stator set adjacent thereto at one end thereof and a plurality of phase stators disposed at the other end thereof is even lower than the level of the voltages induced via the first U-phase stator 202U1 and the second W-phase stator 202W2. In addition, the level of the voltages induced via the first W-phase stator 202W1 and the second U-phase stator 202U2, each having a plurality of stators 202 disposed on both ends thereof, is lower than the level of the voltages induced via the first V-phase stator 202V1 and the second V-phase stator 202V2. In other words, the levels of the voltages induced at the first U-phase stator 202U1 and the second W-phase stator 202W2, substantially equal to each other, are higher than the levels of the voltages induced at the first V-phase stator 202V1 and the second V-phase stator 202V2. The levels of the voltages induced at the first V-phase stator 202V1 and the second V-phase stator 202V2, substantially equal to each other, are higher than the levels of the voltages induced at the first W-phase stator 202W1 and the second U-phase stator 202U2, substantially equal to each other. By connecting the phase stator coils corresponding to a single phase in series, as shown in the figures, the levels of the voltages induced via the stator coils in the phases are substantially equalized.

The structure (balancing means) achieved in the eighth embodiment for minimizing the discrepancy among the output levels corresponding to the individual phases is summarized as follows. A plurality of sets of phase stators are provided, the stators in the different phases are disposed starting from one end in a uniform sequence along the axial direction in all the sets and the stator coil 206 corresponding to a given phase are connected in series. Thus, instead of striking a balance by lowering the voltages induced at the stator coil 206 in a specific phase, the discrepancy is minimized, i.e., the voltage levels are balanced out with the voltages induced at the stator coil 206 in all the phases raised as a whole. It is to be noted that the levels of the voltages induced in the eighth embodiment may be further improved by installing permanent magnets with a uniform thickness, different from those in the second through fourth embodiments, each covering the entire range between adjacent rotor tabs facing opposite the stators or by minimizing the gap between the inner circumferential surfaces of the stator cores and the outer circumferential surface of the corresponding rotor magnetic poles.

Ninth Embodiment

Figure 25A:
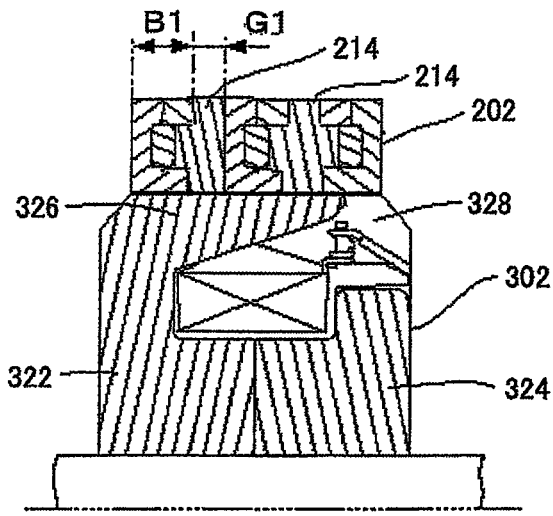
FIGS. 25A to 25C illustrate the rotor and the stator achieved in a ninth embodiment.
Figure 25B:
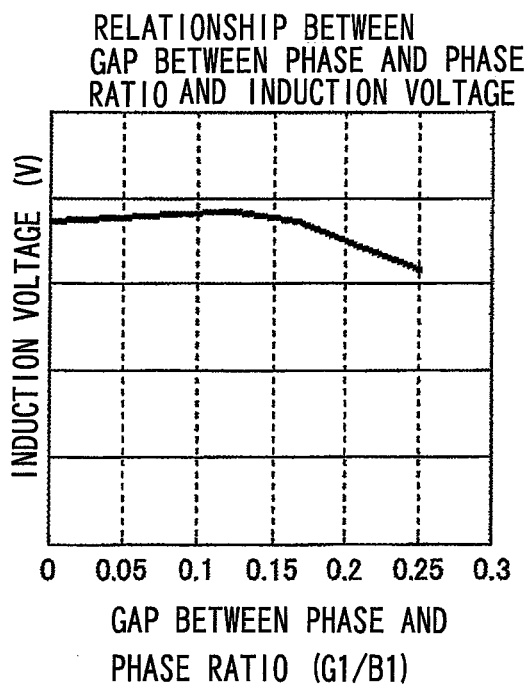
Figure 25C:
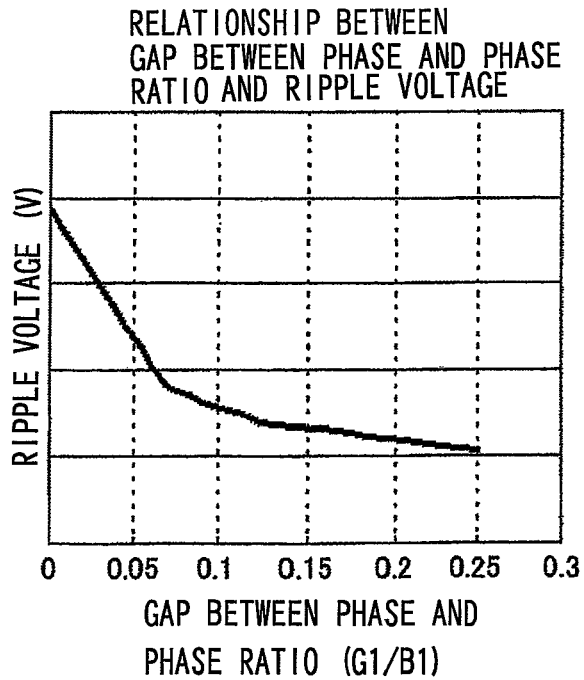

The ninth embodiment of the present invention is explained in reference to FIGS. 25A and 25B. FIG. 25A is a sectional view of the rotor 302 and the stator 202 achieved in the ninth embodiment taken through their side surfaces. FIG. 25B presents a graph indicating the relationship between the ratio of the distance G1 between the individual phase stators relative to the width B1 of the phase stators measured along the axial direction, i.e., the gap between phase and phase (G1/B1) and the induction voltage. FIG. 25C presents a graph indicating the relationship between the gap between phase and phase (G1/B1) and the ripple voltage. It is to be noted that the same terms and reference numerals are assigned to structural elements identical to those in the first embodiment to preclude the necessity for a repeated explanation thereof.

A structure with a function similar to that of the balancing means described earlier is formed in the ninth embodiment by increasing the gap G1 between the individual phase stators, measured along the axial direction, in the stator 202 over that set in the first embodiment, as shown in FIG. 25A. In the ninth embodiment, the space between the individual phase stators is filled with a resin instead of disposing the link plates 216 between them. While the leakage flux occurring between the individual phase stators can be reduced by setting a greater gap G1 between the individual phase stators in the stator 202 along the axial direction, this structure is bound to increase the length of the rotor 302 along the axial direction. If the gap G1 is increased without allowing the rotor 302 to assume a greater length along the axial direction beyond a certain range, the length B1 of each phase stator 202 along the axial direction will have to be reduced.

FIGS. 25B and 25C present the results of tests conducted to determine the relationship between the gap between phase and phase (G1/B1), which is the ratio of the gap G1 and the length B1 of the individual stators 202 measured along the axial direction and the level of the induction voltage. In the graph presented in FIG. 25(b), the gap between phase and phase (G1/B1) is indicated along the horizontal axis and the voltage value representing the sum of the average voltages induced at the individual phase stators is indicated along the vertical axis. FIG. 25B indicates that when the gap between phase and phase (G1/B1) is equal to or less than approximately 0.2, a satisfactory level of voltage can be induced. In addition, the waveform in FIG. 25B indicates that the induction voltage level, which peaks in the gap between phase and phase (G1/B1) range of 0.13~0.15 starts to become lower beyond this range. In short, a satisfactory level of voltage can induced with the gap between phase and phase (G1/B1) set equal to or less than 0.2. It is desirable to set the gap between phase and phase specifically equal to or less than 0.15 and it is even more desirable to set the gap between phase and phase equal to or less than 0.13.

However, if the gap between phase and phase (G1/B1) is set to an excessively small value, the level of the voltage induced at the V-phase stator, i.e., the phase stator at the middle position, becomes lowered, as shown in FIG. 17A, leading to a concern that the voltage value representing the sum of the voltages induced in correspondence to the individual phases may become smaller. In the graph presented in FIG. 25C, the gap between phase and phase (G1/B1) is indicated along the horizontal axis and the ripple voltage, which represents the fluctuation of the DC voltage resulting from the conversion, is indicated along the vertical axis. FIG. 25C indicates that when the gap between phase and phase (G1/B1) is equal to or less than 0.05, the level of the ripple voltage is significant, whereas as long as the gap between phase and phase (G1/B1) is equal to or greater than 0.05, the required level of induction voltage can be output without raising the ripple voltage. In addition, once the gap between phase and phase (G1/B1) exceeds 0.07, the ripple voltage starts to stabilize and the ripple voltage becomes reasonably stable when the gap between phase and phase (G1/B1) is approximately 0.1.

As described above, the gap between phase and phase (G1/B1) is set within the range of 0.05~0.2 in the ninth embodiment so as to output a sufficiently high level of induction voltage without manifesting a significant ripple voltage. The embodiment also proves that the level of induction voltage can be raised by setting the gap between phase and phase (G1/B1) within the range of 0.07~0.15. It is even more desirable to set the gap between phase and phase (G1/B1) at 0.1~0.13.

Tenth Embodiment

Figure 26A:
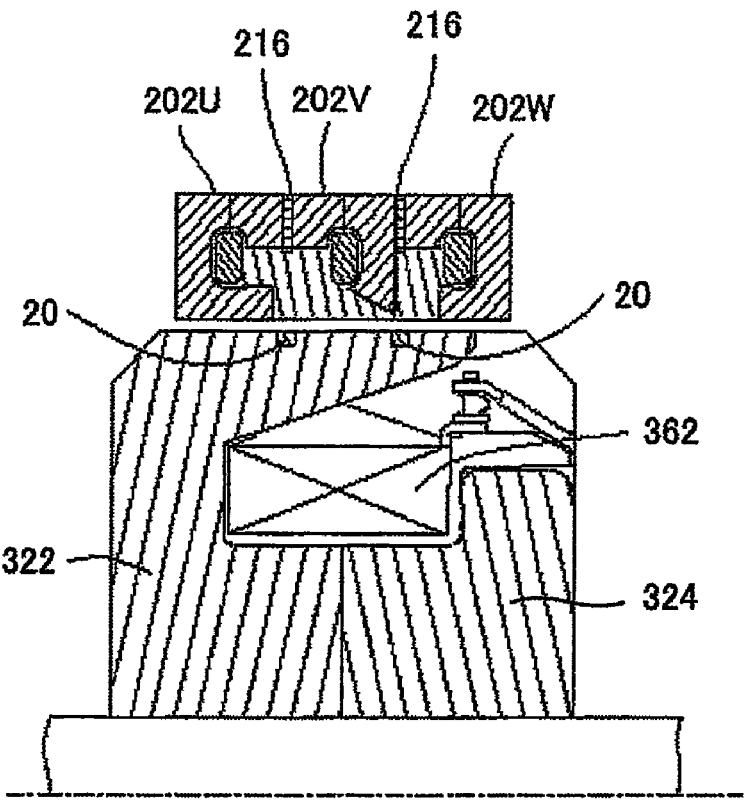
FIGS. 26A and 26B illustrate the rotor and the stator achieved in a tenth embodiment.
Figure 26B:
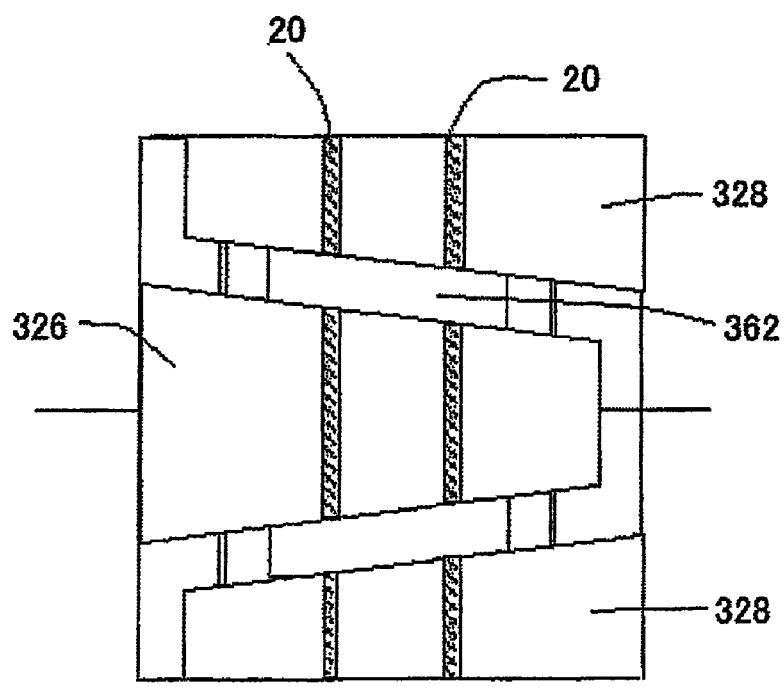

The tenth embodiment of the present invention is explained in reference to FIGS. 26A and 26B. FIG. 26A is a sectional view of the rotor 302 and the stator 202 achieved in the tenth embodiment taken through their side surfaces. FIG. 26B shows the rotor 302 achieved in the tenth embodiment viewed from the outer circumferential side. It is to be noted that the same terms and reference numerals are assigned to structural elements identical to those in the first embodiment to preclude the necessity for a repeated explanation thereof.

At the rotor 302 in the tenth embodiment, insulating grooves 20 extending along the circumferential direction are formed at the outer circumferential side surfaces of the individual rotor tabs 326 and 328 and these insulating grooves 20 are filled with a nonmagnetic material such as resin. The insulating grooves 20 should have, for instance, a rectangular section. At each rotor tab, an insulating groove 20 is formed over an area facing opposite the link plate 216 disposed between the U-phase stator 202U and the V-phase stator 202V and another insulating groove 20 is formed over the area facing opposite the link plate 216 disposed between the V-phase stator 202V and the W-phase stator 202W, with the insulating grooves 20 assuming a width slightly greater than the thickness of the link plates 216. It is to be noted that since other structural features are substantially identical to those in the first embodiment, a repeated explanation is not provided. The width of the insulating grooves 20 should be set within a range of 0.5 mm~3 mm and it is particularly desirable to set it to approximately 1 mm.

As described above, the insulating grooves 20 are formed at each of the rotor tabs 326 and 328 in the rotor 302 at positions facing opposite the spaces between the individual phase stators, so as to ensure that magnetic fluxes from the individual phase stators 202 are allowed to travel around the field coil 362 by reducing the extent of leakage flux from a given phase stator to another phase stator via the surface of the rotor 302. As a result, the extent of discrepancy among the levels of voltages induced in correspondence to the various phases can be reduced, which, in turn, increases the overall power output. In addition, any eddy current that may occur at the surface of a rotor tab 326 or 328 can be reduced via the insulating grooves 20 and thus, the presence of the insulating grooves 20 assures improved power generation efficiency.

While the insulating grooves 20 are filled with a nonmagnetic material in the tenth embodiment, no such filler is needed in the insulating grooves 20 as long as a sufficient level of rotor tab strength can be assured. With air instead of a nonmagnetic material filling the insulating grooves, the extent of leakage flux can still be reduced and an added advantage will be achieved in that since no nonmagnetic material is used as a filler, the production costs are reduced.

Eleventh Embodiment

Figure 27A:
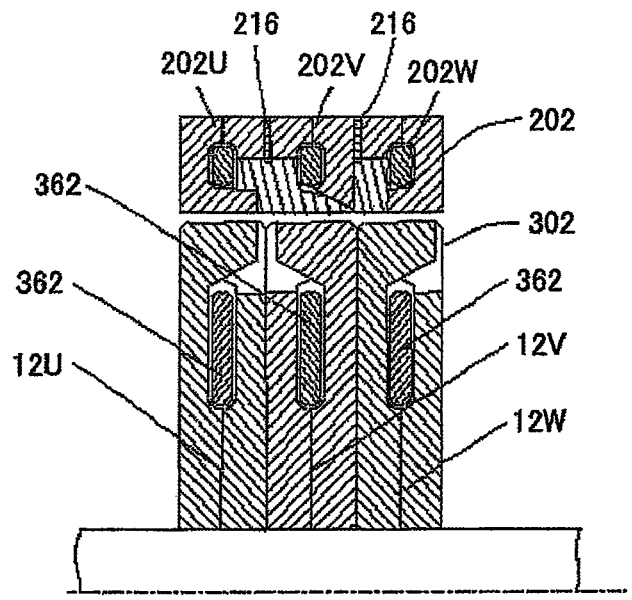
FIGS. 27A to 27C illustrate the rotor and the stator achieved in an eleventh embodiment.
Figure 27B:
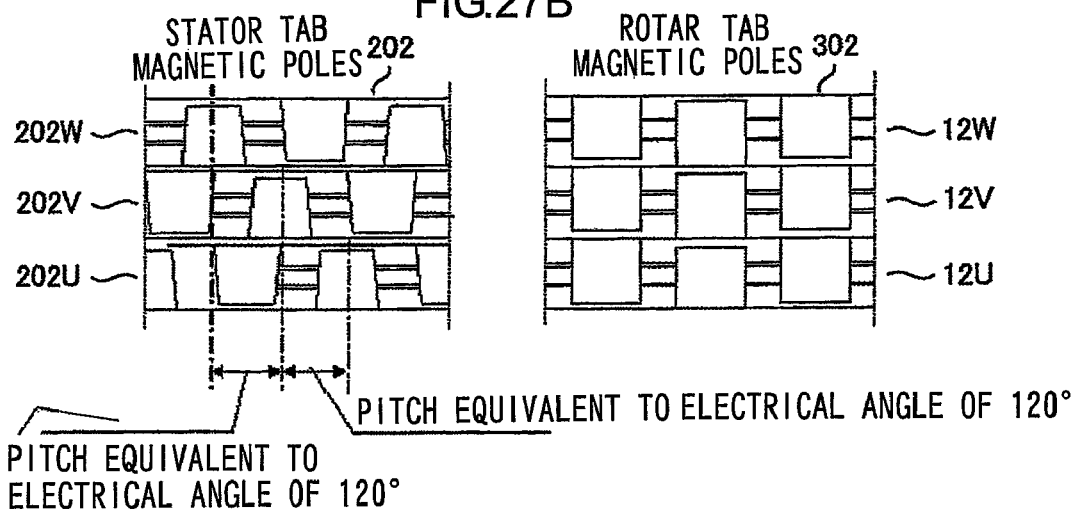
Figure 27C:
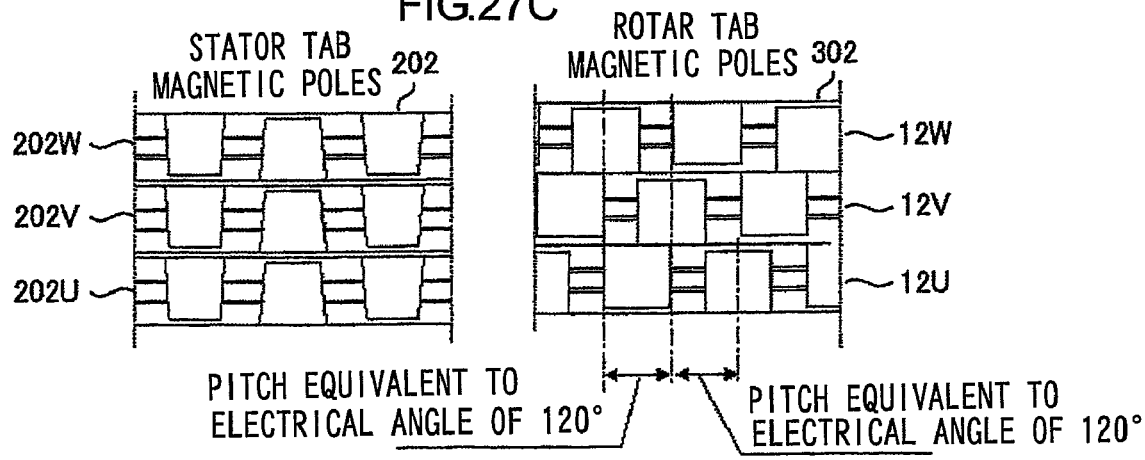

The eleventh embodiment of the present invention is explained in reference to FIGS. 27A and 27B. FIG. 27A is a sectional view of the rotor 302 and the stator 202 achieved in the eleventh embodiment taken through their side surfaces. FIG. 27B shows a positional arrangement that may be assumed for the rotor tabs 326 and 328 and the stator tabs 238 and 258 in the eleventh embodiment. FIG. 27C shows an alternative positional arrangement that may be assumed for the rotor tabs 326 and 328 and the stator tabs 238 and 258 in the eleventh embodiment. It is to be noted that the same terms and reference numerals are assigned to structural elements identical to those in the first embodiment to preclude the necessity for a repeated explanation thereof.

The rotor 302 in the eleventh embodiment is split into three separate portions each in correspondence to the U-phase stator 202U, the V-phase stator 202V or the W-phase stator 202W. The length of each split rotor measured along the axial direction is set to one third of the length of the rotor 302 in the first embodiment shown in FIGS. 1 through 16. Accordingly, the rotor tabs 326 and 328 at each split rotor, too, are formed to range along the axial direction over a length approximately one third of the length of the rotor tabs in the first embodiment and field coils 362 with the number of turns thereof set smaller than that in the first embodiment are provided. The rotor 302 is constituted with the three split rotors 12U, 12V and 12W structured as described above disposed side-by-side.

As shown in FIG. 27B, the stator tabs 238 and 258 are disposed as in the first embodiment with the stator tabs at the U-phase stator 202U, the V-phase stator 202V and the W-phase stator 202W offset along the circumferential direction by an electrical angle of 120° relative to one another. The rotor tabs at the individual split rotors 12U, 12V and 12W, on the other hand, are set without any electrical angle offset in alignment along the circumferential direction.

With the rotor 302 constituted with split rotors each in correspondence to one of the phase stators 202, the magnetic fluxes are allowed to travel around independently of one another, thereby balancing out the levels of the induction voltages. However, there is an issue to be addressed in that a sufficient number of turns cannot be assured with ease at the split rotor windings, leading to a concern that the output characteristics at a low rotation rate may be poorer compared to those achieved in the first embodiment.

While the stator tabs corresponding to the individual phases are disposed with an offset by an electrical angle of 120° and the rotor tabs at the split rotors 12U, 12V and 12W are disposed with no electrical angle offset in the structure illustrated in FIG. 27B, the stator tabs corresponding to the individual phase may be set without any electrical angle offset and the rotor tabs at the split rotors 12U, 12V and 12W may be offset by 120° electrical of angle, as shown in FIG. 27C. As explained earlier, while the structural examples illustrated in FIGS. 27B and 27C are advantageous in that they assure better control over the outputs in the individual phases, there is an issue yet to be addressed in that since they include split rotor windings, it is difficult to assure a sufficient number of turns at the split rotor windings, leading to a concern that the output characteristics at a low rotation rate may not be as good as those achieved in first embodiment.

Twelfth Embodiment

Figure 28A:
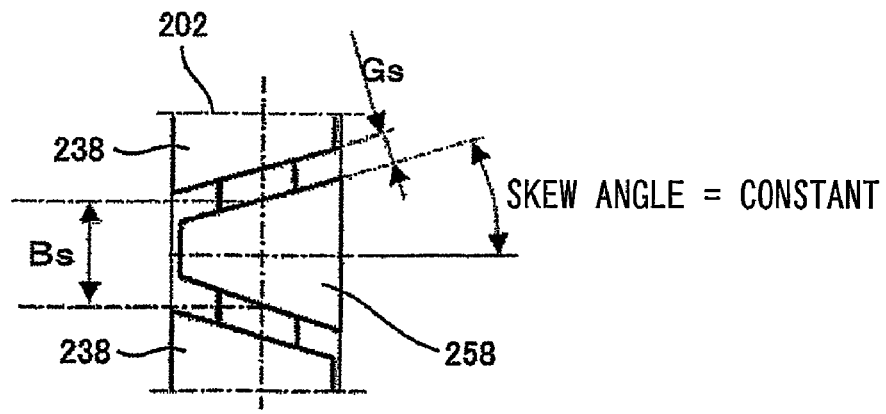
FIGS. 28A to 28C illustrate the magnetic poles of the stator tabs achieved in a twelfth embodiment.
Figure 28B:
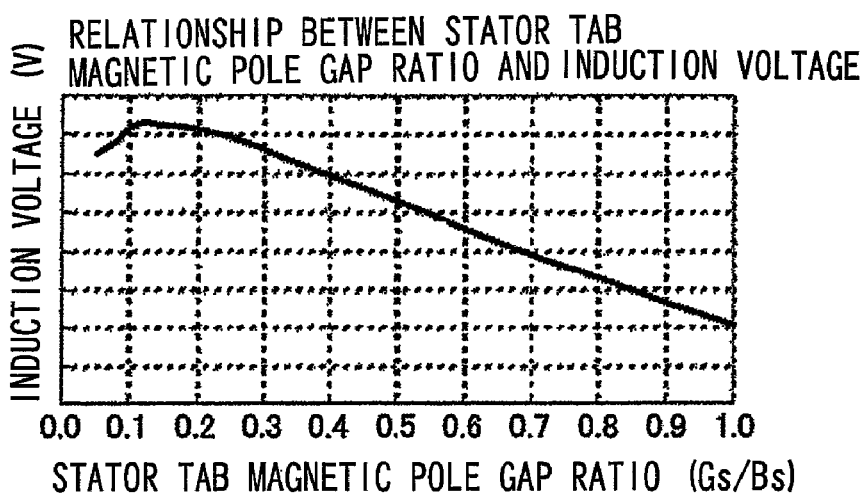
Figure 28C:
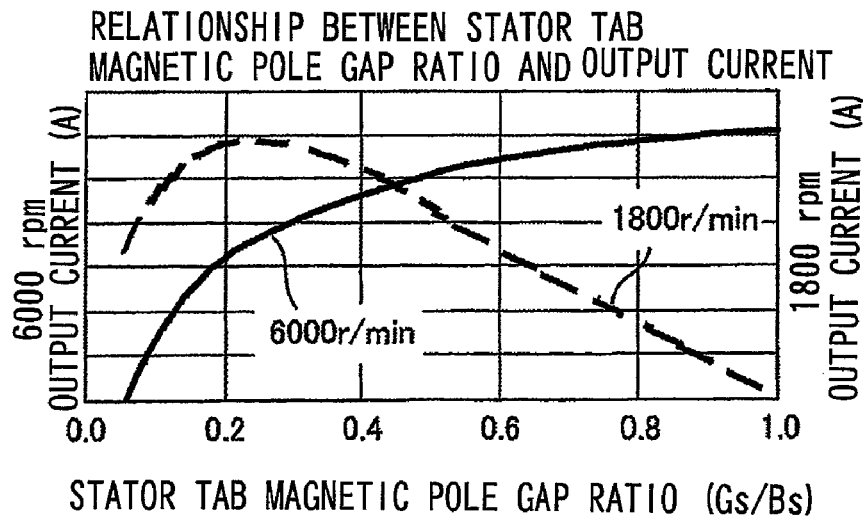

The ideal skew to be assured at the stator tabs in the first embodiment, which may be determined in relation to the output characteristics, is examined in reference to FIGS. 28A to 28C illustrating the twelfth embodiment. FIG. 28A presents a specific example of the stator tabs achieved in the first embodiment. FIG. 28B presents a graph indicating the relationship between the ratio related to the gap between the stator tabs and the induction voltage. FIG. 28C presents a graph indicating the relationship between the gap ratio related to the gap between the individual stator tabs and the output current. It is to be noted that the same terms and reference numerals are assigned to structural elements substantially identical to those in the first embodiment to preclude the necessity for a repeated explanation thereof.

FIG. 28B presents the results of a test conducted to determine how the induction voltage output changed as the value of the stator tab gap ratio (Gs/Bs) representing the ratio of the gap Gs between the individual tabs at each phase stator in the stator 202 and the width of the stator tabs measured along the circumferential direction at a specific middle position substantially halfway through along the axial direction, used as a parameter, was altered. It is to be noted that the test, the results of which are presented in FIG. 28B, was conducted with the skew angles of the individual tabs at the phase stators set to a uniform value and with the state of the rotor remaining constant. FIG. 28B indicates that a higher level of voltage is induced when the stator tab gap ratio (Gs/Bs) is set within a range of 0.05~0.3, that the induction voltage level peaks when the stator tab magnetic pole gap ratio (Gs/Bs) is approximately 0.15, and that there is a tendency for the induction voltage level to fall as the stator tab gap ratio (Gs/Bs) is either increased or decreased relative to 0.15. In other words, FIG. 28B indicates that the level of induction voltage can be increased by selecting a value within the range of 0.1~0.2 for the stator tab gap ratio (Gs/Bs).

Next, the inductances of the stator coils are examined. Since the inductances at the stator coils affect the output currents, the relationship between the inductances and the stator tab gap ratio (Gs/Bs) is examined. With L(H) representing the inductance at the stator coil 206 in a given phase stator and $S(mm^2)$ representing the area over which the magnetic poles face opposite each other, the relationship between the inductance and the stator tab gap ratio (Gs/Bs) may be expressed as in (3) below. Expression (3) indicates that the inductance increases as the stator tab gap ratio (Gs/Bs) becomes smaller.

$$L \propto \frac{S}{Gs} \tag{3}$$

With I(A) representing the output current corresponding to a given phase, $E_0$(V) representing the no-load induction voltage under no-load conditions in correspondence to the given phase, Vb(V) representing the battery voltage, r(Ω) representing the stator coil resistance and ω(rad/(S)) representing the angular velocity of the rotor, the output current corresponding to the given phase is expressed as in (4) below. Expression (4) indicates that the output current corresponding to a single phase is in reverse proportion to the product of the inductance and the angular velocity. Since the relationship between the stator tab gap Gs with which the stator tabs 238 and 258 are set and the output current is affected by the rotation rate at the rotor, the relationship needs to be examined in correspondence to two different conditions, i.e., when the rotor is rotating at high speed and when the rotor is rotating at low speed.

$$I \propto \frac{E_0 - Vb}{\sqrt{R^2 + \omega^2 L^2}} \tag{4}$$

FIG. 28C shows the relationships between the stator tab magnetic pole gap ratio (Gs/Bs) and the output current; one observed while the rotor 302 rotates at 6000 rpm and the other observed as the rotor 302 rotates at 1800 rpm. FIG. 28C indicates that a desirable output current is obtained at 1800 rpm by selecting the gap ratio within a range of 0.2~0.3, whereas a significant output current is obtained at 6000 rpm with the gap ratio set to 0.8 or greater. At a higher rotation rate, the inductance can be reduced and thus, a greater output current can be obtained by selecting a greater value for the gap ratio. A relatively good output can be provided in both rotation rate ranges by selecting a value within range of 0.3~0.7 for the stator tab gap ratio (Gs/Bs). In correspondence to the gap ratio set within this range, a desirable output can be obtained both at a low rotation rate and at a higher rotation rate. In particular, by setting the stator tab gap ratio (Gs/Bs) to a value within a range of 0.4~0.5, a significant output current is assured at low speed and also desirable output characteristics are achieved at high speed.

As explained above, by taking into consideration the ideal range indicated in FIG. 28B and the ideal range indicated in FIG. 28C, it may be concluded that a high level of voltage can be induced with a value within the range of 0.1~0.3 selected for the stator tab gap ratio (Gs/Bs). However, the output current obtained in correspondence to this gap ratio range may not always be in the optimal range, depending upon the rotation rate of the rotor. While the range over which a higher level of voltage is induced should be selected for a rotating electrical machine such as a motor, priority should be given to the level of the output current in an alternator for vehicle such as that in the embodiment. Accordingly, the stator tab gap ratio range over which a greater output current is provided is 0.3~0.7. In particular, by selecting a value within the range of 0.4~0.5 for the stator tab gap ratio (Gs/Bs), even better current output characteristics are achieved.

Thirteenth Embodiment

Figure 29A:
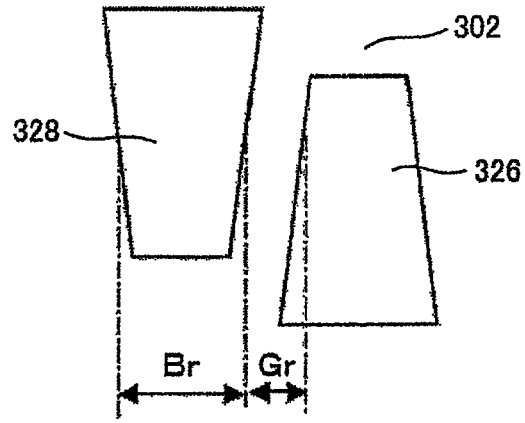
FIGS. 29A to 29C illustrate the magnetic poles of the rotor tabs achieved in a thirteenth embodiment.
Figure 29B:
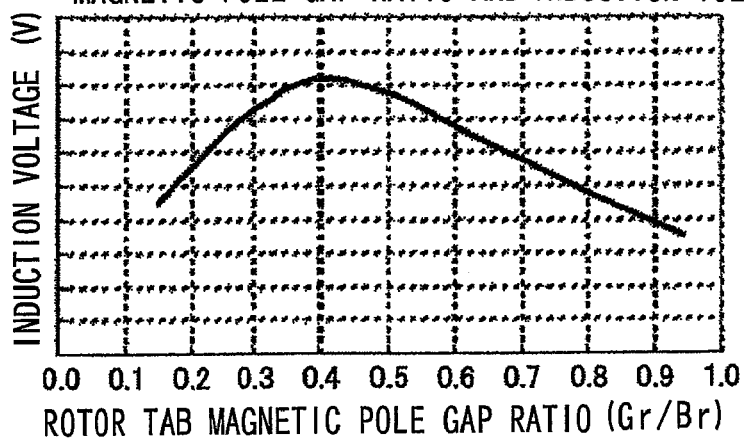
Figure 29C:
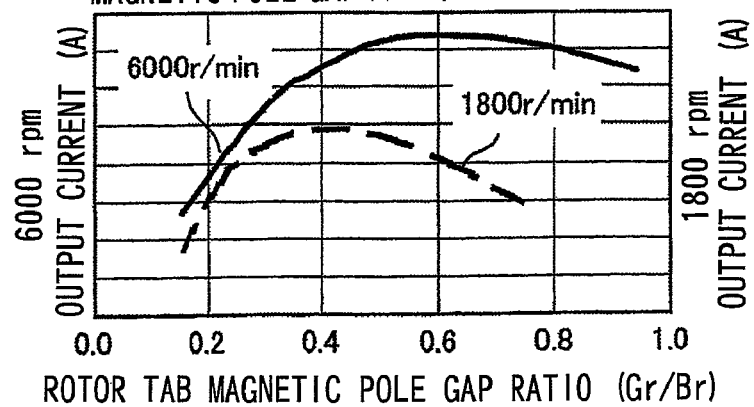

The ideal interval between the individual rotor tabs in the first embodiment, which may be selected in relation to the output characteristics, is examined in reference to FIGS. 29A to 29C illustrating the thirteenth embodiment. FIG. 29A shows rotor tabs viewed from the side facing the stator. The tabs in the figure assume a uniform shape and the relationship between a rotor tab 326 and another rotor tab 328 is the same as the relationship between a rotor tab 328 and another rotor tab 326. FIG. 29B presents a graph indicating the relationship between the rotor tab gap ratio and the level of induction voltage. FIG. 29C presents a graph indicating the relationship between the rotor tab gap ratio and the output current. Since other structural elements are identical to those in the first embodiment, their explanation is omitted.

FIG. 29B presents the results of a test conducted to determine how the induction voltage output changed as the value of the rotor tab gap ratio (Gr/Br), representing the ratio of the gap Gr between the individual rotor tabs at the rotor 302 and the width of the rotor tabs measured along the circumferential direction at a specific middle position substantially halfway through the rotor tabs along the axial direction and used as a parameter, was altered. It is to be noted that the test, the results of which are presented in FIG. 29B, was conducted by sustaining the stator 202 in a steady state.

FIG. 29B indicates that a desirable level of output is obtained by selecting a value within the range of 0.2~0.75 for the rotor tab gap ratio (Gr/Br). An even more desirable level of induction voltage can be output by selecting a value within a narrower range of 0.3~0.6 for the gap ratio (Gr/Br). In particular, the induction voltage peaks when the rotor tab gap ratio (Gr/Br) is approximately 0.4 and the level of the induction voltage drops as the rotor tab gap ratio (Gr/Br) is either increased or decreased relative to approximately 0.4. As FIG. 29B clearly indicates, a highly desirable level of voltage can be induced by selecting a value within a range of 0.35~0.45 for the rotor tab gap ratio (Gr/Br).

It is to be noted that while the induction voltage level was measured by adjusting the parameter constituted with the rotor tab gap ratio (Gr/Br) without altering the conditions at the stator 202 in the test conducted in the thirteenth embodiment, the tendency with regard to the relationship between the rotor tab gap ratio (Gr/Br) and the induction voltage remains unchanged even if the stator tab gap ratio (Gs/Bs) is altered, as in the twelfth embodiment. In other words, adjustment in the stator tab gap ratio will simply change the absolute value but the tendency itself will remain unchanged. For this reason, the rotor tab gap ratio (Gr/Br) as a factor affecting the voltage level can be examined accurately. Namely, even when the gap ratio at the stator 202 is altered, the level of the induction voltage can be improved simply by selecting a value within the numerical value range indicated above for the rotor tab gap ratio (Gr/Br). Similar logic applies in the twelfth embodiment. Namely, even if the rotor tab gap ratio (Gr/Br) is altered, the tendency with regard to the relationship between the stator tab gap ratio (Gs/Bs) and the induction voltage level is hardly affected. These facts allow us to conclude that a further improvement in the level of the induction voltage and the like can be achieved by selecting conditions satisfying both requirements set forth in the twelfth embodiment and in the thirteenth embodiment.

As in the twelfth embodiment in which the relationship between the stator tab gap ratio and the output current is examined, the relationship between the rotor tab gap ratio (Gr/Br) and the output current, too, should be examined in correspondence to different inductance levels and different stator rotation speeds.

FIG. 29C shows the relationships between the rotor tab gap ratio (Gr/Br) adjusted as a parameter and the output current; one observed while the rotor 302 rotates at 6000 rpm and the other observed as the rotor 302 rotates at 1800 rpm. FIG. 29C indicates that a desirable output current can be obtained in both rotation speed ranges by selecting a value within a range of 0.1~0.8 for the rotor tab gap ratio (Gr/Br), that even better output characteristics can be achieved within the range of 0.2~0.7 for the rotor tab gap ratio and that the optimal rotor tab gap ratio range is 0.3~0.6.

By incorporating the desirable range indicated in FIG. 29B and the optimal range indicated in FIG. 29C, the range of 0.2~0.7 should be selected as the most desirable range for the rotor tab gap ratio (Gr/Br), over which a significant level of voltage can be induced and, at the same time, a well-balanced output current can be provided regardless of whether the rotor 302 is rotating as high-speed or low speed.

Fourteenth Embodiment

Figure 30A:
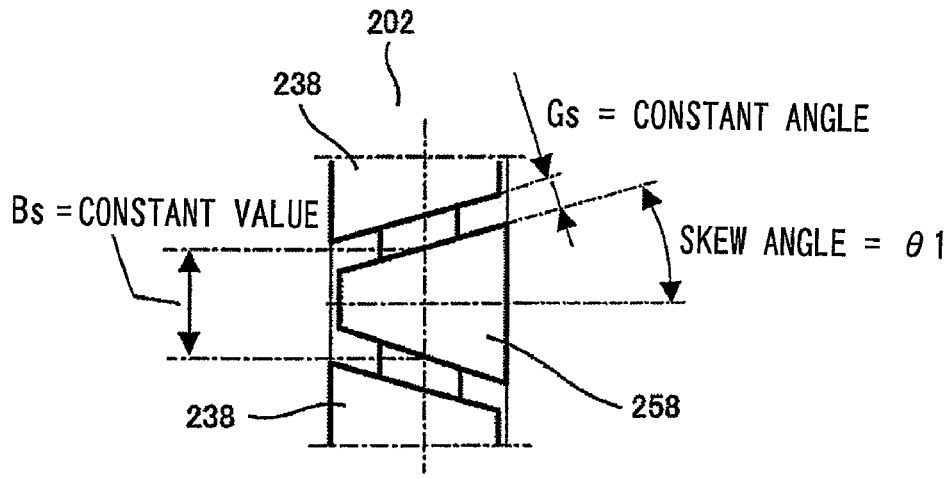
FIGS. 30A to 30C illustrate the magnetic poles of the stator tabs achieved in a fourteenth embodiment.
Figure 30B:
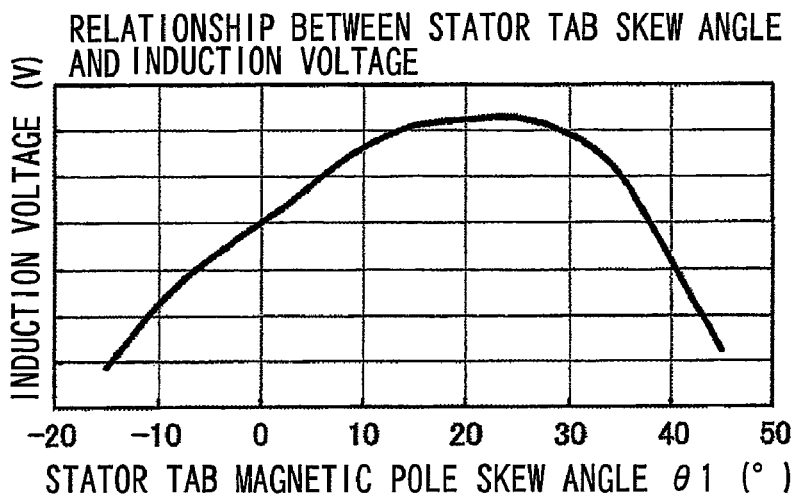
Figure 30C:
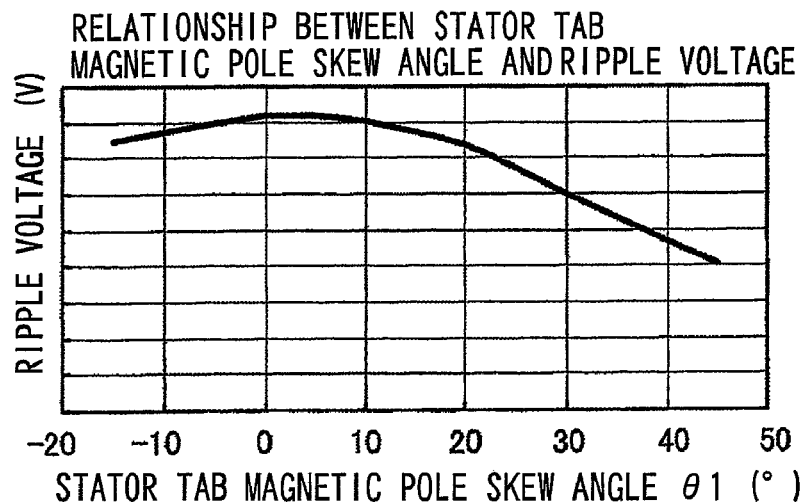

The ideal skew at the stator tabs in the first embodiment, which may be selected in relation to the power generation characteristics, is examined in reference to the 14th embodiment. FIG. 30A shows stator tabs achieved in the 14th embodiment. FIG. 30B presents a graph indicating the relationship between the skew angle assumed at the stator tabs and the induction voltage. FIG. 30C presents a graph indicating the relationship between the stator tab skew angle and the ripple voltage. The same terms and reference numerals are assigned to structural elements identical to those in the first embodiment so as to preclude the necessity for a reputed explanation thereof.

In reference to FIG. 30B, the change occurring in the induction voltage output as a parameter θ1, representing the skew angle assumed for the stator tabs 238 and 258 at the stator 202, is altered, is explained. It is assumed that the relationship shown in FIG. 30B is observed by selecting a uniform value for the width Bs at the individual stator tabs measured along the circumferential direction near the centers of the stator tabs along the rotation axis, selecting a uniform value for the gap Gs between the individual stator tabs and sustaining the rotor 302 in a steady condition. As indicated in FIG. 30B, a desirable level of induction voltage can be output by selecting a skew angle θ1 within a range of 0°~38° for the stator tabs. The induction voltage peaks with the skew angle θ1 set close to 25° and the induction voltage level becomes lower as the skew angle θ1 either increases or decreases relative to 25°. As FIG. 30B clearly indicates, a higher level of voltage can be induced by selecting an angle within a range of 6~35° for the skew angle θ1 and even more desirable characteristics can be achieved with the skew angle θ1 set within a range of 10~30°.

FIG. 30C indicates a tendency whereby once the skew angle θ1 at the stator tabs becomes equal to or greater than 10°, the ripple voltage starts to decrease. The test conducted in the embodiment demonstrates that by selecting an angle within the range of 10~38° for the stator tab skew angle θ1, a very good current output can be obtained while suppressing the ripple voltage. In particular, by selecting an angle within a narrower range of 10~30° for the skew angle θ1, an even more desirable output can be obtained.

Fifteenth Embodiment

Figure 31A:
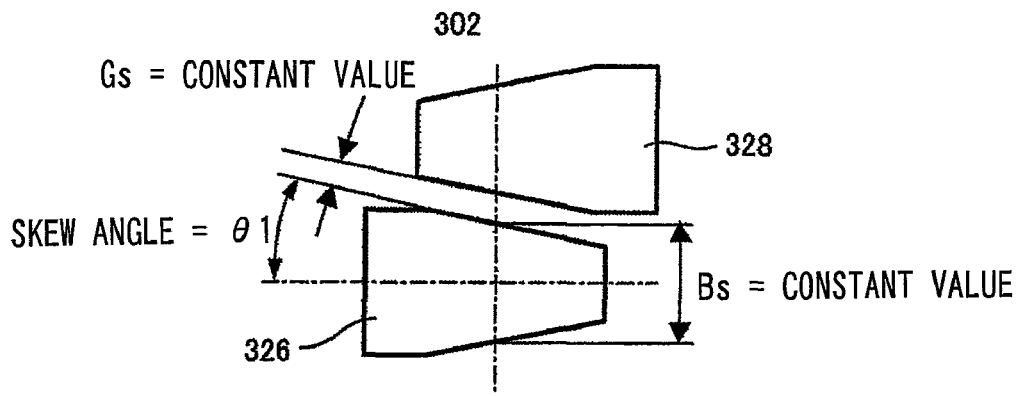
FIGS. 31A to 31C illustrate the magnetic poles of the rotor tabs achieved in a fifteenth embodiment.
Figure 31B:
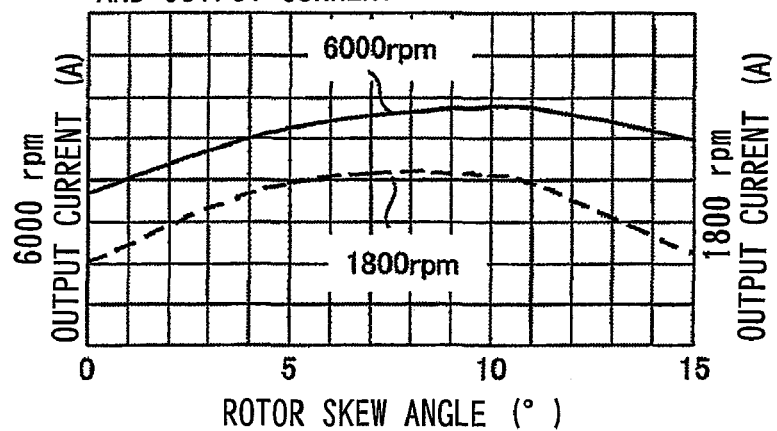
Figure 31C:
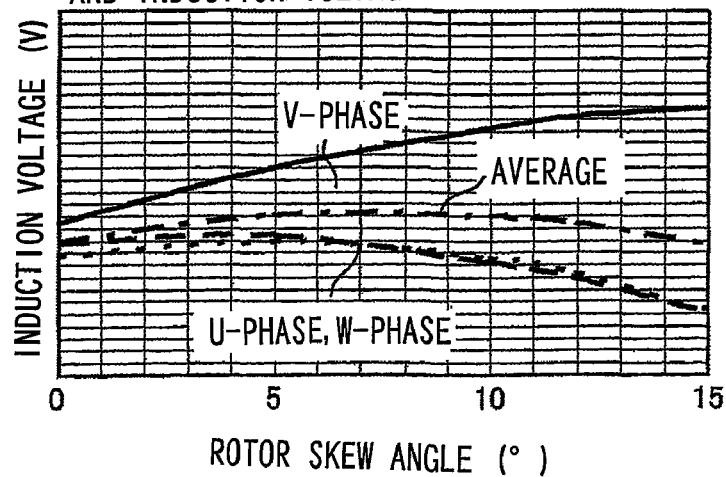

The fifteenth embodiment of the present invention is now explained in reference to FIGS. 31A and 31B. FIG. 31A shows rotor tabs achieved in the fifteenth embodiment, in reference to which the relationship of the state of skew assumed at the rotor tabs in the first embodiment to the output characteristics is explained below. FIG. 31B presents a graph indicating the relationship between the skew angle assumed for the rotor tab magnetic poles and the output current. FIG. 31C presents a graph indicating the relationship between the rotor tab skew angle and the induction voltage. It is to be noted that the same terms and reference numerals are assigned to structural elements identical to those in the first embodiment to preclude the necessity for a reputed explanation thereof. In reference to FIG. 31B, the change occurring in the output current as a parameter θ1, representing the skew angle assumed for the rotor tabs at the rotor 302 is altered, is explained. It is assumed that the relationship shown in FIG. 31B is observed by selecting a uniform value for the width Bs at the individual rotor tabs measured along the circumferential direction near the centers of the rotor tabs along the axial direction and selecting a uniform value for the gaps Gs between the individual rotor tabs and sustaining the stator 202 in a steady condition.

As indicated in FIG. 31B, a desirable level of electrical current can be output by selecting a skew angle θ1 within a range of 5°~13° for the rotor tabs. The output current peaks with the skew angle θ1 set close to 11° and the output current level becomes lower as the skew angle θ1 either increases or decreases relative to 11°. As FIG. 31B clearly indicates, a higher electrical current can be output by selecting an angle within a range of 5~11° for the skew angle θ1. It is to be noted that while FIG. 31B presents a graph indicating the relationships observed by setting the rotation rate at the rotor 302 to 6000 rpm and also to 1800 rpm, similar tendencies are registered at the two rotation rates.

FIG. 31C shows the voltages induced at the individual phase stator coil 206 and the average of the voltages induced at the stator coil 206 corresponding to the various phases. FIG. 31C indicates that while a higher level of voltage is induced via the V-phase stator coil 206 with a greater skew angle assumed at the rotor tabs, the level of the voltages induced at the U-phase stator coil 206 and the W-phase stator coil 206 tends to become lower as the rotor tab skew angle θ1 increases. This tendency is assumed to be attributable to the positional arrangement of the U-phase stator, the V-phase stator and the W-phase stator in the stator 202, whereby the individual phase stators are disposed side-by-side along the axial direction, which alters the area to face opposite the rotor tabs. For this reason, by factoring in the desired level of balance to be struck with respect to the levels of voltages to be induced in correspondence to the individual phases, it is concluded that the skew angle θ1 should be set within a range of 5~13° and that the ideal skew angle range is 5~11°.

As described above, the tests conducted in the embodiment prove that a desirable level of voltage can be output by selecting an angle within the range of numeral 5~13° for the rotor tab skew angle θ1 and that a particularly desirable level of voltage can be output by setting the skew angle θ1 in a narrower range of 5~11°.

Sixteenth Embodiment

Figure 32A:
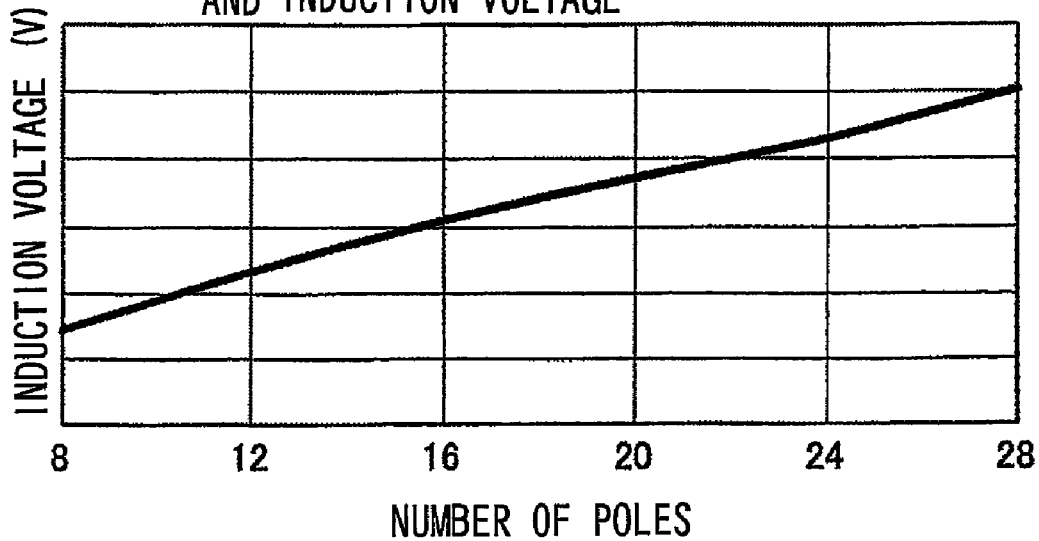
FIGS. 32A and 32B illustrate the magnetic poles of the stator tabs and the rotor tabs achieved in a sixteenth embodiment.
Figure 32B:
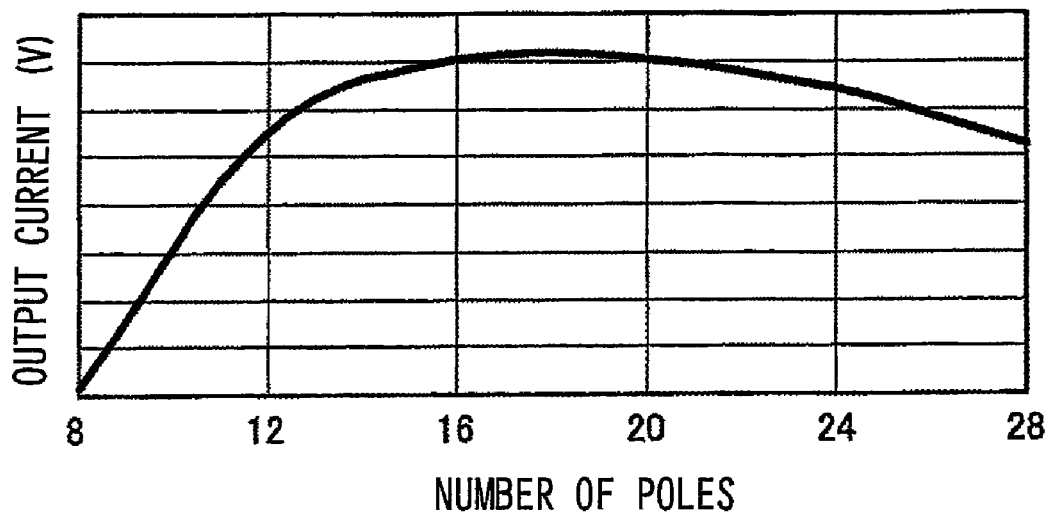

The sixteenth embodiment of the invention, in which the ideal number of tabs achieving desirable output characteristics, compared to the tabs in the first embodiment, is examined in reference to FIGS. 32A and 32B. FIG. 32A presents a graph indicating the relationship between the number of stator tabs and the rotor tabs, i.e., the number of poles, and the induction voltage. FIG. 32B presents a graph indicating the relationship between the number of poles formed at the stator tabs and the rotor tabs and the output current. It is to be noted that the same terms and reference numerals are assigned to structural elements identical to those in the first embodiment to preclude the necessity for a reputed explanation thereof. FIG. 32A indicates that the level of induction voltage increases as the number of poles formed at the stator tabs and the rotor tabs increases, as the induction voltage level and the number of poles are in proportion to each other. However, FIG. 32B indicates that an excessively large number of magnetic poles formed at the rotor 302 will set the magnetic poles too close to one another at the rotor, resulting in a significant extent of leakage flux. An excessively large number of magnetic poles also increases the inductance and the extent of iron loss, which will ultimately result in lower output current level and poorer efficiency. FIG. 32B indicates that the output voltage starts to decrease once the number of poles formed at the stator tabs and the rotor tabs becomes equal to or greater than 20. Accordingly, it is desirable to ensure that 24 or fewer poles be formed. The tests conducted in the embodiment demonstrate that it is desirable to set the number of poles formed at the stator tabs and the rotor tabs within a range of 12~24. It is even more desirable to set the number of poles to 16~20. It is to be noted that the number of tabs formed at each phase stator and the number of tabs formed at the rotor, i.e., the number of poles formed at each stator and the rotor, should match for optimal results.

Seventeenth Embodiment

Figure 33A:
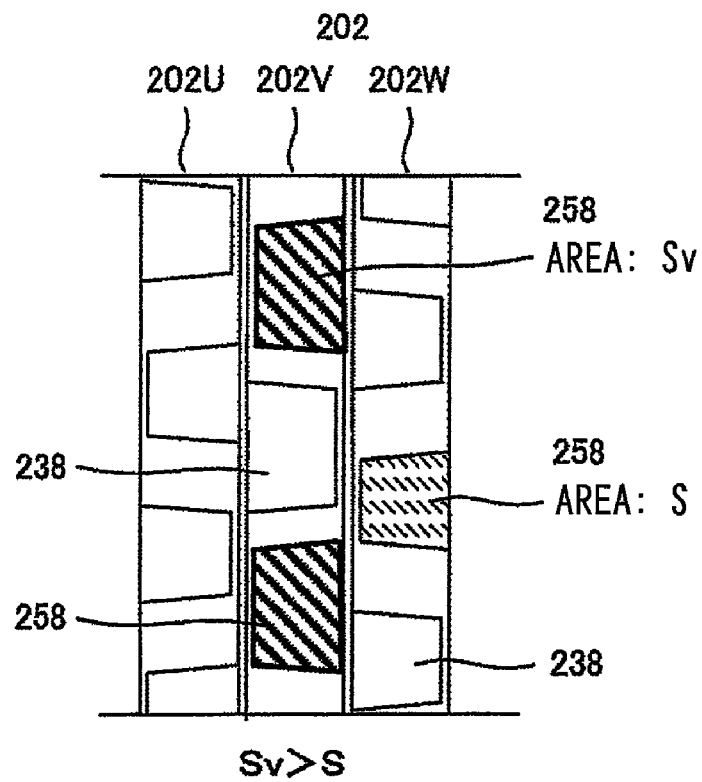
FIGS. 33A and 33B illustrate the magnetic poles of the stator tabs achieved in a seventeenth embodiment.
Figure 33B:
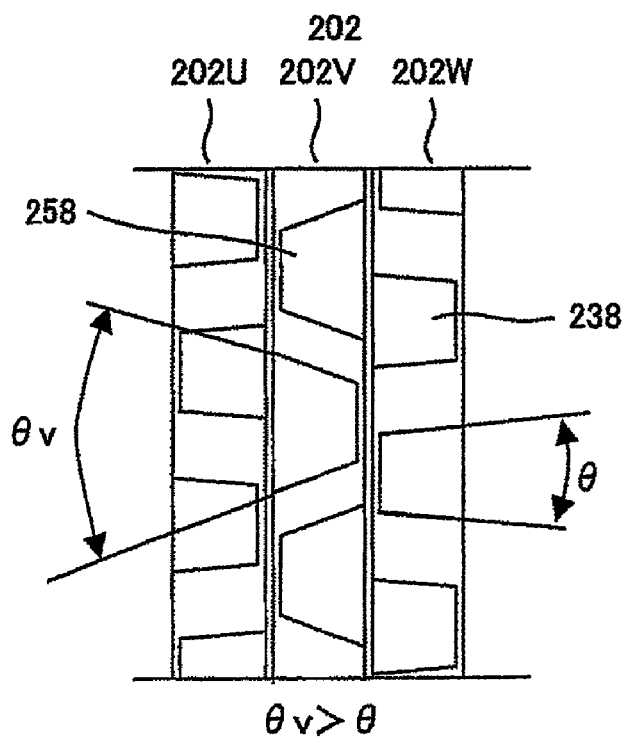

In reference to FIGS. 33A and 33B, a variation of the first embodiment achieved as the seventeenth embodiment by modifying the shape of stator tabs is described. FIG. 33A shows stator tabs achieved in the seventeenth embodiment. FIG. 33B shows a variation of the stator tabs achieved in the seventeenth embodiment. It is to be noted that the same terms and reference numerals are assigned to structural elements identical to those in the first embodiment to preclude the necessity for a repeated explanation thereof. The stator tabs at the V-phase stator 202V assume a shape different from the shape of the stator tabs at the U-phase stator 202U and the W-phase stator 202W. More specifically, the stator tabs at the V-phase stator 202V achieve a greater surface area Sv than the surface area S of the stator tabs at the U-phase stator 202U and the W-phase stator 202W, as shown in FIG. 33A. This structure achieves an improved level of voltage induced at the V-phase stator 202V and thus, the discrepancy of the level of voltage induced at the V-phase stator 202V relative to the voltages induced at the U-phase stator 202U and the W-phase stator 202W is reduced.

Alternatively, the skew angle θv at the stator tabs of the V-phase stator 202V may be set greater than the skew angle θ at the stator tabs of the U-phase stator 202U and the W-phase stator 202W, as shown in FIG. 33B. As explained in reference to the fourteenth embodiment, there is a tendency whereby the level of the induction voltage increases as the skew angle of the stator tabs increases and accordingly, the discrepancy of the level of voltage induced at the V-phase stator 202V relative to the level of the voltages output via the U-phase stator 202U and the W-phase stator 202W can be reduced by boosting the level of the voltage induced at the V-phase stator 202V.

By assuming different shapes for the stator tabs at the phase stators disposed at the two ends along the axial direction and for the stator tabs at the other phase stator, i.e., the phase stator disposed at the middle portion, as described above, the discrepancy among the output levels achieved at the individual phase stators can be reduced, which, in turn, makes it possible to reduce the level of DC output pulsations. Furthermore, the overall output at a low rotation speed can be increased.

Eighteenth Embodiment

Figure 34A:
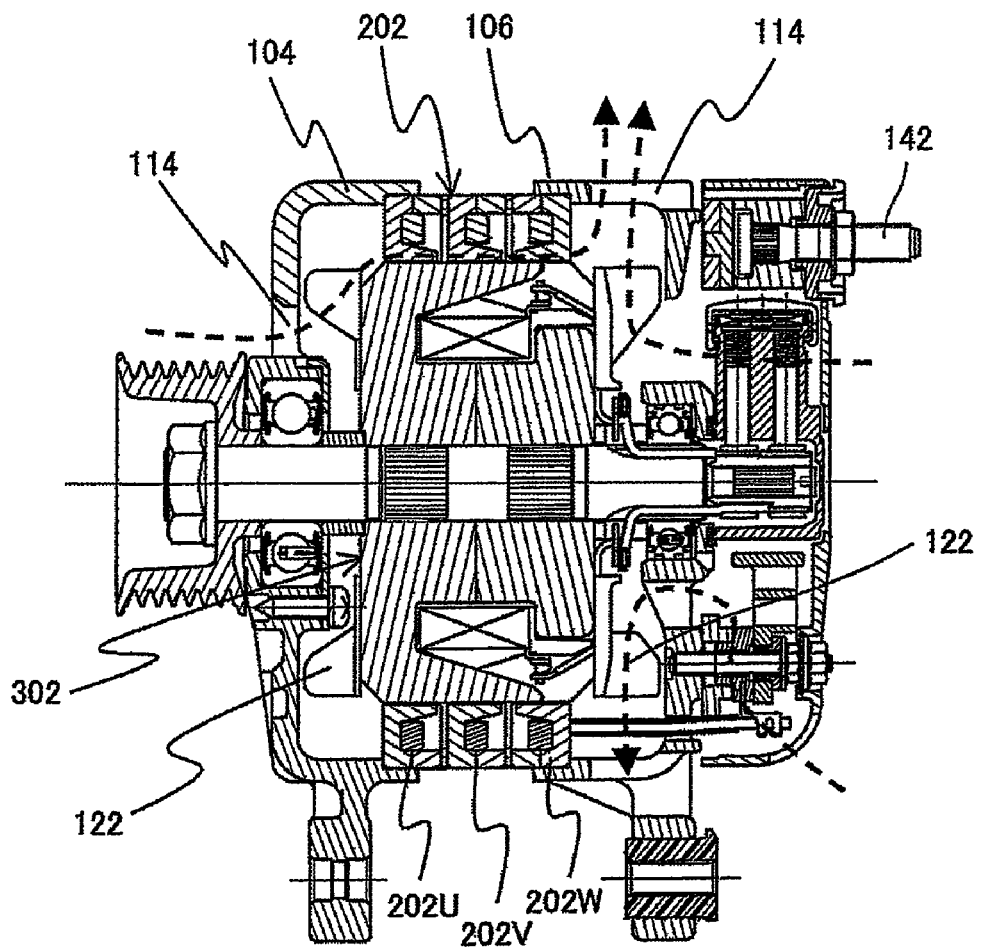
FIGS. 34A and 34B illustrate the alternator for vehicle achieved in an eighteenth embodiment.
Figure 34B:
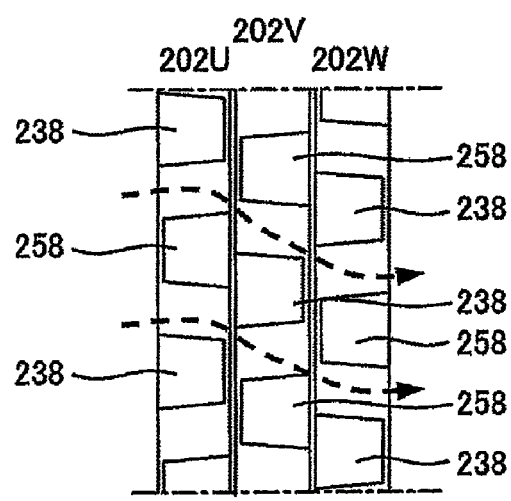

In reference to FIGS. 34A and 34B, the eighteenth embodiment is explained. The same reference numerals are assigned to structural elements with structures and functions identical to those in the first embodiment so as to preclude the need for a repeated explanation thereof. FIG. 34A is a sectional view of the alternator for vehicle achieved in the eighteenth embodiment taken through a side surface thereof. FIG. 34B shows the stator magnetic poles formed in the eighteenth embodiment. As mentioned above, the same terms and reference numerals are assigned to structural elements identical to those in the first embodiment and a repeated explanation of these elements is not provided. The eighteenth embodiment differs from the first embodiment in the structures adopted in the front bracket 104, the rear bracket 106 and the stator 202, but other structural elements of the eighteenth embodiment are substantially identical to those in the first embodiment.

The front bracket 104 in FIG. 34A achieved in the eighteenth embodiment differs from that in the first embodiment in that it assumes a substantially uniform wall thickness over the outer circumferential side area along the radial direction and over the bottom surface side and in that no air hole 114 is formed on the outer circumferential side. In addition, the front bracket 104 and the rear bracket 106 do not fit with each other and neither ranges to the other bracket. Thus, the front bracket 104 includes an open end located at an area where the U-phase stator 202U is disposed, whereas the rear bracket 106 includes an open end located at an area where the W-phase stator 202W is disposed.

No resin is charged to fill the gaps formed between the stator tabs at the stator 202 in the eighteenth embodiment and instead, the individual phase stators constituting the stator 202 are linked and fixed together as they are held between the front bracket 104 and the rear bracket 106 along the axial direction. In addition, the stator tabs are formed with a skew, as shown in FIG. 34B and, as a result, the gaps between the stator tabs at the U-phase stator 202U, the V-phase stator 202V and the W-phase stator 202W are set so as to lie continuously along the axial direction. In this structure, the air drawn in through the air holes 114 formed on the inner circumferential side of the front bracket 104 as the front fan 122 rotates as indicated by the dotted line arrow in FIG. 34A, flows toward the outer circumferential side by centrifugal force. However, since the air hole 3 on the outer circumferential side of the front bracket 104 is sealed, the air cannot actually flows toward the outer circumferential side. Instead, the air flows through the gaps between the stators, which lie continuous to one another along the axial direction, joins the air flowing toward the outer circumferential side as the rear fan 122 rotates and is discharged through the outer circumferential-side air hole 114 at the rear bracket 106. Thus, the quantity of air flowing through the gaps formed between the stator tabs increases, which, in turn, allows the stator 202 and the rotor 302 to be cooled with greater effect. It is to be noted that the front fan 122 in the eighteenth embodiment has smaller blades than the rear fan 122, as in the first embodiment, blowing air at a lower flow rate. This means that the relative flow rate with which air flows through the gaps between the stator tabs is further increased.

Nineteenth Embodiment

Figure 35:
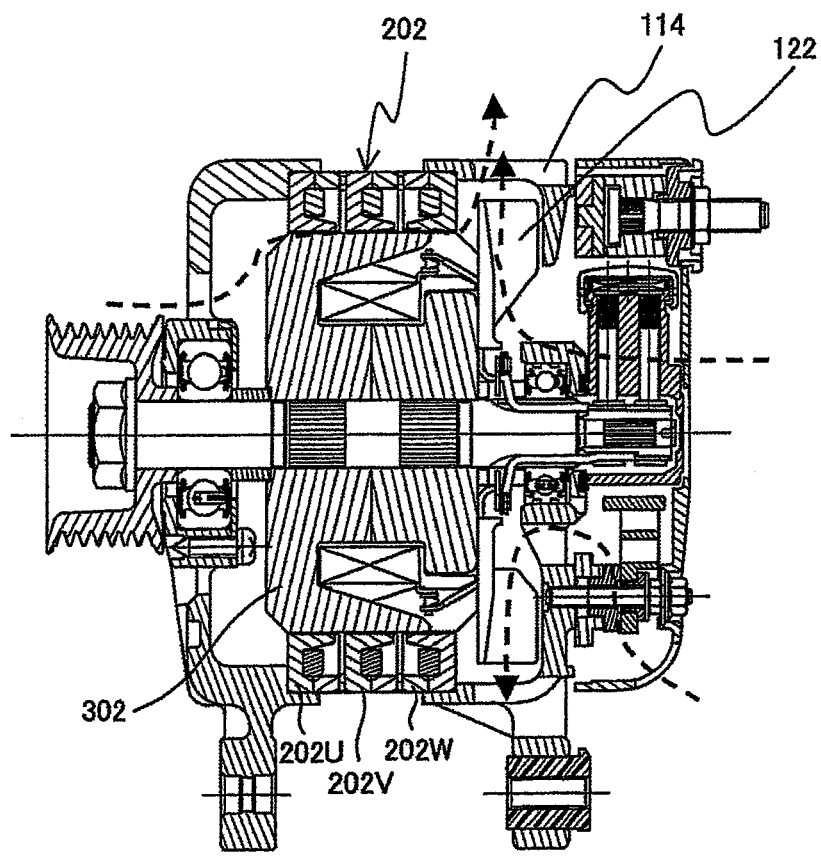
FIG. 35 is a sectional view of the alternator for vehicle achieved in a nineteenth embodiment taken through a side surface thereof.

In reference to FIG. 35, the nineteenth embodiment is explained. FIG. 35 is a sectional view of the alternator for vehicle achieved in the nineteenth embodiment taken through a side surface thereof. While the nineteenth embodiment differs from the eighteenth embodiment in that the Alternator in the nineteenth embodiment is not equipped with a front fan 122 and that it includes a rear fan 122 with a large outer diameter so that its outer circumference is set further outward relative to the inner circumference-side of the stator 202, other structural elements are substantially identical to those in the eighteenth embodiment and, accordingly, a repeated explanation of the identical structural elements is not provided. As shown in FIG. 35, the Alternator in the nineteenth embodiment does not include a front fan 122 and thus, an air current is formed via the rear fan 122 alone. Since the outer ends of the blades of the rear fan 122 are set further outward relative to the inner circumference of the stator 202, air is taken in through the side toward the front bracket 104 via the clearance between the stator 202 and the rotor 302 facing opposite the blades as the air is caused to flow from the inner circumferential side toward the outer circumferential side due to centrifugal force, as indicated by the dotted line arrow. Thus, the stator 202 can be cooled to a sufficient extent with the rear fan 122 alone, and since no front fan 122 is installed, an inexpensive, more compact device is provided.

In the eighteenth and nineteenth embodiments described above, gaps through which air is distributed are formed between the individual stator tab magnetic poles and these gaps are set to lie continuously from one end toward the other end along the axial direction through the various stator cores. As a result, the stator can be cooled to the full extent without coil ends set at the two ends along the axial direction. In addition, by installing an air supply means for distributing air through the gaps along the axial direction, the stator can be cooled even more effectively.

Twentieth Embodiment

Figure 36:
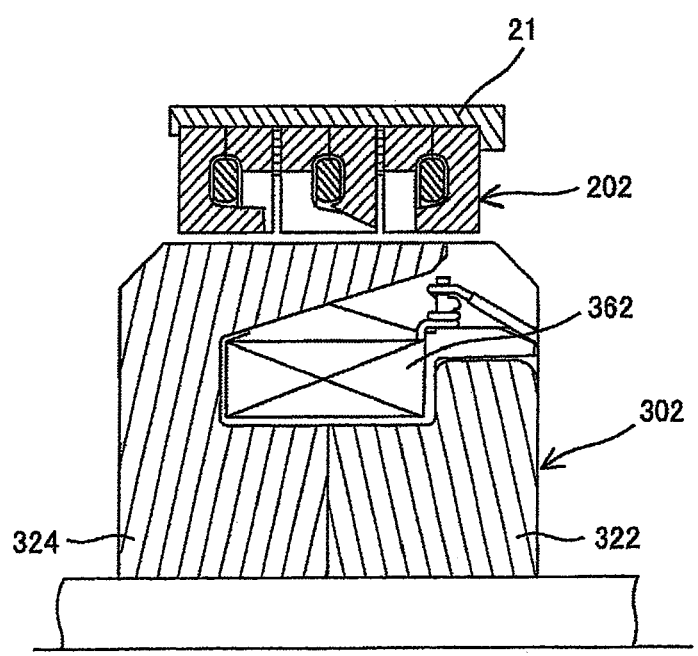
FIG. 36 is a sectional view of the rotor and the stator achieved in a twentieth embodiment taken through their side surfaces.

The twentieth embodiment of the present invention is now described in reference to FIG. 36 presenting a sectional view of the rotor 302 and the stator 202 taken over their side surfaces. It is to be noted that since this embodiment is achieved by partially-modifying the first embodiment, the same terms and reference numerals are assigned to structural elements identical to those in the first embodiment to preclude the necessity for a repeated explanation thereof. While the individual phase stators constituting the stator 202 in the seventeenth embodiment and the eighteenth embodiment are locked together as they are held along the axial direction between the front bracket 104 and the rear bracket 106, the phase stators 202 corresponding to the individual phases are integrated in the twentieth embodiment via a reinforcing ring 21 constituted of a nonmagnetic material such as an aluminum alloy, disposed to range over the outer periphery of the individual phase stators 202 as shown in FIG. 36. The reinforcing ring 21 is a ring with a substantially L-shaped section, having one end thereof along the axial direction extending toward the inner side, which is fitted over the outer side of the stator 202. As the other end of the ring is swaged, the other end also becomes bent toward the inner circumferential side. Thus, the section of the reinforcing ring 21, once locked onto the stator 202, assumes a substantially U-shape. It is to be noted that while the reinforcing ring 21 may be formed by using a magnetic material instead of a nonmagnetic material, it is more desirable to constitute the reinforcing ring 21 with a nonmagnetic material since leakage flux does not occur readily at a nonmagnetic reinforcing ring 21. With such a reinforcing ring 21, the phase stators corresponding to the individual phases can be integrated into a stator 202 before they are held between the front bracket 104 and the rear bracket 106, and therefore, the assembly process is facilitated.

Twenty-First Embodiment

The twenty-first embodiment of the present invention is now explained in reference to FIGS. 37 through 40. FIG. 37A illustrate show the magnetic flux paths at a stator core. FIG. 37B illustrates the flow of the eddy current at either a stator core 232 or a stator core 252. As the eddy current flows in much the same manner with much the same effect either at the stator core 232 or the stator core 252, the following explanation is provided in reference to the other stator core 252 shown in FIG. 37B. FIG. 38A is a perspective showing the stator core base member achieved in the twenty-first embodiment over an area corresponding to a single stator tab in a cutaway view. The following explanation is given by focusing on a stator tab 258 at the other stator core. FIG. 38B is a sectional view of the stator core base member achieved in the twenty-first embodiment taken through a side surface thereof. FIGS. 39A to 39D illustrate a variation of the twenty-first embodiment, with FIG. 39A presenting a sectional view of the stator core base member achieved in the variation of the twenty-first embodiment taken through a side surface thereof and FIGS. 39B through 39D each presenting a front view of a single steel sheet used to form a stator tab assuming a specific groove shape, taken from the stator tab front end side. FIGS. 40A through 40E each show a stator tab viewed from the inner circumferential side, illustrating a specific distinct slit/groove structure or a distinct positional arrangement assumed at the rotor-side surface 220 of the stator tab. It is to be noted that since the embodiment is achieved by partially modifying the first embodiment, the same terms and reference numerals are assigned to structural elements identical to those in the first embodiment to preclude the necessity for a repeated explanation thereof.

Figure 37A:
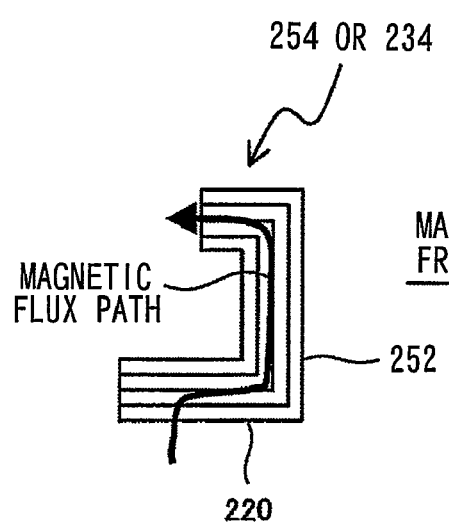
FIGS. 37A and 37B illustrate an eddy current flowing at the stator core.
Figure 37B:
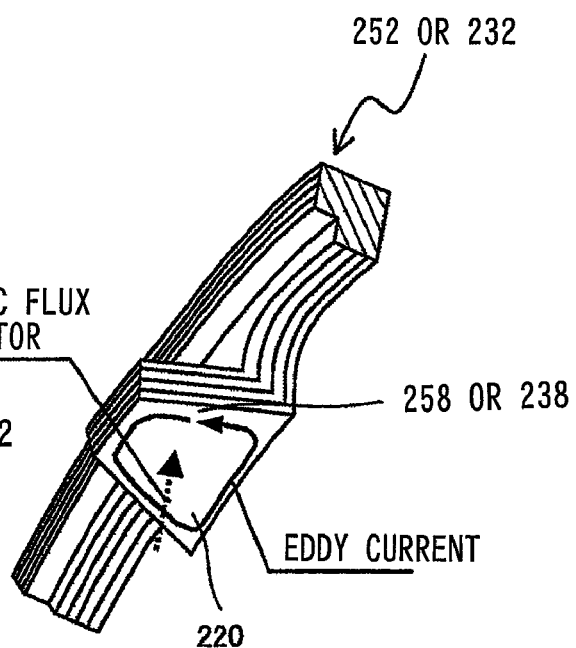

The stator cores 232 and 252 achieved in the first through twentieth embodiment as described earlier are each formed by bending a layered steel sheet assembly so as to achieve a substantially U-shaped section along the axial direction. A stator core formed in this manner allows magnetic fluxes to flow along the contours of the individual steel sheets, as indicated by the arrow in FIG. 37A and thus lowers the magnetic reluctance. However, an eddy current flowing in a spiral pattern is generated at the surface 220 of the stator tab facing opposite the rotor 302, as shown in FIG. 37B, inducing an eddy current loss. Since the stripe pattern of individual surfaces are not exposed at the surface 220 of the stator tab facing opposite the rotor 302 in the structure shown in FIG. 37B, no significant electrical resistance is created and thus, the eddy current cannot be reduced effectively.

Figure 38A:
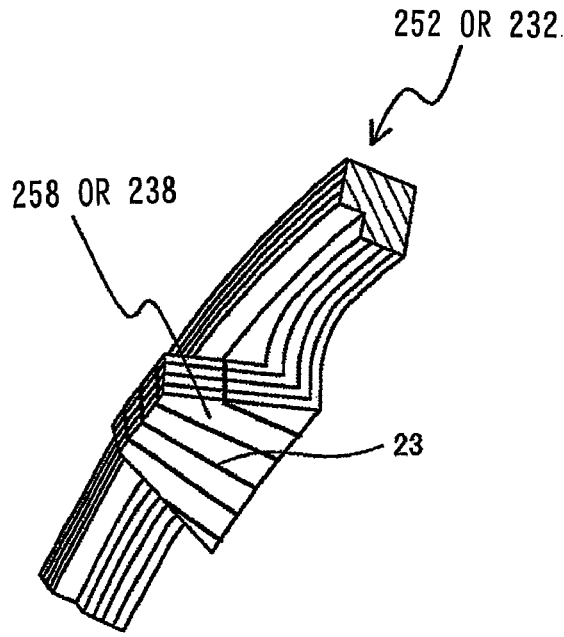
FIGS. 38A and 38B illustrate a stator core base member that may be used in a twenty-first embodiment.
Figure 38B:
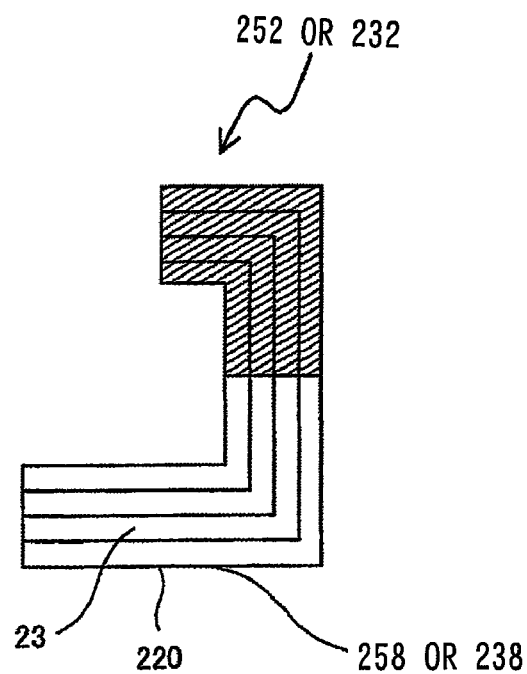

Accordingly, a plurality of slits 23 extending along the axial direction are formed at the stator tab in the embodiment, as shown in FIG. 38A. These slits 23 are formed so as to pass through the two surfaces of each steel sheet, as shown in FIG. 38B. The width of the slit should be minimized so as to assure a maximum area through which magnetic fluxes can flow. It is to be noted that the slits 23 are formed so as to extend to a substantial middle area at the side surface of the stator tab along the axial direction. Thus, while the slits 23 may be formed through press punching, slits 23 formed through etching will achieve a more desirable shape having smaller slit width. With the slits 23 formed as described above at the stator tab, a ready flow of the eddy current is disallowed and ultimately, the eddy current can be reduced. These slits 23 do not need to be formed at all the steel sheets, but should be formed at a predetermined number of steel sheets present at least on the side facing opposite the rotor 302. As an alternative, steel sheets with the slits 23 formed therein and steel sheets with no slits 23 formed therein may be layered alternately.

Figure 39A:
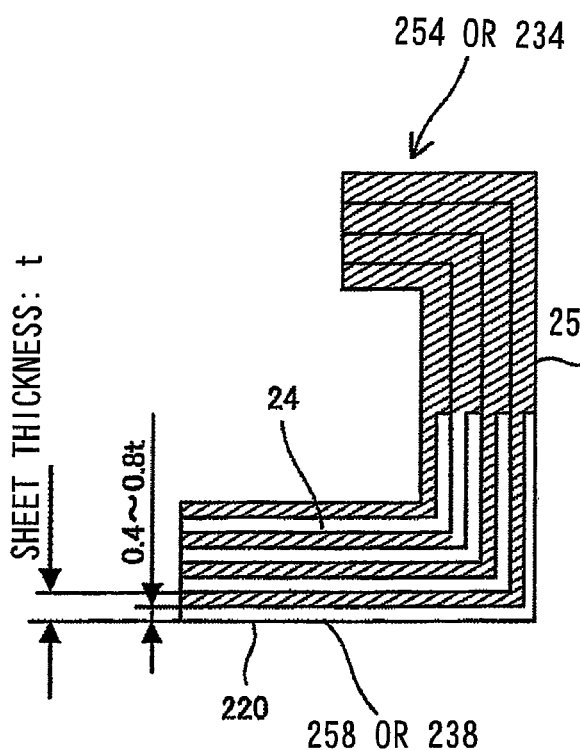
FIGS. 39A to 39D present variations of the twenty-first embodiment.

While the slits 23 in FIGS. 38A and 38B are formed so as to pass through the two surfaces of each steel sheet, grooves 24 opening toward the rotor 302, instead of passing through the two surfaces of each steel sheet, may be formed as shown in FIG. 39A. The stator tab with such grooves 24 formed therein assures greater strength than the stator tab with slits 23 formed therein and there is an added advantage to the structure shown in the figure in that the area over which a magnetic flux passes through can be increased. It is to be noted that the grooves 24 should be formed through press forming, machine or etching. In addition, as in case of the slits 23, the grooves 24 do not need to be formed at all the steel sheets, as long as they are formed at a predetermined number of steel sheets, at least, layered on the side of the surface 220 facing opposite the rotor 302. Furthermore, steel sheets with the grooves 24 formed therein and steel sheets with no groove 24 formed therein may be layered alternately. In this example, too, the grooves 24 are formed to extend to substantial mid areas at the side surfaces of the stator tab along the axial direction.

It has been learned through testing that desirable results are obtained by forming the grooves 24 at a depth of 0.4t~0.8t with t representing the sheet thickness of the steel sheets. It is to be noted that the grooves should be formed with a width as small as possible, as in the case of the slits 23.

Figure 39B:
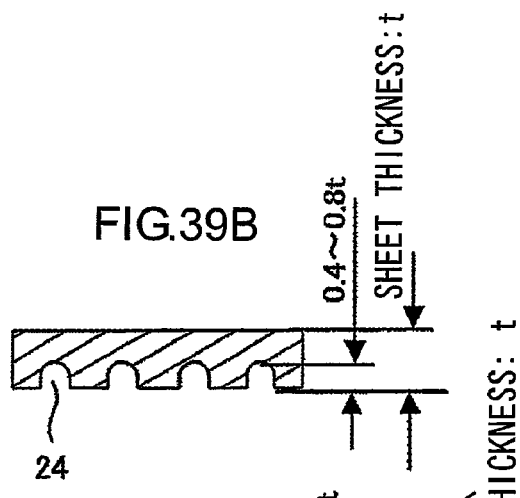
Figure 39C:
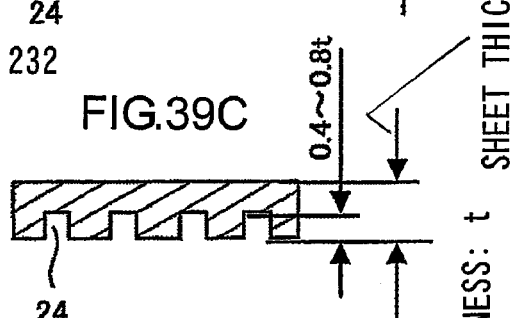
Figure 39D:
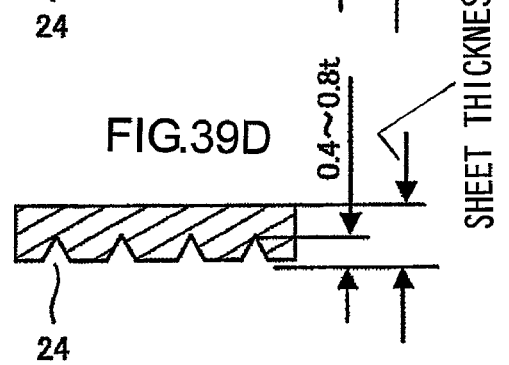

FIGS. 39B through 39D show sectional views of various grooves 24. The grooves 24 in FIG. 39B have a substantially semicircular section, whereas the grooves 24 in FIG. 39C have a substantially quadrangular section. The grooves 24 in FIG. 39D have a substantially triangular section. The grooves 24 formed to achieve a substantially triangular section, as shown in FIG. 39D, can be formed more easily.

Figure 40A:
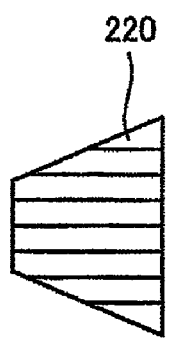
FIGS. 40A to 40F show the magnetic poles of the stator tabs achieved in the twenty-first embodiment, viewed from the inner circumferential side.
Figure 40B:
Figure 40C:
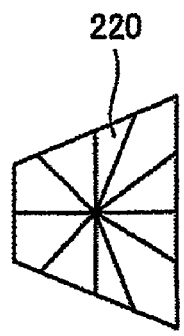
Figure 40D:
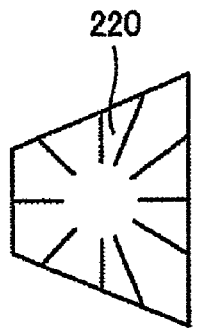
Figure 40E:
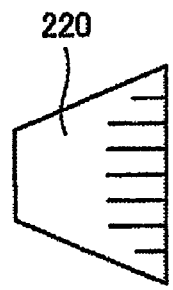
Figure 40F:
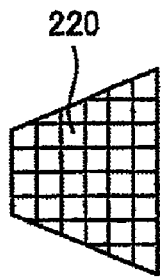

FIGS. 40A through 40E show various arrangement patterns that may be assumed at the slits 24 or the grooves 24. In the arrangement pattern shown in FIG. 40A, which may be adopted in conjunction with the slits 23 or the grooves 24, the slits 23 or the grooves 24 are formed so as to extend substantially along the axial direction, i.e., along the direction in which the stator tab ranges in the lengthwise direction. This arrangement pattern is advantageous in that the slits 23 or the grooves 24 can be formed easily. FIG. 40B shows an arrangement pattern that may be adopted in conjunction with the grooves 24, in which the grooves 24 are formed to extend along the circumferential direction, i.e., along the width of the stator tab. While this arrangement pattern is also advantageous in that the grooves 24 can be formed easily, as with the arrangement pattern shown in FIG. 40A, it can be adopted in the formation of grooves 24 only since the adoption of this arrangement pattern in conjunction with slits might allow ready disengagement of the stator tab. FIG. 40C shows an arrangement pattern that can only be adopted in conjunction with the grooves 24, whereby the grooves 24 are formed to extend in a radial pattern from a substantial center of the stator tab. Since the eddy current flows in a spiral pattern at the outer surface of the stator tab, as shown in FIG. 37B, the pattern can be used to great effect in reducing the eddy current. FIG. 40D shows an arrangement pattern achieved by modifying that shown in FIG. 40C, in which no grooves are formed at the center of the radial pattern. This arrangement pattern, which does not split the stator tab, can be adopted in conjunction with the slits 23 as well as the grooves 24. FIG. 40E shows an arrangement pattern that may be adopted in conjunction with either slits 23 or grooves 24, whereby the slits 23 or the grooves 24 are formed at the stator tab substantially along the axial direction only over the bent portion, i.e., along the direction in which the stator tab ranges in the lengthwise direction. By forming the grooves 24 in this pattern, it is ensured that the individual steel sheets are not allowed to too readily separate from one another at the front end of the stator tab, thereby achieving an advantage of reduced magnetic noise. FIG. 40F shows a grid pattern that can only be adopted in conjunction with the grooves 24. Since the grooves 24 can be formed with higher density in this grid pattern, the resistance to eddy current can be further improved.

Twenty-Second Embodiment

Figure 41A:
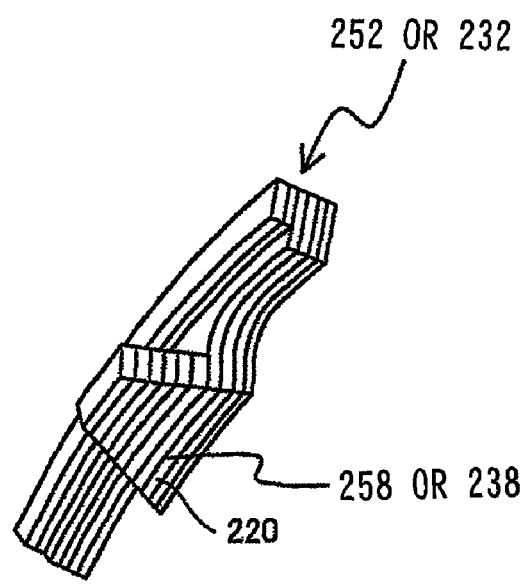
FIGS. 41A to 41C illustrate a stator core base member that may be used in a twenty-second embodiment.
Figure 41B:
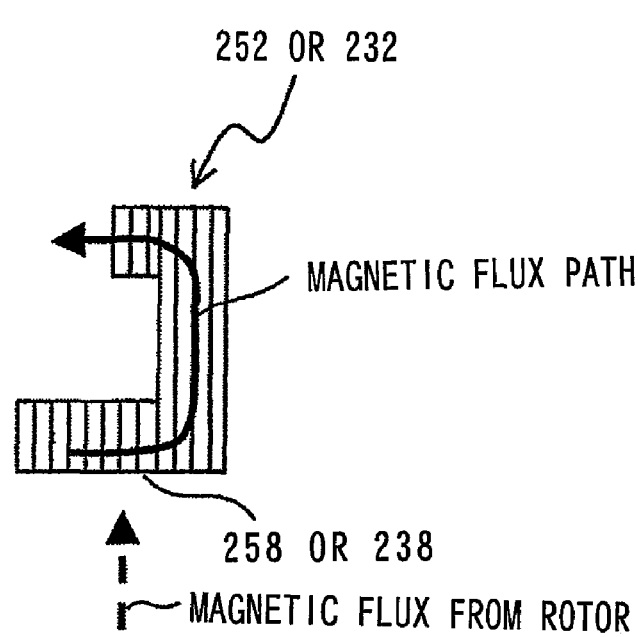
Figure 41C:
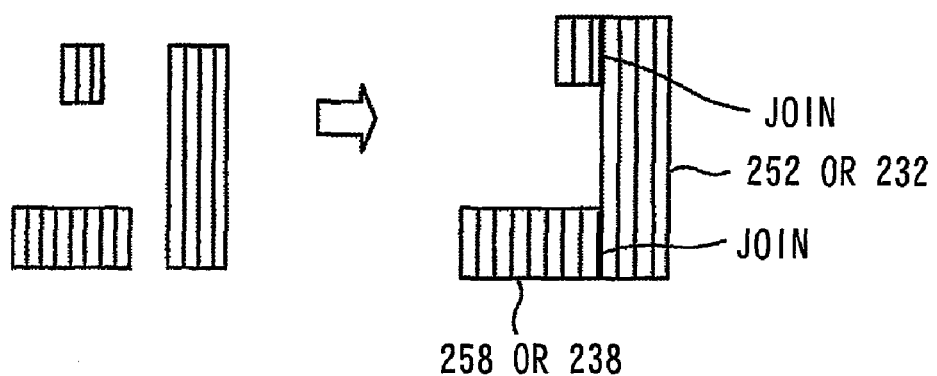

In reference to FIGS. 41A to 41C, the twenty-second embodiment of the present convention is described. FIG. 41A is a perspective of a stator core achieved in the second embodiment over an area corresponding to a single stator tab shown in a cutaway view. FIG. 41B is a sectional view of the stator core base member achieved in the twenty-second embodiment taken through a side surface thereof. FIG. 41C illustrates a method that may be adopted when manufacturing the stator core base member in the twenty-second embodiment in a sectional view taken through a side surface thereof. It is to be noted that the same terms and reference numerals are assigned to structural elements identical to those in the other embodiments.

The stator tabs in the twenty-second embodiment are formed simply by layering substantially flat steel sheets along the axial direction, as shown in FIGS. 41A and 41B without bending the steel sheets. This structure allows a stripe pattern of surfaces of the steel sheets layered one of another to be exposed at the surface of the stator tab facing opposite the rotor 302. As a result, an increase in the electrical resistance is achieved, as with the slits 23 in the twenty-first embodiment, resulting in an advantage of a reduction in the eddy current. In addition, since the corners of the stator tab assume angles substantially equal to a right triangle, the area of the stator tab facing opposite the rotor 302 near the rotor can be increased.

FIG. 41C shows a method that may be adopted when manufacturing the stator cores achieved in the twenty-second embodiment. The steel sheets assuming a specific shape are layered one on top of another to form each of; an outer circumferential portion, a side portion and a stator tab in the stator core manufacturing process achieved in the twenty-second embodiment. The steel sheets should be integrated through welding, via an adhesive, through coupling and caulking via pins, through caulking in conjunction with a dowel having a specific shape or through molding executed by using a nonmagnetic resin or the like. The outer circumferential portion and the side portion thus formed are then joined together through welding or the like and then the individual stator tabs are bonded to the side through welding or the like, thereby forming the stator core in the twenty-second embodiment.

Twenty-Third Embodiment

In reference to FIGS. 42A to 42C, the twenty-third embodiment of the present invention is described. FIG. 42A is a perspective of a stator core achieved in the twenty-third embodiment over an area corresponding to a single stator tab shown in a cutaway view. FIG. 42B is a sectional view of the stator core base member achieved in the twenty-third embodiment taken through a side surface thereof. FIG. 42C illustrates a method that may be adopted when manufacturing the stator core base member in the twenty-third embodiment in a sectional view taken through a side surface thereof. It is to be noted that the same terms and reference numerals are assigned to structural elements identical to those in the other embodiments. As shown in FIGS. 42A and 42B, the twenty-third embodiment is achieved by combining the first embodiment and the twenty-second embodiment. In other words, while the stator tabs are each formed by bending the stator core base member as in the first embodiment, the outer circumferential area of the stator core is formed by layering substantially flat steel sheets, as in the twenty-second embodiment.

While the twenty-second embodiment achieves an advantage in that the eddy current generated at each stator tab over its side surface 220 facing opposite the rotor 302 is reduced, there is an issue still to be addressed in the twenty-second embodiment in that since magnetic fluxes flow over the stator tabs and the outer circumferential area along the direction in which the steel sheets are layered one on top of another, the magnetic reluctance over these areas is bound to be significant and also an eddy current is bound to occur over these areas. In the twenty-third embodiment, while an eddy current tends to occur readily over the stator tabs, the magnetic reluctance can be reduced since the stator tabs are formed by bending the stator core base member along the magnetic flux path direction. In other words, in an Alternator with specifications which allow it to be operated without being affected by the eddy current to significant extent, greater efficiency can be achieved through the twenty-third embodiment. In addition, since a plurality of stator tab pieces do not need to be formed separately in advance, the overall manufacturing process can be carried out more easily compared to the twenty-second embodiment, with an added advantage of better mechanical strength assured at the stator tabs.

FIG. 42C shows a method that may be adopted when manufacturing the stator core achieved in the twenty-third embodiment. The stator cores in the twenty-third embodiment may each be manufactured by first forming its outer circumferential portion with substantially flat steel sheets layered one on top of another. In addition, a layered sheet assembly with stator tabs formed therein by bending surface portions so as to achieve a substantially L-shaped section along the axial direction is prepared. The stator core in the twenty-third embodiment is then manufactured by fusing these pieces through welding or the like, as in the twenty-second embodiment.

Twenty-Fourth Embodiment

Figure 43A:
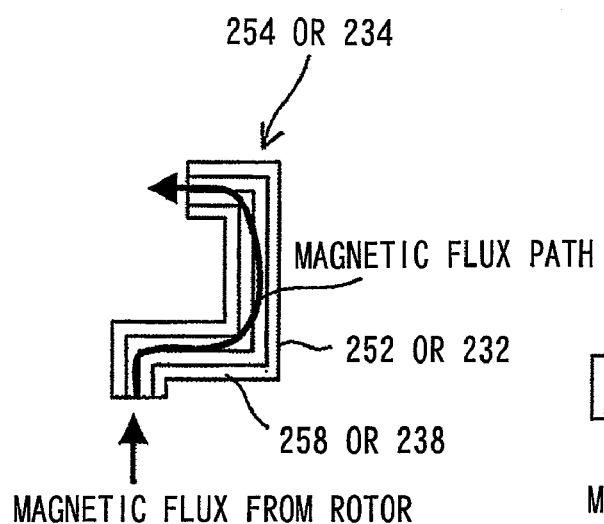
FIGS. 43A to 43C illustrate a stator core base member that may be used in a twenty-fourth embodiment.
Figure 43B:
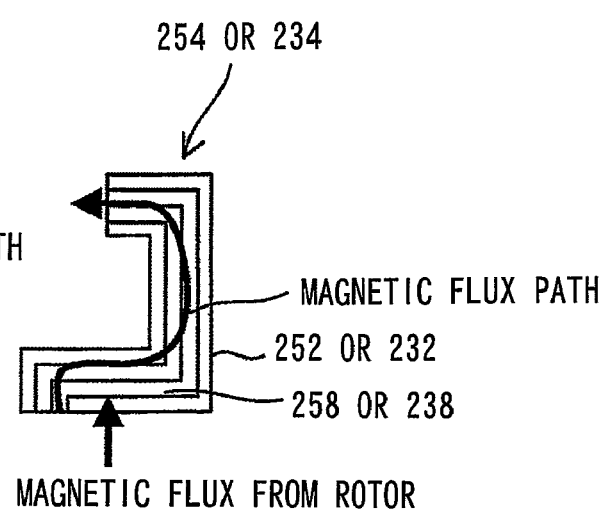
Figure 43C:
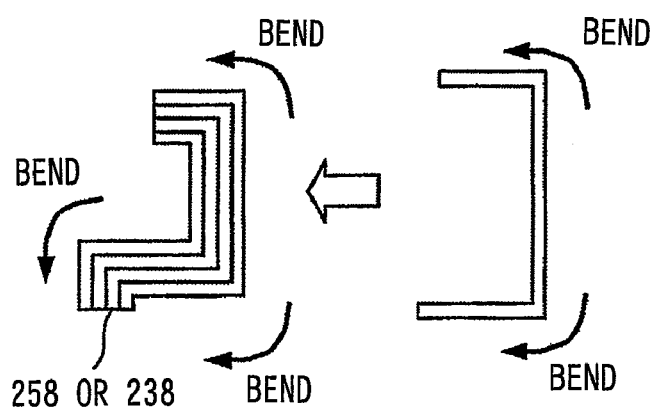

The twenty-fourth embodiment is now explained in reference to FIGS. 43A to 43C. FIG. 43A is a sectional view of a stator core achieved in the twenty-fourth embodiment taken through a side surface thereof, illustrating one of several manufacturing methods that may be adopted. FIG. 43B is a sectional view of the stator core achieved in the twenty-fourth embodiment taken through a side surface thereof, illustrating another manufacturing method that may be adopted. FIG. 43C is a sectional view of a stator core base member that may be used in the twenty-fourth embodiment taken through a side surface thereof, illustrating a method that may be adopted to manufacture the stator core base member. It is to be noted that the same terms and reference numerals are assigned to structural elements identical to those in the other embodiments so as to preclude the necessity for a reputed explanation thereof. FIG. 43A presents an example adopting the twenty-fourth embodiment that achieves reductions in both the eddy current and the magnetic reluctance. As indicated by the solid line arrow in FIG. 43A, the magnetic flux paths along the contour of the steel sheets and thus, the magnetic reluctance is reduced compared to those in the twenty-second embodiment and the twenty-third embodiment. In addition, since the front end of each stator tab is bent toward the rotor 302, the stripe pattern of the individual layers of the steel sheets stacked one on top of another is exposed at the front end of the stator tab. As a result, the electrical resistance at the layered surface increases, achieving an advantage of reducing the extent of the eddy current generated with the magnetic flux originating from the rotor 302.

FIG. 43B shows another example adopting the embodiment. In this example, a steel sheet having a substantially U-shaped section along the axial direction is layered on top of the outermost steel sheet in the assembly shown in FIG. 43A. In this case, the area of the tab facing opposite the rotor 302 over the shortest distance is increased. This means that a greater strength of magnetic flux can be received from the rotor compared to the example shown in FIG. 43A.

FIG. 43C illustrates a method that may be adopted when manufacturing the stator cores achieved in the twenty-fourth embodiment. When manufacturing a stator core in the twenty-fourth embodiment, three bent portions are formed by bending a layered assembly of steel sheets as in the first embodiment or by layering steel sheets having already been individually bent. The stator core shown in FIG. 43A is formed through this process. The stator core shown in FIG. 43B may be manufactured by forming a steel sheet with a substantially U-shaped section taken along the axial direction and then layering the steel sheet with the axial section thereof substantially assuming the U-shape from the outer side of the layered assembly.

Twenty-Fifth Embodiment

Figure 44:
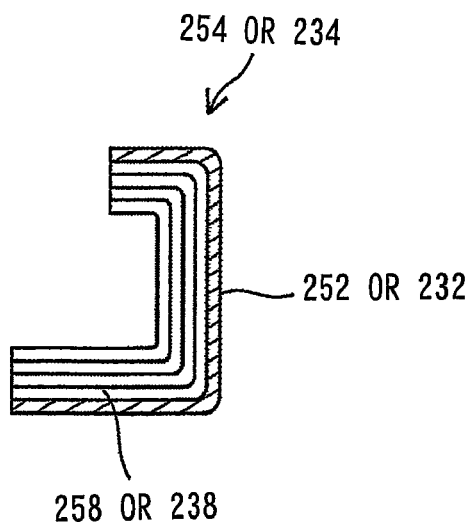
FIG. 44 is a sectional view of the member used to constitute the stator core in a twenty-fifth embodiment taken through a side surface thereof.

In reference to FIG. 44, the twenty-fifth embodiment of the present invention is explained. FIG. 44 is a sectional view of a stator core achieved in the twenty-fifth embodiment taken through a side surface thereof. It is to be noted that the same terms and reference numerals are assigned to structural elements identical to those in the other embodiments and since those structural elements provide similar functions and advantages, a reputed explanation is omitted. In the twenty-fifth embodiment, the steel sheets to constitute an outer layer and the steel sheet to constitute an inner layer are formed by using different materials. For instance, by forming the steel sheet to be layered at the outermost position with a highly rigid material and forming the steel sheet to constitute inner layers with a material having less rigidity compared to the material constituting the outermost steel sheet, good mechanical strength is assured at the stator tabs and, at the same time, the forming process is facilitated.

As an alternative, the steel sheet to constitute the outermost layer may be formed by using a higher resistance material such as an electromagnetic steel sheet and the steel sheets to constitute inner layers may be formed by using a low resistance material such as cold-rolled steel sheets (SPCC). In this case, a costly electromagnetic steel sheet is used to constitute the outer layer where an eddy current tends to occur and inner layers less likely to be affected by eddy currents are constituted with inexpensive cold-rolled steel (SPCC). As a result, the production cost can be reduced while assuring the required level of performance. It is to be noted that the number of different types of materials to be used to form the steel sheets does not need to be two and the number of steel sheets to be formed by using a specific material should be adjusted as necessary so as to conform to the specifications.

Twenty-Sixth Embodiment

Figure 45A:
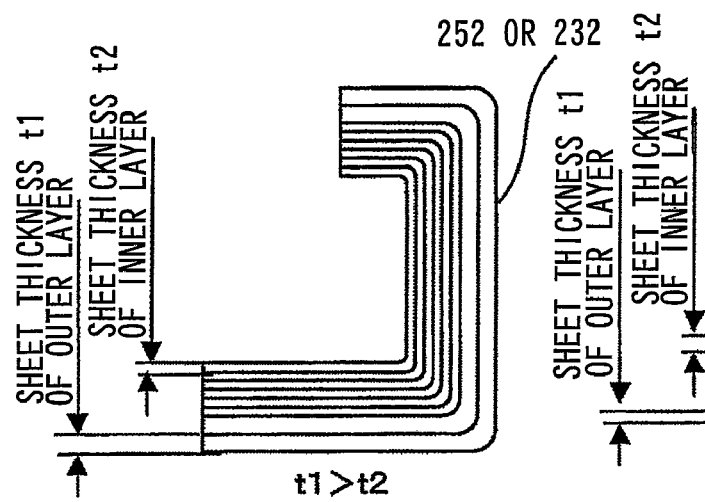
FIGS. 45A and 45B illustrate a stator core base member that may be used in a twenty-sixth embodiment.
Figure 45B:
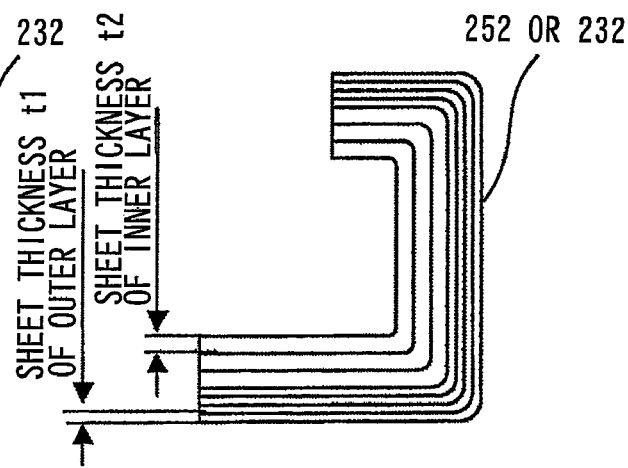

In reference to FIGS. 45A and 45B, the twenty-sixth embodiment is described. FIG. 45A shows a stator core achieved in an example adopting the twenty-sixth embodiment, in a sectional view taken through a side surface thereof. FIG. 45B shows a stator core base member achieved in another example adopting the twenty-sixth embodiment in a sectional view taken through a side surface thereof. It is to be noted that the same terms and reference numerals are assigned to structural elements identical to those in the other embodiments to preclude the necessity for a reputed explanation thereof. In the twenty-sixth embodiment, the steel sheets used to form outer layers and the steel sheets used to form inner layers have different sheet thicknesses. For instance, as shown in FIG. 45A, the sheet thickness of the steel sheets to be layered on the outer side may be set greater than the sheet thickness of the sheet to be layered on the inner side. Such a structure improves the rigidity of the stator tabs.

Alternatively, as shown in FIG. 45B, the sheet thickness of the steel sheets to be layered on the outer side may be set less than the sheet thickness of the sheets to be layered on the inner side. The electrical resistance is increased and thus the eddy current can be reduced by setting the steel sheet thickness to a smaller value. An eddy current tends to occur readily at the front surfaces of the stator tabs facing opposite the rotor 302. Accordingly, the eddy current is reduced on the outer side by setting a smaller sheet thickness for the steel sheets layered on the outside in this example. The magnetic flux passing through on the inner side is weaker in first place and thus, the inner area is not as much affected by the eddy current. Thus, the number of steel sheets to be layered one on top of another on the inner side can be reduced by using steel sheets with a greater sheet thickness for the inner layers. Ultimately, a stator core can be provided at lower cost through the overall reduction in the number of steel sheets used in the manufacturing process.

Twenty-Seventh Embodiment

Figure 46A:
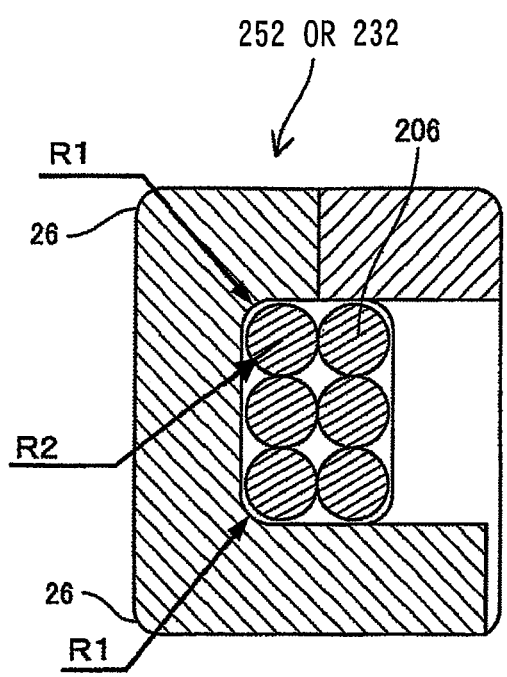
FIGS. 46A and 46B show a stator achieved in a twenty-seventh embodiment.
Figure 46B:
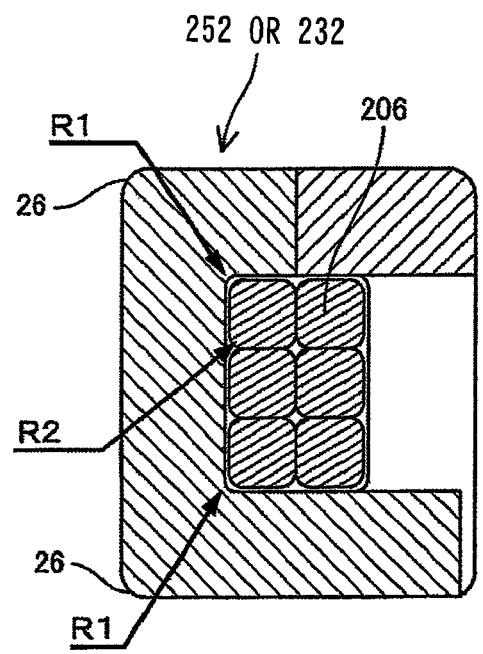

In reference to FIGS. 46A and 46B, the twenty-seventh embodiment of the present invention is described. FIG. 46A is a sectional view of a stator achieved in an example adopting the twenty-seventh embodiment taken through a side surface thereof. FIG. 46B is a sectional view of a stator achieved in another example adopting the twenty-seventh embodiment taken through a side surface thereof. It is to be noted that same terms and reference numerals are assigned to structural elements identical to those in the other embodiments to preclude the necessity for a reputed explanation thereof. In the example presented in FIG. 46A, the bend radius R1 assumed at each bent portion 26 is set equal to or less than the radius R2 measured through a section of the stator coil 206. The stator achieved in the embodiment includes bent portions formed at two positions, i.e., the bent portion 26 on the outer circumferential side and the bent portion 26 formed over the area where a stator tab is present. The bend radius R1 at both bent portions is set equal to or less than the radius R2 at the section of the stator coil 206. Through these measures, the clearance between the stator coil 206 and the stator core 232 or the stator core 252 can be minimized, which, in turn, assures a better space factor.

In the example presented in FIG. 46B, the stator coil 206 is constituted with square wire having a substantially rectangular section. While square wire would normally be used to improve the space factor at the stator cores 232 and 252, the space factor can be further improved by setting the bend radius R1 at the bent portions 26 equal to or less than the radius R2 assumed for the square section of the square wire, as in the embodiment. It is to be noted that while the stator in this example, too, includes bent portions 26 formed at two positions as does the stator shown in FIG. 46A, i.e., the bent portion 26 formed over the outer circumferential side and the bent portion 26 formed over the area where a stator tab is present, the radius R1 at both bent portions is set equal to or less than the radius R2 of the section of the square wire.

Twenty-Eighth Embodiment

Figure 47A:
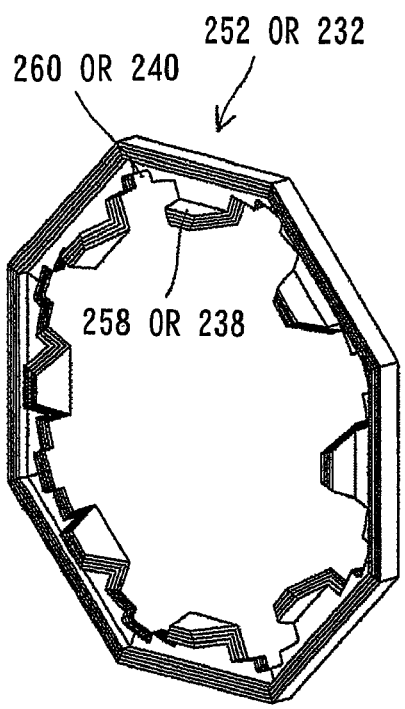
FIGS. 47A to 47C show a stator achieved in a twenty-eighth embodiment.
Figure 47B:
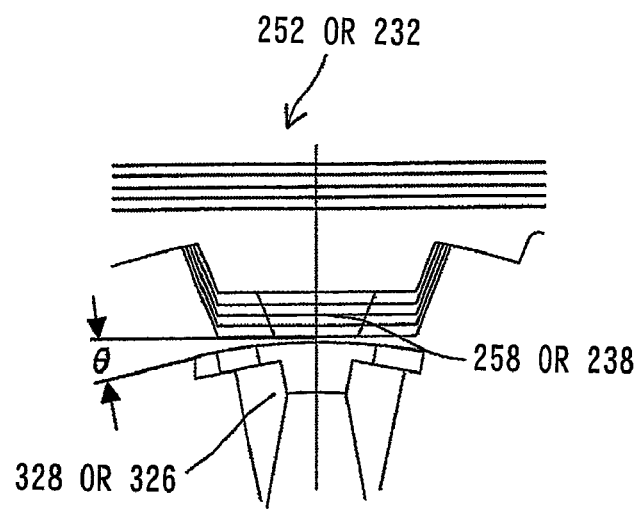
Figure 47C:
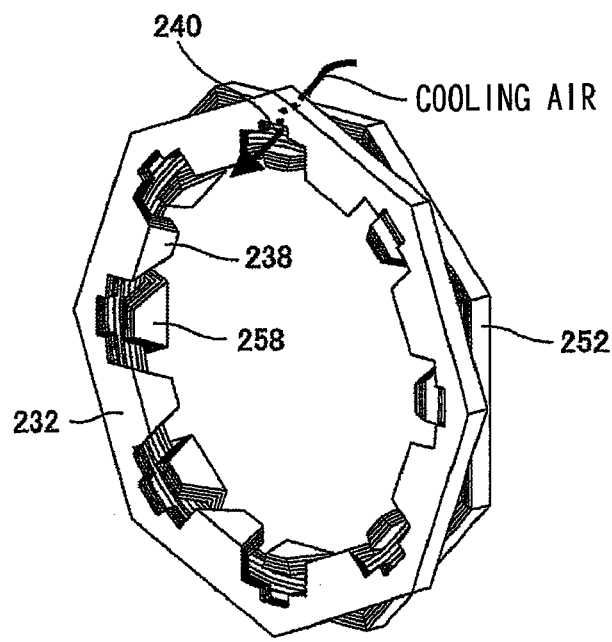
Figure 48A:
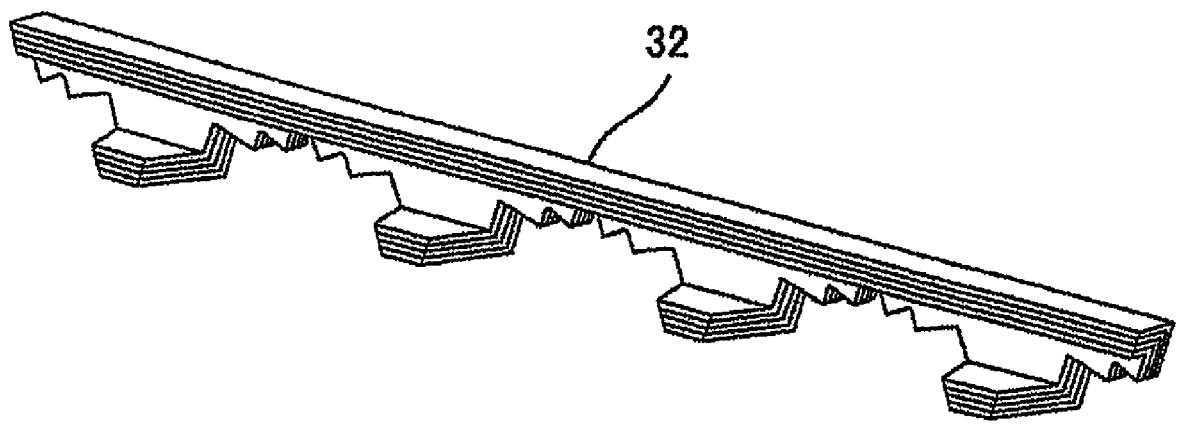
FIGS. 48A and 48B illustrate a manufacturing method that may be adopted when manufacturing the stator core base member used in the twenty-eighth embodiment.
Figure 48B:
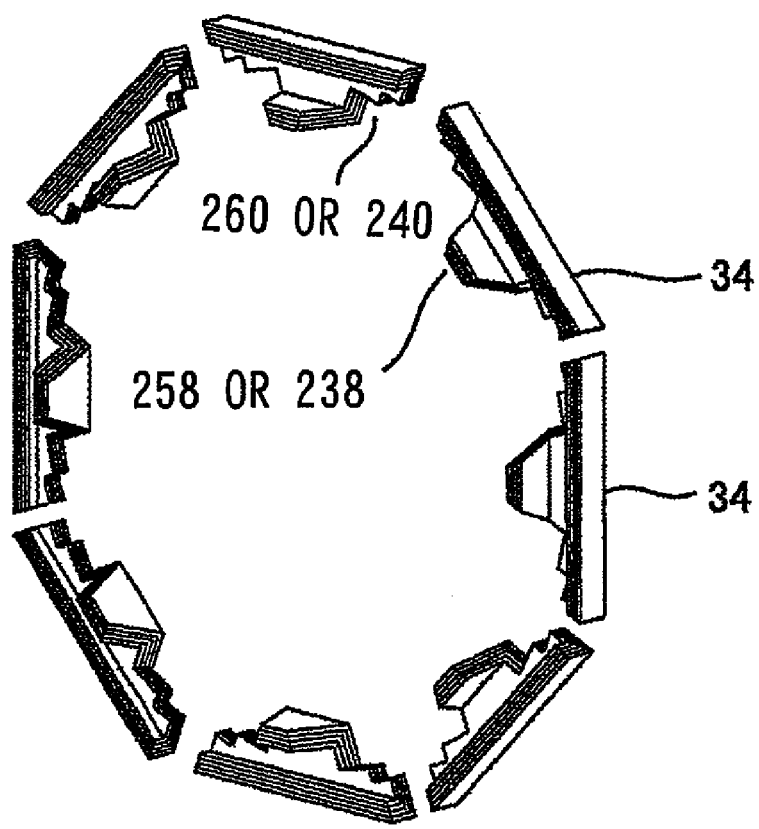

The twenty-eighth embodiment of the present invention is now explained in reference to FIGS. 47 through 49. FIG. 47A is a prospective of a stator core achieved in an example adopting the twenty-eighth embodiment. FIG. 47B is a front view of a stator 202 and the rotor 302 in the twenty-eighth embodiment taken from the front end side of a stator tab 238 or 258 and a rotor tab 326 or 328. FIG. 47C is a perspective of a phase stator corresponding to a specific phase achieved in an example adopting the twenty-eighth embodiment. FIG. 48A illustrates a manufacturing method that may be adopted when manufacturing the phase stator cores in a perspective of a phase stator core yet to undergo a forming process. FIG. 48B illustrates another manufacturing method that may be adopted when manufacturing the phase stator core in a perspective of the various components of a phase stator core.

Figure 49A:
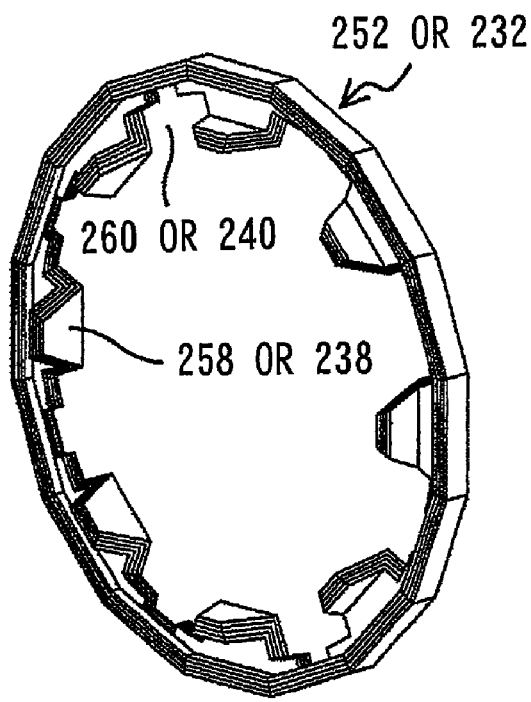
FIGS. 49A and 49B are perspectives of another example of the stator core base member used in the twenty-eighth embodiment.
Figure 49B:
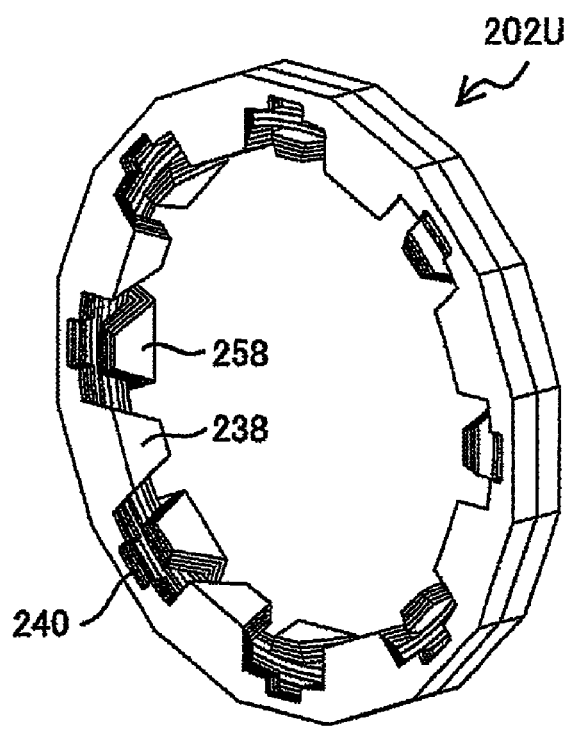

FIG. 49A is a perspective of the other phase stator core in the phase stator achieved in another example. FIG. 49B is a perspective of a phase stator as achieved in another example adopting the twenty-eighth embodiment. It is to be noted that the same terms and reference numerals are assigned to structural elements identical to those in the other embodiments to preclude the necessity for a repeated explanation thereof.

While the stator cores 232 and 252 in the previous embodiments each include an inner circumferential surface and an outer circumferential surface contoured so as to achieved a substantially cylindrical shape, the inner circumferential surface and the outer circumferential surface of each stator core 232 or 252 are contoured so that the stator core section assumes a polygonal shape in the twenty-eighth embodiment. In the example shown in FIG. 47A, the inner circumferential surface and the outer circumferential surface are contoured so as to achieve a polygonal shape with the number of sides matching the number of stator tabs, e.g., an octagonal shape. As an octagonal shape is achieved on the inner circumferential side of the stator core 232 or 252 so as to match the number of stator tabs 238 or 258, the stator tabs 238 or 258 are each allowed to assume a substantially flat surface. The outer circumferential side of each rotor tab, i.e., the rotor tab surface to face opposite a stator tab, is curved so that the outline of the rotor 302 achieves a substantially cylindrical shape. Since the curvature radius at the rotor-side surface of the stator tab is greater than the curvature radius of the stator-side curved surface of the rotor tab, the gap between the stator tab and the rotor tab gradually widens toward the outside by an angle θ as shown in FIG. 47B. In this structure, in which the magnetic flux is allowed to fluctuate more gently, the level of magnetic excitation force is reduced. This, in turn, makes it possible to reduce the magnetic noise. Since the rotor-side surfaces of the stator tabs can be formed as flatter surfaces by increasing the number of poles, the rotor-side surfaces of the stator tabs may be formed as flat surfaces as long as the number of poles is significant.

The stator core 232 and the other stator core 252, each with its outer circumferential surface contoured so as to achieve a polygonal shape with the number of sides matching the number of tabs, e.g., an octagonal shape, are assembled together to achieve the structure shown in FIG. 47C. In this structure, the outer circumference of one stator core 232 and the outer circumference of the other stator core 252 are not aligned at their corners. In other words, the outermost area of each recess 240 formed between stator tab magnetic poles at one stator core 232 is set further outward relative to the outer circumference of the other stator core 252. While no problem related to magnetic flows occurs in this structure, the passage through which cooling air flows can be set further outside relative to the stator coil 206 and the stator 202 can be cooled with better efficiency by adopting the structure.

Methods that may be adopted when manufacturing the stator cores 232 and 252 achieved in the twenty-eighth embodiment are now explained. In one manufacturing method, a laminated assembly 32 to constitute a stator core, which extends linearly along the lengthwise direction, as shown in FIG. 48A, is first prepared. It is then bent to form a ring shape, so as to form the annular stator core 232 or 252. It is desirable that the linear laminated assembly should be notched at the stator recesses 240 or 260, each corresponding to a stator tab, so as to ensure that it can be bent with ease. In addition, the stator core should be bent in advance so as to achieve a substantially U-shaped section in order to allow the individual tabs and the outer circumferential portion of the stator core to be formed in advance.

Alternatively, a stator core may be constituted with split portions including a stator tab divided at recesses, i.e., corresponding to one side of the octagonal shape, as shown in FIG. 48B. The individual laminated core pieces 34 may then be fused together through welding or the like to achieve a ring-shaped core. In this case, the separate laminated core pieces 34 should be formed in advance. Namely, a laminated assembly 32 to constitute the stator core may be first formed as shown in FIG. 48A, this laminated assembly 32 may then be divided into separate pieces at stator recesses and finally, the separate pieces may be fixed together to achieve a ring shape. By adopting this method in stator core production, the extent of material wastage that may occur during press machining or the like can be minimized. For instance, the material is bound to be wasted in considerable quantities both on the inside and the outside of the cylindrical core formed through press machining. Such material wastage can be minimized by adopting either of the two methods described above.

Next, another example adopting the twenty-eighth embodiment is explained in reference to FIGS. 49A and 49B. The example shown in FIG. 49A is similar to the example shown in FIG. 47A except that the number of corners of the polygonal shape achieved on the outer circumferential side is different from that in the example shown in FIG. 47A. In this example, the stator cores 232 and 252 at the phase stator include a total of sixteen stator tabs and, accordingly, the stator cores 232 and 252 each assume a polygonal shape with sixteen corners. In other words, the polygon has corners the number of which is twice the number of corners in the polygon achieved in the example shown in FIG. 47A. By selecting the optimal number of corners to be included in the polygonal shape, the stator cores 232 and 252 can be assembled together by aligning them at their outer sides as shown in FIG. 49B. Thus, the stator cores can more easily be positioned relative to each other during the assembly process, thereby assuring improved ease of assembly. In addition, since the stator tabs are formed to include rotor-side surfaces which are substantially flat, the clearance between the rotor-side surfaces and the rotor tabs can be minimized. Furthermore, flatter tab surfaces facilitate the bending process and the like.

In the twenty-eighth embodiment described above, a polygonal outline does not need to be achieved both on the inner circumferential side and the outer circumferential side of the stator cores 232 and 252. A significant magnetic excitation force reducing effect can still be provided by assuming a polygonal outline on the inner circumferential side only with the outer circumferential side retaining a round shape. In addition, a round outline may be assumed on the inner circumferential side and a polygonal outline may be assumed over the outer circumferential side to ensure desirable cooling performance or ease of assembly.

Twenty-Ninth Embodiment

Figure 50:
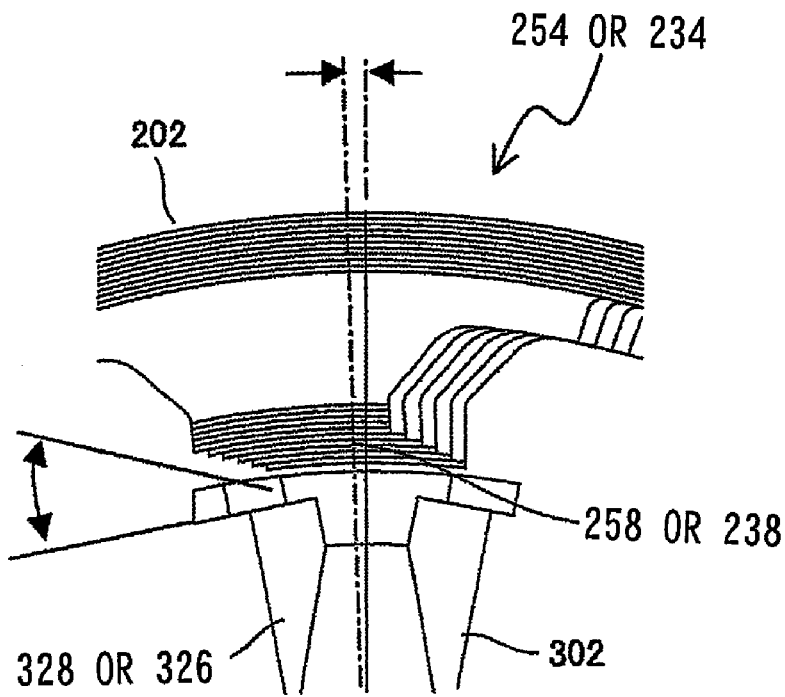
FIG. 50 is a front view of the stator and the rotor achieved in a twenty-ninth embodiment, taken from the side where the front ends of the stator tab magnetic poles and the rotor tab magnetic poles are present.

Next, the twenty-ninth embodiment of the present invention is explained in reference to FIG. 50. FIG. 50 is a front view of a stator 202 and the rotor 302 achieved in the twenty-ninth embodiment, showing a stator tab and a rotor tab on their front-end side. It is to be noted that the same terms and reference numerals are assigned to structural elements identical to those in the other embodiments to preclude the necessity for a repeated explanation thereof. In the twenty-ninth embodiment, the individual steel sheets are layered one top of another with an offset by an angle θ along the circumferential direction, as shown in FIG. 50. By layering the steel sheets with an offset along the circumferential direction, the gap between the stator tab 238 or 258 and the rotor tab is made to gradually widen along the circumferential direction, achieving advantages similar to those in the twenty-eighth embodiment, i.e., the magnetic flux is allowed to fluctuate gently and the magnetic excitation force is reduced. Ultimately, the magnetic noise can be reduced. It is to be noted that the gap between the stator tab and the rotor tab gradually widens along the circumferential direction only on one side, with the gap on the other side remaining the same width. Namely, since the rotor 302 rotates only along a single direction, the gap only needs to be formed so as to widen on the side opposite from the direction along which the rotor 302 rotates. In addition, the steel sheets should be offset by an angle θ set within a range of 0.5~3°, and sets of steel sheets, each made up with a predetermined number of sheets, may be set with an offset relative to groups of sheets rather than individual steel sheets.

Thirtieth Embodiment

Figure 51A:
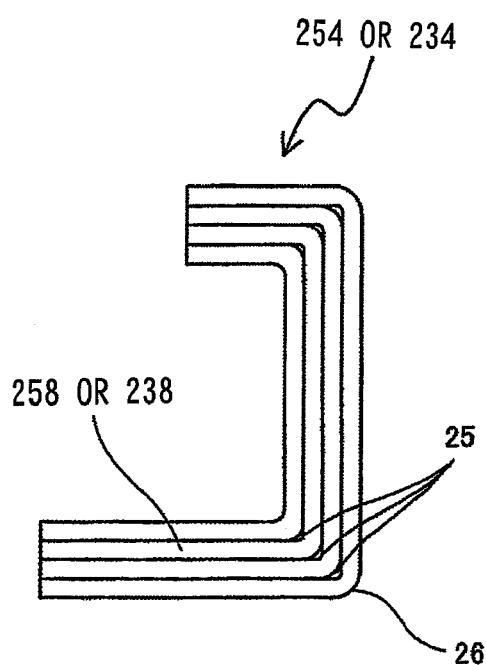
FIGS. 51A and 51B illustrate a stator core base member that may be used in a thirtieth embodiment.
Figure 51B:
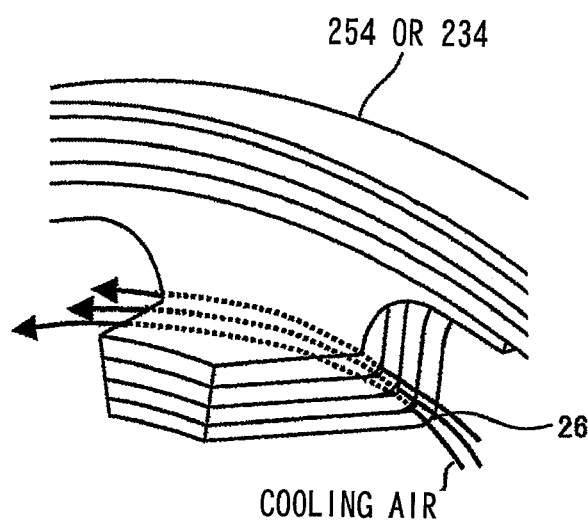

In reference to FIGS. 51A and 51B, the thirtieth embodiment of the present invention is described. FIG. 51A is a sectional view of the stator core achieved in the thirtieth embodiment taken through a side surface thereof. FIG. 51B is a perspective viewing the area of a stator tab achieved in the thirtieth embodiment. It is to be noted that the same terms and reference numerals are assigned to structural elements identical to those in the other embodiments to preclude the necessity for a repeated explanation thereof. As shown in FIG. 51A, a clearance 25 is formed between individual steel sheets over the bent portions 26 at the stator tab 238 or 258. The stator tab can be cooled efficiently as cooling air flows through these clearances 25, as shown in FIG. 51B.

Thirty-First Embodiment

Figure 52A:
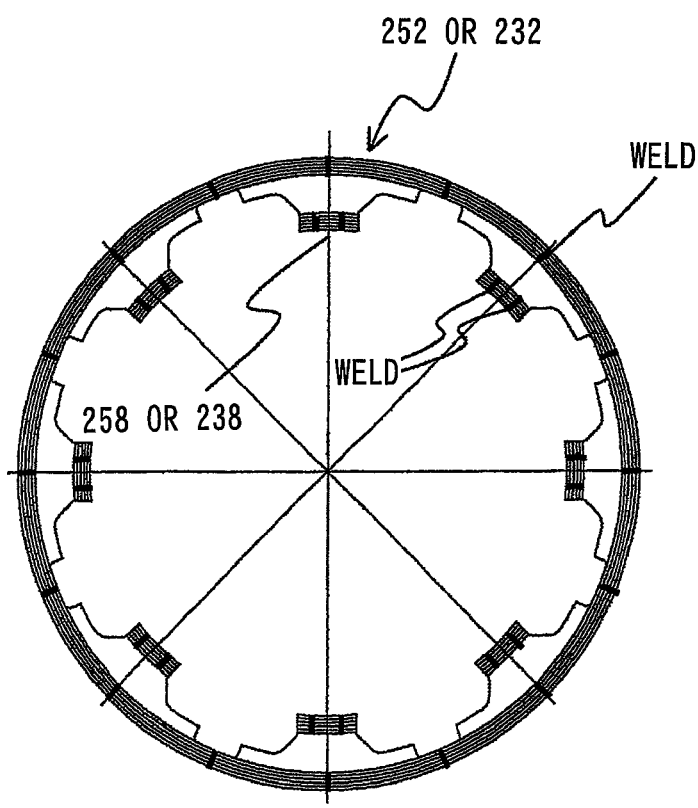
FIGS. 52A and 52B illustrate a stator core base member that may be used in a thirty-first embodiment.
Figure 52B:
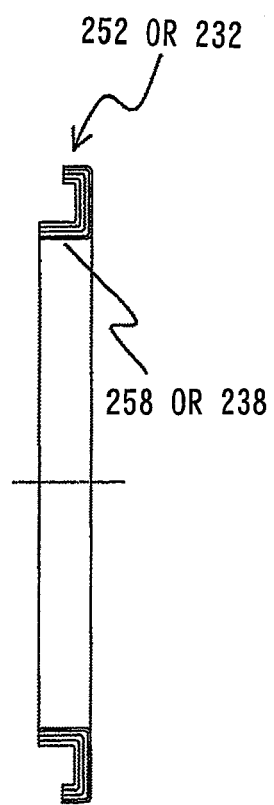

In reference to FIGS. 52A and 52B, the thirty-first embodiment of the present invention is described. FIG. 52A is front view of a stator core 232 or 252 achieved in the thirty-first embodiment. FIG. 52B is a sectional view of the stator core 232 or 252 achieved in the thirty-first embodiment taken through a side surface thereof. It is to be noted that the same terms and reference numerals are assigned to structural elements identical to those in other embodiments, to preclude the necessity for a repeated explanation thereof. In the thirty-first embodiment, the steel sheets layered one top of another are fixed together by welding the layered surface over which the steel sheets are stacked on top of one another at the stator core 232 or 252. As shown in FIG. 52A, each of the stator tabs 238 or 258 is welded at two positions along the layering direction and also, the center of each stator tab 238 or 258 along the circumferential direction and a midway position between the stator tabs 238 or 258 are likewise welded along the layering direction over the outer circumferential side layered surface over which the steel sheets are stacked on top of one another. The steel sheets may be welded together through laser welding to minimize the extent of weld penetration and thus minimize the bead height. Through these measures, degradation of the magnetic characteristics is inhibited.

As described above, the steel sheets are fixed together by welding them over the layered surfaces at each of the stator tabs 238 and 258 in the embodiment. As a result, the steel sheets present closer to the rotor 302 are not pulled by the attraction force applied as the magnetic flux passes from the rotor 302 toward the stator tab 238 or 258, and also, the extent of magnetic noise attributable to rattling of the steel sheets caused by a change in the magnetic flux can be reduced. It is to be noted that the steel sheets should be welded at positions through which the magnetic flux is least likely to flow. The steel sheets may also be welded at the stator tab 238 or 258 over its side surfaces along the circumference.

Thirty-Second Embodiment

In reference to FIGS. 53A to 53D, the thirty-second embodiment of the present invention is described. FIG. 53A is a perspective of a phase stator corresponding to a single phase as achieved in the thirty-second embodiment. FIG. 53B is a sectional view of a portion of the phase stator in FIG. 53A. FIG. 53C is a perspective showing the stator coil 206 and its bobbin 28 in a sectional view. FIG. 53D is a front view of a portion of the bobbin 28 taken along the circumferential direction. It is to be noted that the same terms and reference numerals are assigned to structural elements identical to those in the other embodiments to preclude the necessity for a repeated explanation thereof. While insulating paper is disposed between the stator coil 206 and the stator core 232 and between the stator coil 206 and the other stator core 252 in the first embodiment, a bobbin 28 constituted of a nonmagnetic material is used in place of insulating paper in the thirty-second embodiment. The bobbin 28, constituted of resin, is formed so as to enclose the stator coil 206, as shown in FIG. 53(c). Portions of the bobbin 28 are set one on top of another over the outer circumference of the bobbin 28 and the stator core 206 can be inserted through this area over which the portions are set one on top of another.

The bobbin 28 includes two positioning projections 2182 formed as an integrated part thereof at one side surface along the axis of the bobbin 28, as shown in FIG. 53A. In addition, two positioning projections 2184 are formed as an integrated part of the bobbin 28 at the other side surface (see FIG. 53D). The positioning projections 2182 formed on one side surface of the bobbin 28 along the axial direction are set at predetermined positions assumed along the circumference of the stator cores 232 and 252, i.e., at positions separated by a mechanical angle of 180° relative to each other along the circumference of the stator cores 232 and 252. As shown in FIG. 53D, the positioning projections 2182 formed at one side surface of the bobbin 28 along the axial direction and the positioning projections 2184 formed at the other side surface of the bobbin 28 along the axial direction assume positions offset from one another by an electrical angle of 180°. These positioning projections 2182 and 2184 are each made to fit inside stator recesses 240 and 260 (see FIG. 6) formed between stator tabs as shown in FIG. 53B. As the positioning projections 2182 and 2184 are fitted in the individual recesses at the stator core 232 and 252, the stator core 232 and 252 can be positioned along the circumferential direction. It is to be noted that while at least one positioning projection 2182 and 2184 must be formed at the two side surface of the bobbin 28 along the axial direction, two or more positioning projections may be formed at each side surface.

Thirty-Third Embodiment

Figure 54A:
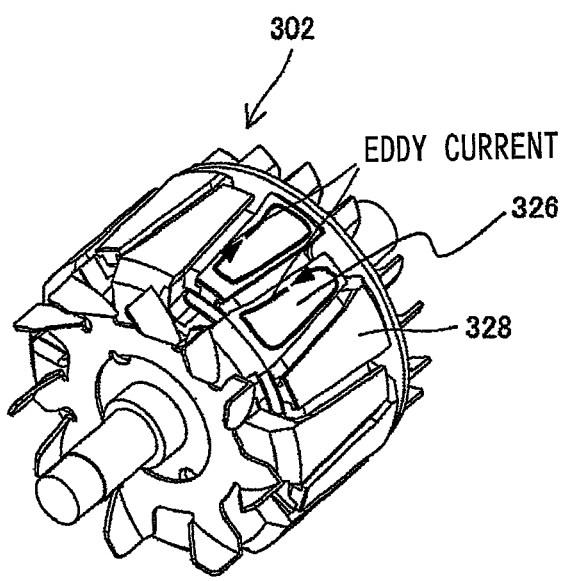
FIGS. 54A to 54F show the rotor achieved in a thirty-third embodiment.
Figure 54B:
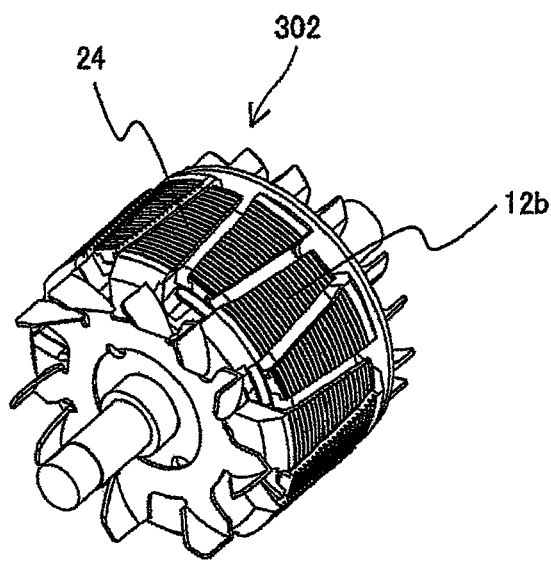
Figure 54C:
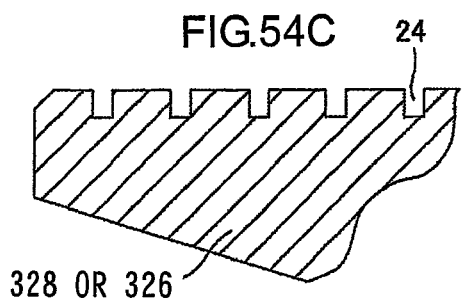
Figure 54D:
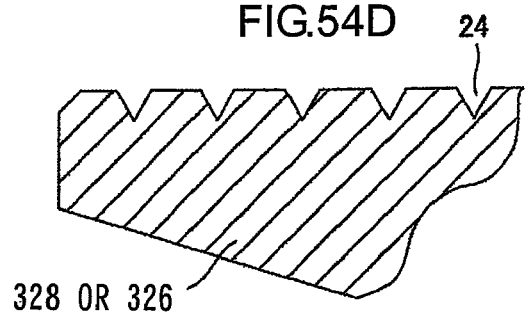
Figure 54E:
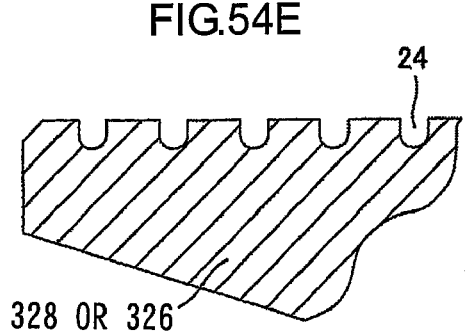
Figure 54F:
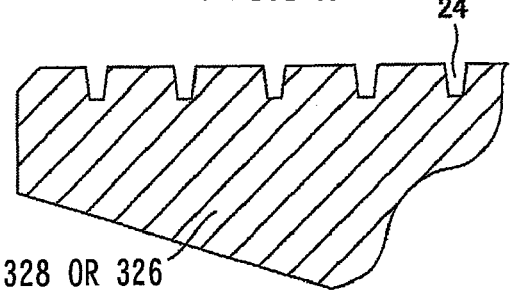
Figure 55A:
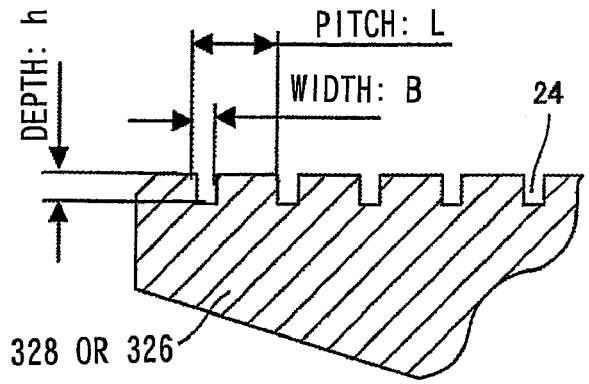
FIGS. 55A to 55C show the relationship between the pitch at which grooves are formed at a rotor magnetic pole and the groove width observed in the thirty-third embodiment.
Figure 55B:
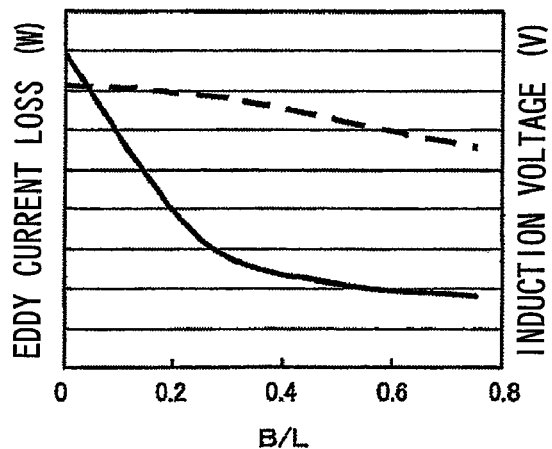
Figure 55C:
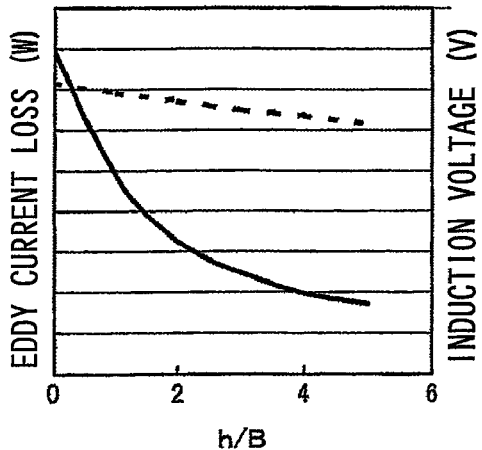

In reference to FIGS. 54 and 55, the thirty-third embodiment of the present invention is described. FIG. 54A is a perspective of a rotor 302 provided to facilitate an explanation of the eddy current. FIG. 54B is a perspective of the rotor 302 achieved in the thirty-third embodiment. FIGS. 54C through 54F each illustrate a specific shape that may be adopted in grooves 24 in a sectional view of a rotor tab taken along the axial direction. FIG. 55A is a sectional view of a rotor tab 326 or 328 taken along the axial direction. FIG. 55B presents a graph indicating the relationship of the groove pitch/width ratio to the eddy current loss and the induction voltage. FIG. 55C presents a graph indicating the relationship of the groove depth/width ratio to the eddy current loss and the induction voltage. It is to be noted that the same terms and reference numerals are assigned to structural elements identical to those in the other embodiments. While the eddy current occurs as described earlier at the stator cores 232 and 252, an eddy current also occurs at the rotor 302. The arrows in FIG. 54A indicate how the eddy current having been generated at the rotor tabs flows. As shown in the figure, the eddy current flows so as to circle around over the outer surfaces of the individual rotor tabs.

In the embodiment, a plurality of grooves 24 extending along the circumferential direction are formed over substantially equal intervals taken along the rotational axis at the outer surface of each rotor tab, as shown in FIG. 54B. The presence of the plurality of grooves 24 formed at the outer surfaces of the rotor tabs as described above raises the electrical resistance to disallow the ready flow of eddy currents.

FIGS. 54C through 54F each illustrate a specific shape that may be assumed in the groove section. The section of the groove 24 in FIG. 54C is substantially quadrangular, whereas the section of the groove 24 in FIG. 54D is substantially triangular. The section of the groove 24 in FIG. 54E is substantially semicircular, whereas the section of the groove 24 in FIG. 54F is substantially trapezoidal. In other words, the grooves 24 may be formed to achieve any of various sectional shapes.

Next, in reference to FIGS. 55A to 55C, the relationship of the groove depth, the groove width and the groove pitch to the eddy current loss and the induction voltage is explained. In FIG. 55A, h represents the groove depth, B represents the groove width and L represents the groove pitch. The relationship of the ratio B/L to the eddy current loss and the induction voltage is shown in FIG. 55B. As shown in FIG. 55B the slope of the eddy current loss is shallower over a B/L range of approximately 0.2 and greater. In other words, the extent of the eddy current loss does not decrease drastically over this range. FIG. 55B also indicates that the level of the induction voltage decreases to a significant extent over a B/L range of approximately 0.3 and greater. In practical application, the B/L ratio should be set within a range of 0.1~0.6 to assure both a viable extent of eddy current loss and a viable level of induction voltage. It is even more desirable to set the B/L ratio to 0.2~0.3 in consideration of the factors discussed above.

FIG. 55C shows the relationship of the ratio h/B to the eddy current loss and the induction voltage. FIG. 55C indicate that the slope of the eddy current loss is less acute in an h/B range of 2 and greater. In other words, the extent of the decrease in the eddy current loss is less significant over this range. In addition, the induction voltage becomes lower as h/B assumes a greater value. In practical application, the h/B ratio should be set within a range of 2~5 to assure both a viable extent of eddy current loss and a viable level of induction voltage. It is even more desirable to set the h/B ratio to 2~3 in consideration of the factors discussed above.

Thirty-Fourth Embodiment

Figure 56A:
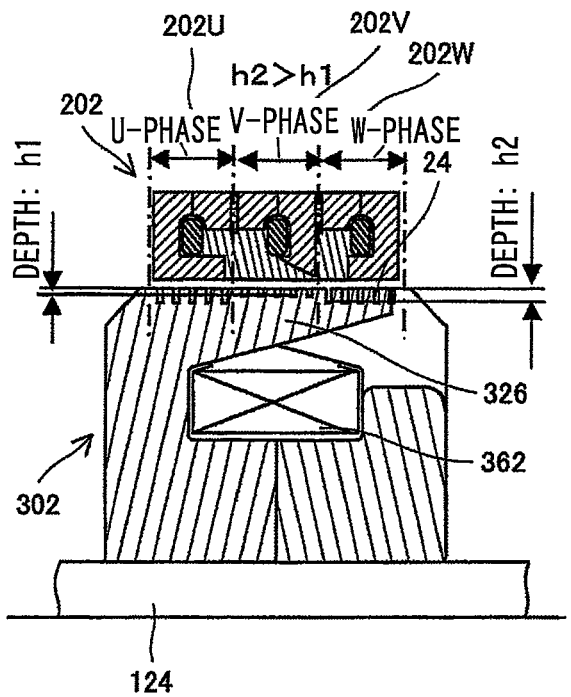
FIGS. 56A to 56C show the relationship between the depth of the grooves formed at the rotor magnetic pole and the groove width, observed in the thirty-third embodiment.
Figure 56B:
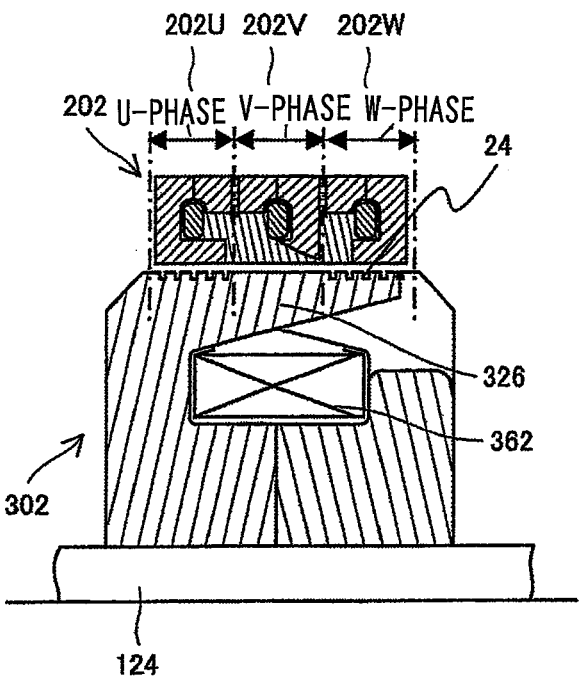
Figure 56C:
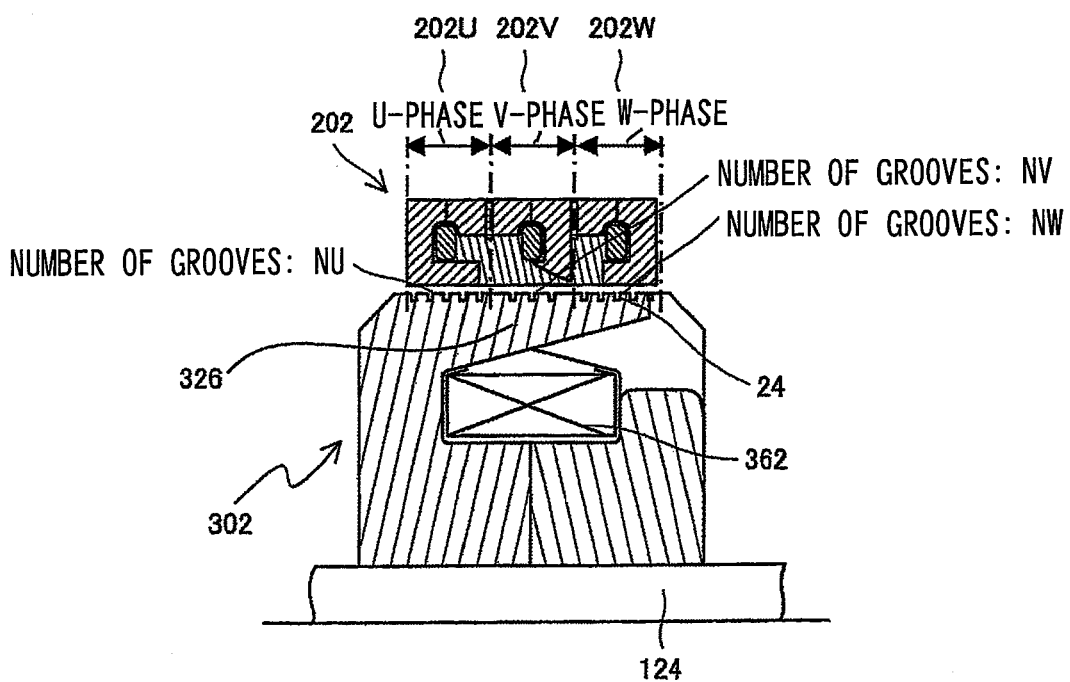

In reference to FIGS. 56A to 56C, the thirty-fourth embodiment of the present invention is described. FIG. 56A shows a first example adopting the thirty-fourth embodiment in a sectional view of the rotor 302 and the stator 202 taken over side surfaces thereof. FIG. 56B shows a second example adopting the thirty-fourth embodiment in a sectional view of the rotor 302 and the stator 202 taken over side surfaces thereof. FIG. 56C shows a third example adopting the thirty-fourth embodiment in a sectional view of the rotor 302 and the stator 202 taken over side surfaces thereof. It is to be noted that the same terms and reference numerals are assigned to structural elements identical to those in the other embodiments. In the first example adopting the thirty-fourth embodiment shown in FIG. 56A, the grooves 24 at the rotor tabs having been described in reference to the thirty-third embodiment, are formed differently over different areas. In the stator 202 achieved by disposing the U-phase stator, the V-phase stator and the W-phase stator in this order along the rotational axis, the magnetic flux at the V-phase stator 202V disposed in the middle between the two other phase stators along the rotational axis, is allowed to leak via the phase stators disposed on the two sides of the V-phase stator along the rotational axis, as has been explained in reference to the second embodiment. Thus, special measures must be taken at the V-phase stator to ensure that the voltage induced at the V-phase stator is equal to the voltages induced at the U-phase stator and the W-phase stator. In the example presented in FIG. 56A, the grooves 24 are formed over the area facing opposite the V-phase stator 202V to a depth h1 set smaller than the depth of the grooves 24 formed over the areas facing opposite the U-phase stator 202U and the W-phase stator 202W. As a result, an equivalent air gap at the V-phase stator 202V relative to the rotor 302 is reduced and thus, the level of the voltage induced in the V-phase is increased. Consequently, voltages can be induced at the individual phase stator coil 206 at substantially matching levels.

FIG. 56B presents the second example adopting the thirty-fourth embodiment. In this example, no grooves 24 are formed over the area facing opposite the V-phase stator 202V. A structure with no grooves 24 formed over the area facing opposite the V-phase stator 202V, too, achieves an advantage similar to that of the example shown in FIG. 56A in that the levels of the voltages induced via the individual phase stator coil 206 are substantially equalized.

FIG. 56C shows the third example adopting the thirty-fourth embodiment. In this example, grooves 24 are formed over the area facing opposite the V-phase stator 202V in a smaller number NV compared to the number of grooves NU and NW formed over the areas facing opposite the U-phase stator 202U and the W-phase stator 202W. It is to be noted that the number of grooves NU formed over the area facing opposite the U-phase stator 202U and the number of grooves NW formed over the area facing opposite the W-phase stator 202W are equal to each other. Through this structure, the size of the effective area at the surfaces of the rotor tabs is adjusted so as to substantially equalize the voltages induced via the individual phase stator coil 206.

Through the thirty-fourth embodiment having been described above by quoting specific examples, an advantage is achieved in that the levels of the voltages induced via the individual phase stator coil 206 are substantially equalized as the depth or the quantity of grooves 24 at the outer surfaces of the rotor tabs 326 and 328 is adjusted in correspondence to their locations.

Thirty-Fifth Embodiment

Figure 57:
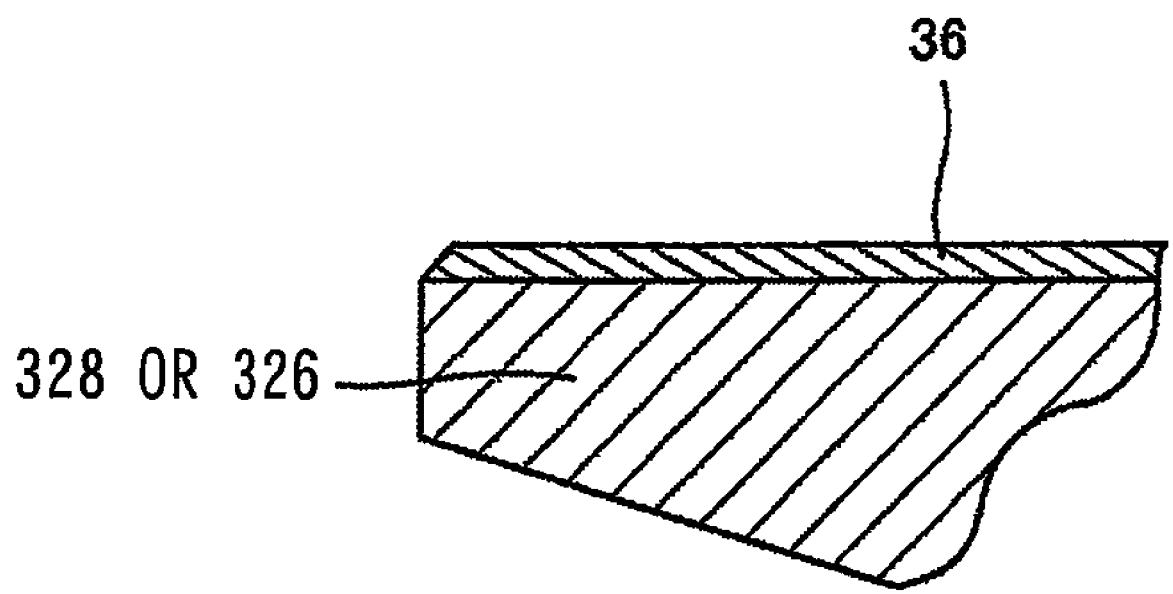
FIG. 57 is a sectional view of the rotor magnetic pole achieved in a thirty-fourth embodiment taken through a side surface thereof.

In reference to FIG. 57, the thirty-fifth embodiment of the present invention is described. FIG. 57 is a sectional view of a rotor tab 326 or 328 taken through a side surfaces thereof. It is to be noted that the same terms and reference numerals are assigned to structural elements identical to those in the other embodiments. While the eddy current is reduced via a plurality of grooves 24 formed at the outer surface of each rotor tab in the thirty-third embodiment and the thirty-fourth embodiment described earlier, a high resistance layer 36 is formed over the outer surface of the rotor tab by vapor deposition of a material with a high specific resistance or carburizing the outer surface of the rotor tab 326 and 328 in the thirty-fifth embodiment. By adopting this structure, too, an advantage of the reduction in the eddy current is achieved.

Thirty-Sixth Embodiment

Figure 58A:
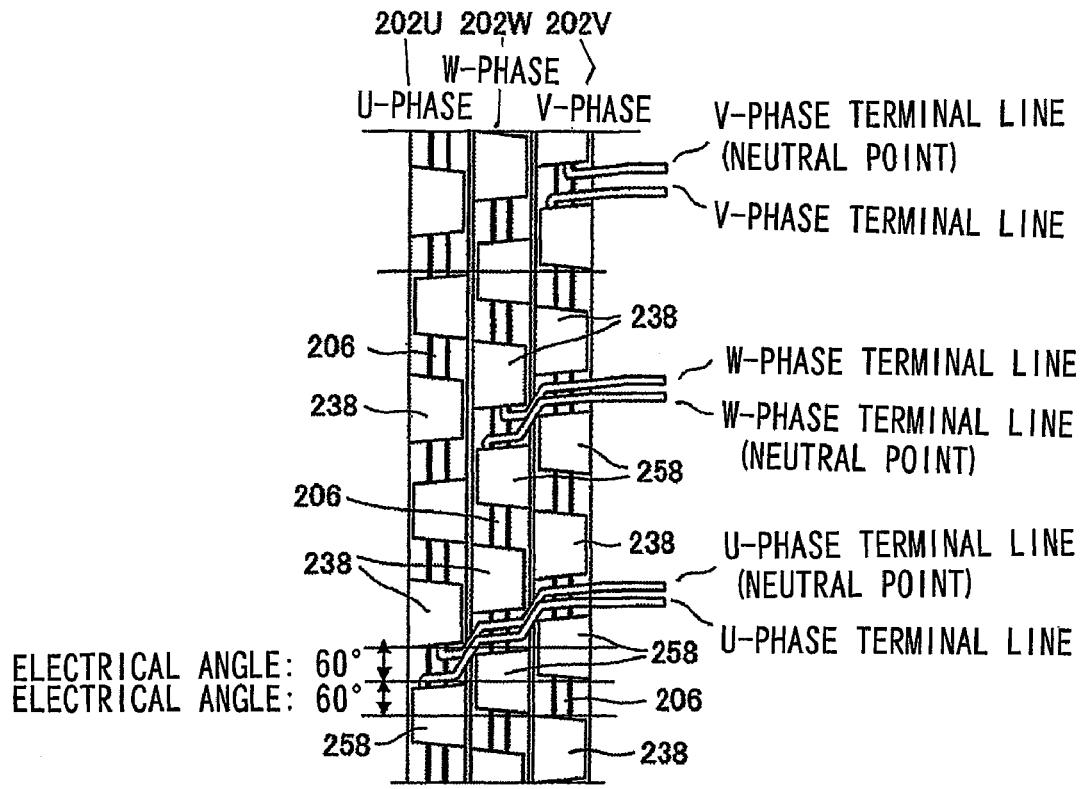
FIGS. 58A to 58C illustrate the stator achieved in a thirty-sixth embodiment.
Figure 58B:
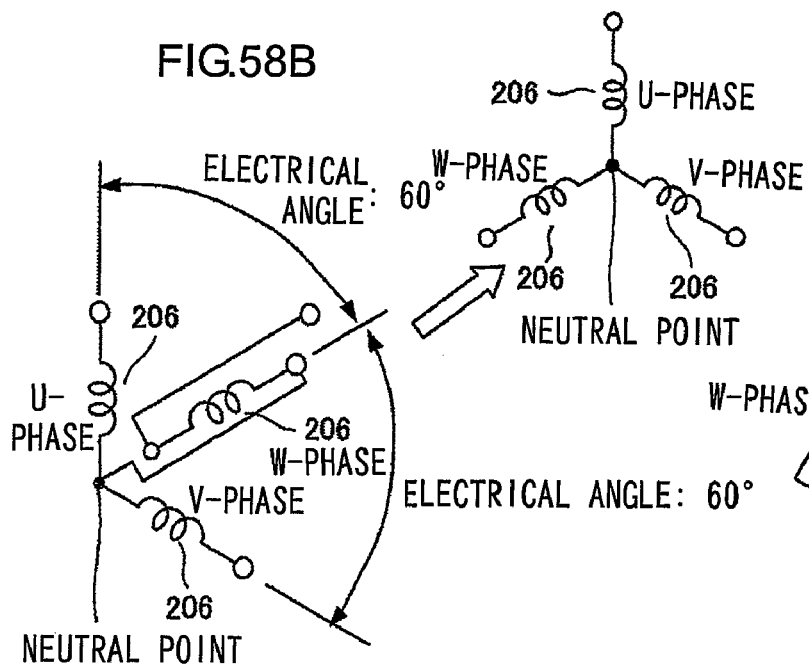
Figure 58C:
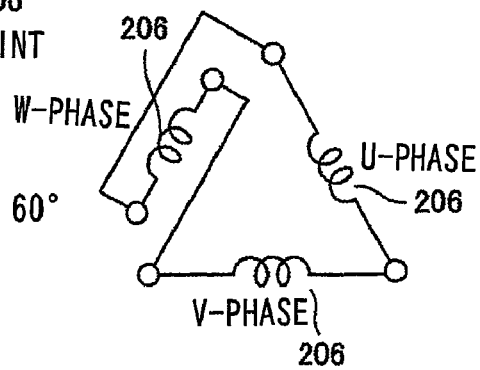

In reference to FIGS. 58A to 58C, the thirty-sixth embodiment of the present invention is described. FIG. 58A shows stator tab magnetic poles achieved in the thirty-sixth embodiment, viewed from the inner circumferential side. FIG. 58B is a circuit diagram showing an example of a star connection. FIG. 58C is a circuit diagram showing an example of a delta connection. It is to be noted that the same terms and reference numerals are assigned to structural elements identical to those in the other embodiments. In the embodiments described earlier, the stator 202 is achieved by disposing the U-phase stator 202U, the V-phase stator 202V and the W-phase stator 202W in this order along the rotational axis, with the stator tabs 238 and 258 at the stator cores in the individual phase stators set with an electrical angle offset of 120°. While the front ends of the stator tabs 238 at the stator core of a given phase stator are offset relative to the front ends of the stator tabs 258 at the stator core of an adjacent phase stator, they cannot be positioned with a significant offset. This gives rise to a concern that the process of laying out the terminal lines of the individual phase stator coil 206 is bound to be complicated. There is an added concern that a significant extent of leakage flux may occur among the individual phase stators.

In the thirty-sixth embodiment, the terminal lines of the W phase stator coil 206 are connected in a pattern the reverse of that assumed in the previous embodiment, as shown in FIG. 58B, the stator tabs 238 and 258 at the U-phase stator and the W-phase stator are offset by an electrical angle of 60° and the stator tabs 238 and 258 at the W phase stator and the V-phase stator are also offset by an electrical angle of 60°, thereby achieving a connection equivalent to that in the previous embodiment, whereby the stator tabs 238 and 258 at the U-phase stator 202U, the V-phase stator 202V and the W-phase stator 202W are offset by an electrical angle of 120°. In the stator 202, the phase stators are disposed along the axial direction in the order of; U-phase stator 202U, the W-phase stator 202W and the V-phase stator 202V, as shown in FIG. 58A. In this structure, the extent by which the stator tabs 238 and 258 at each phase stator are offset along the circumferential direction is reduced, i.e., the extent by which the front ends of the stator tabs 238 at the stator core of a given phase stator and the front ends of the stator tabs 258 at the stator core of an adjacent phase stator are offset relative to each other along the circumferential direction can be increased. Since this structure assures a greater width in the area over which the terminal lines of the individual phase stator coil 206 are passed through, the process of drawing out the terminal lines of the phase stator coil 206 toward the outside of the stator 202 can be performed more easily. In addition, as long as the gaps between the stator tabs 238 and the gaps between the stator tabs 258 are not filled with resin or the like cooling air is allowed to travel with ease along the axial direction to achieve better cooling performance. Moreover, since the extent to which the front ends of the stator tabs 238 at the stator core of a given phase stator and the front ends of the stator tabs 258 at the stator core of an adjacent phase stator are offset relative to each other along the circumferential direction, can be increased, the extent of leakage flux occurring over the adjacent phase stators can also be reduced. The reduced extent of leakage flux, in turn, improves the efficiency and ultimately, greater power is generated even at a low rotation speed. It is to be noted that while the example in FIG. 58B assumes a star connection, the thirty-sixth embodiment may be adopted in conjunction with a delta connection, as shown in FIG. 59C.

Thirty-Seventh Embodiment

Figure 59A:
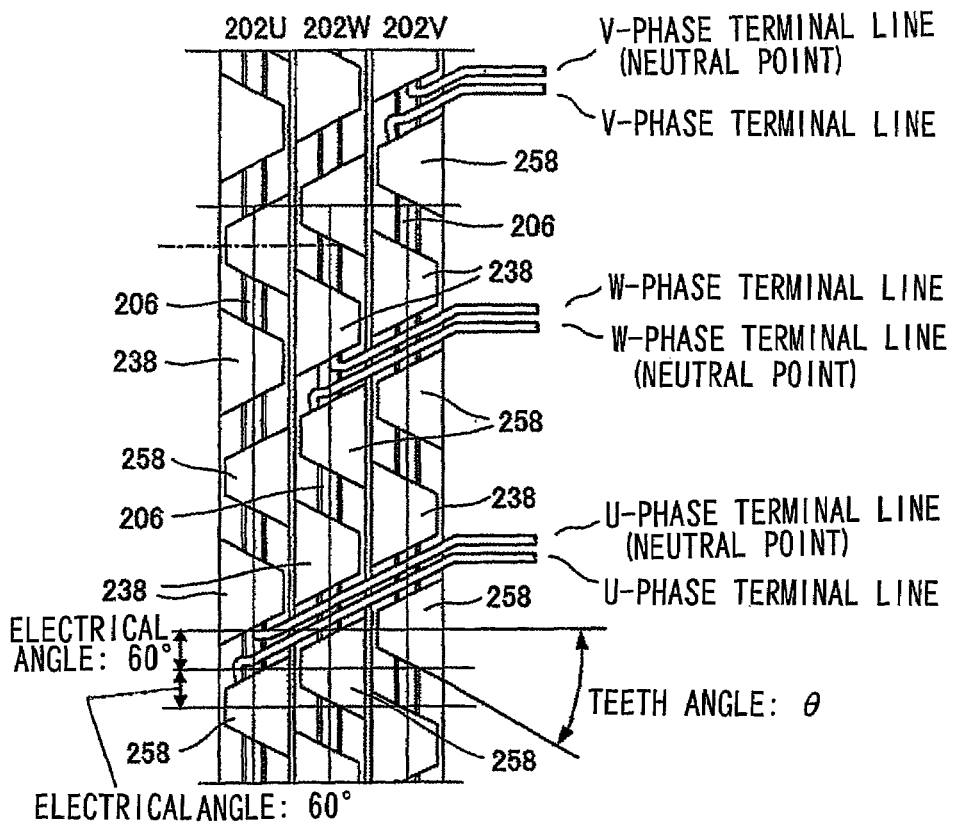
FIGS. 59A and 59B illustrate the stator achieved in a thirty-seventh embodiment.
Figure 59B:
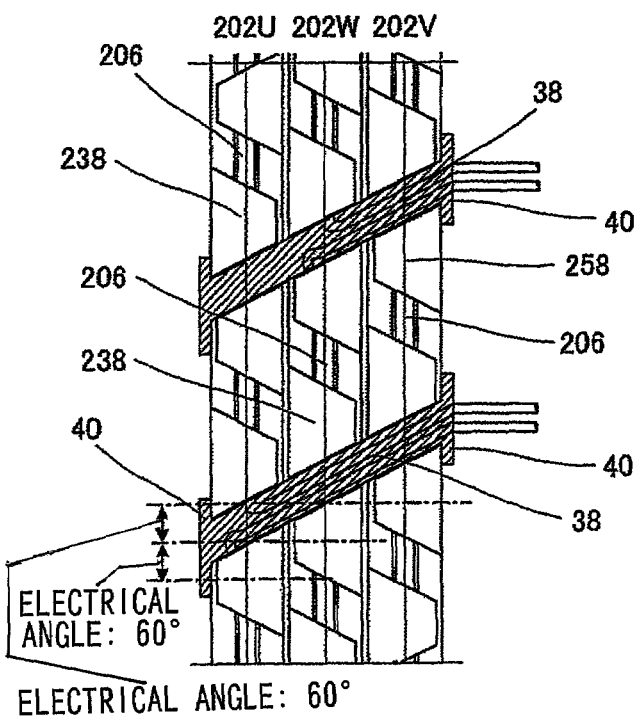

In reference to FIGS. 59A and 59B, the thirty-seventh embodiment of the present invention is described. FIG. 59A shows stator tab magnetic poles in the thirty-seventh embodiment viewed from the inner circumferential side. FIG. 59B shows positioning members attached to the stator shown in FIG. 59A. It is to be noted that same terms and reference numerals are assigned to structural elements identical to those in the other embodiments. While the thirty-seventh embodiment is similar to the thirty-sixth embodiment in that the terminal lines of the stator coil 206 are connected as in the thirty-sixth embodiment and that the stator 202 is achieved by disposing the U-phase stator 202U, the W-phase stator 202W and the V-phase stator 202V in this order along the axial direction, the skew angle θ of the stator tabs 238 and 258 is adjusted in the thirty-seventh embodiment so that the gaps between the stator tabs 238 and 258 lie continuously along a substantially straight line over the various phase stators. The skew angle θ of the stator tabs 238 and 258 may be determined as expressed in (5) below, with $D_i$ representing the inner diameter (mm) of the stator cores 232 and 252, P representing the number of poles formed at the stator cores 232 and 252, $L_1$ representing the length of each phase stator in the stator 202 taken along the axial direction and $L_2$ representing the thickness of the link plates (the distance between the individual phase stators along the axial direction (mm)). It is to be noted that in consideration of inconsistencies and the like bound to occur during the manufacturing process, a margin of ±10° should be allowed for the skew angle θ of the stator tabs 238 and 258.

$$\theta = \tan^{-1} \cdot \left( \frac{\pi \cdot D_i}{3 \cdot P \cdot (L_1 + L_2)} \right) \quad (5)$$

In the embodiment, the gaps between the stator tabs 238 and 258 are formed so that they lie continuously substantially along a straight line over the individual phase stators and, as a result, the process of drawing out the terminal lines of the phase stator coil 206 to the outside of the stator 202 can be performed with even greater ease over the thirty-sixth embodiment. In addition, cooling air is allowed to travel with greater ease compared to the thirty-sixth embodiment and thus, better cooling performance is assured.

In addition, positioning members 38 constituted of a non-magnetic material such as resin may be disposed over the gaps between the stator tabs 238 and 258 at the individual phase stators, as shown in FIG. 59B. The positioning members 38 are formed substantially in the shape of a parallelogram sloping so as to range along the gaps between the stator tabs 238 and 258 lying continuously over the individual phase stators. Each positioning member includes a collar portion 40 disposed at each of the two ends along the axial direction to prevent it from sliding along the axial direction. With the positioning members 38 disposed over the gaps between the stator tabs 238 and 258 at the individual phase stators, the terminal lines of the stator coil 206 in the various phases can be protected and insulated. Moreover, the individual phase stators 202 can be positioned with ease along the circumferential direction. It is to be noted that while the positioning members 38 may each be formed by using a plate with a flat surface or a plate with a substantially U-shaped section, the terminal lines of the stator coil 206 should be led through the inner space of the positioning members 38 if they are each constituted with a plate having a substantially U-shaped section.

Thirty-Eighth Embodiment

Figure 60A:
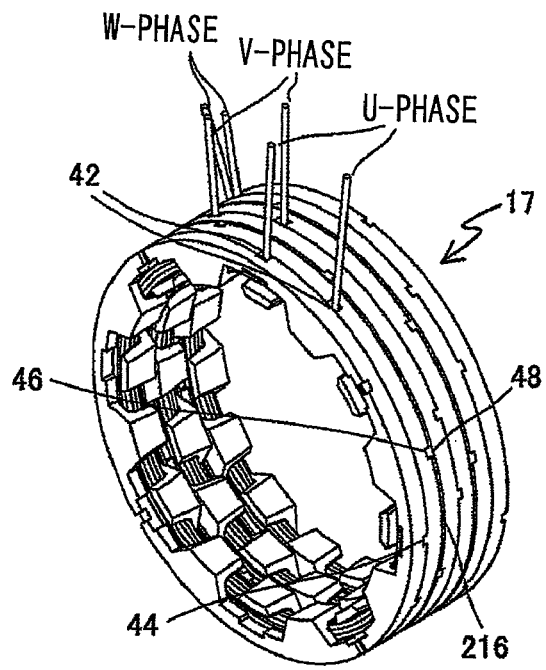
FIGS. 60A and 60B illustrate the stator achieved in a thirty-eighth embodiment.
Figure 60B:
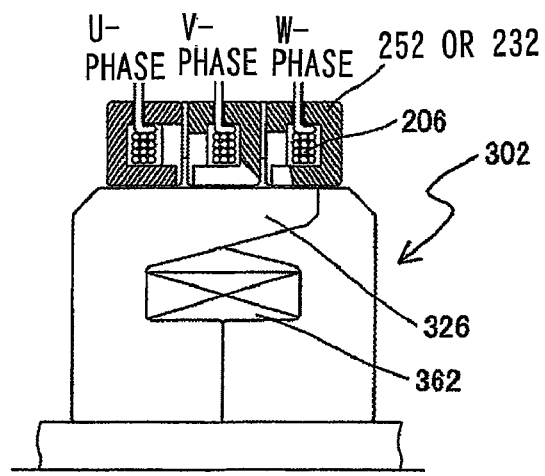

In reference to FIGS. 60A and 60B, the thirty-eighth embodiment of the present invention is described. FIG. 60A is a perspective of the stator 202 achieved in the thirty-eighth embodiment. FIG. 60B is a sectional view of the stator 202 and the rotor 302 achieved in the thirty-eighth embodiment taken along the rotational axis. It is to be noted that the same terms and reference numerals are assigned to structural elements identical to those in the other embodiments. While the terminal lines of the individual phase stator coil 206 are led through the gaps between the stator tabs 238 and 258 and are drawn out toward one end along the axial direction in the previous embodiment, indented portions 42 are formed at the surfaces of the two stator cores 232 and 252 facing opposite each other at each phase stator so that the two terminal lines of the stator coil 206 can be drawn out via the indented portions 42 toward the outer circumferential side of the stator cores 232 and 252.

More specifically, as shown in FIG. 60A, a plurality of indentations and projections are formed along the circumferential direction at each of the two surfaces at which the stator core 232 and the other stator cores 252 are in contact with each other at each phase stator. In all but one of the indented portions 42 formed at the stator core base member constituting one of the stator cores, projecting portions 44 formed at the stator core base member constituting the other stator core are fitted. In other words, in all but one of the indented portions 42 formed at the stator core 232 or 252, the projecting portions 44 at the other stator core 252 or 232 are fitted. This means that one unoccupied indented portion 42 is left at each stator core 232 or 252. The two terminal lines of the stator coil 206 are led through these unoccupied indented portions 42, as shown in FIG. 60B. The wiring process can be performed more efficiently by drawing out the two terminal lines of each stator coil 206 toward the outer circumferential side of the stator cores 232 and 252 as described above. There is an added advantage in that the terminal lines of the stator coil 206 do not project out into the gaps between the rotor 302 and the stator 202. In short, the clearance between the rotor 302 and the stator 202 can be further reduced.

In addition, a plurality of second indented portions 46 are also formed along the circumferential direction on the outer side surface of each stator core 232 or 252 along the axial direction and second projecting portions 48 are formed on the two side surfaces along the rotational axis at each link plate 216 disposed between the stator core 232 corresponding to a given phase and the stator core 252 corresponding to another phase. By fitting the second projecting portions 48 with the second indented portions 46, the stators corresponding to the various phases can be positioned accurately relative to each other along the circumferential direction.

Thirty-Ninth Embodiment

Figure 61A:
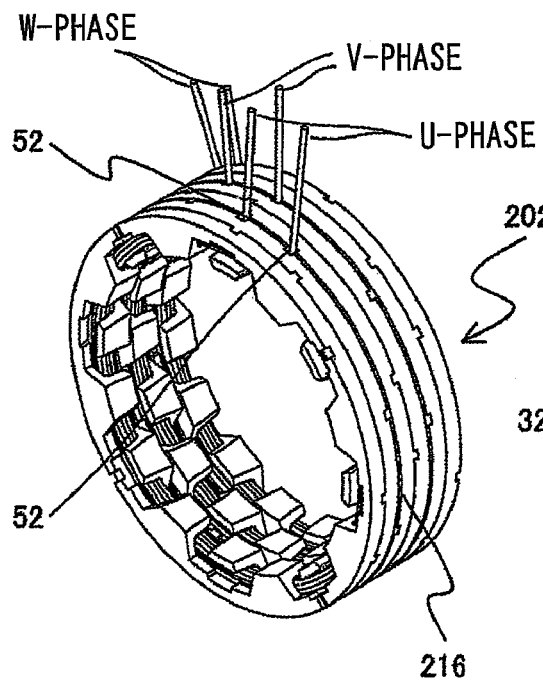
FIGS. 61A and 61B illustrate the stator achieved in a thirty-ninth embodiment.
Figure 61B:
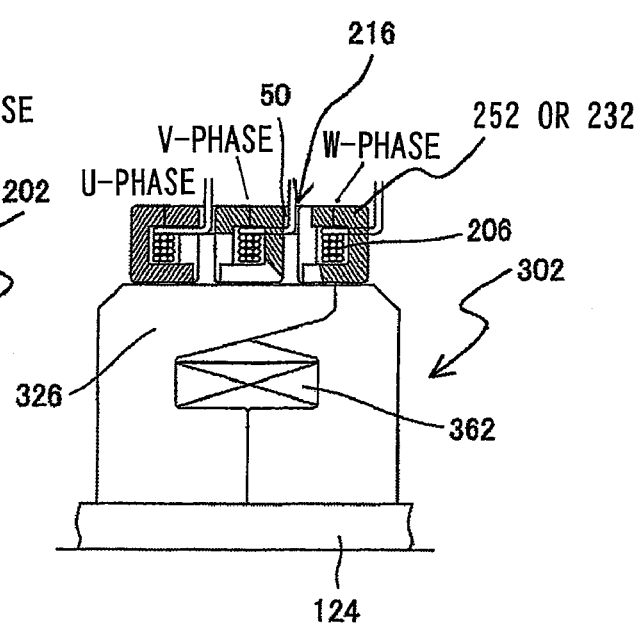

In reference to FIGS. 61A and 61B, the thirty-ninth embodiment of the present invention is described. FIG. 61A is a perspective of the stator 202 achieved in the thirty-ninth embodiment. FIG. 61B is a sectional view of the stator 202 and the rotor 302 achieved in the thirty-ninth embodiment taken along the rotational axis. It is to be noted that the same terms and reference numerals are assigned to structural elements identical to those in the other embodiments. While the two terminal lines of the stator coil 206 in each phase stator are drawn out through the clearance between the stator cores 232 and 252 in the thirty-eighth embodiment, the two terminal lines of the stator coil 206 corresponding to a given phase are drawn out through the clearance between the stator core 252 at the corresponding phase stator and the stator core 232 at the adjacent phase stator. As described earlier, the link plates 216 are disposed between the individual phase stators. In the embodiment, a notch 50, ranging toward the outer circumference is formed at two positions taken along the circumferential direction at each link plate 216 so as to thread the two terminal lines of the stator coil 206 through the notches 50. Third indented portions 52 are each formed at the outer side surface of the stator core 232 or 252 corresponding to one of the notches 50. In the embodiment in which the two terminal lines of each phase stator coil 206 are laid out over the area where a significant range is assured for purposes of magnetic insulation, efficient utilization of available space is achieved. Namely, since no notches need to be formed at the stator cores 232 and 252, the extent of deterioration in the magnetic characteristics is minimized. It is to be noted that the terminal lines of the stator coil 206 in the W phase are not led through the clearance relative to the V-phase stator. Instead, the terminal lines of the W-phase stator coil 206 are drawn out through the outer side of the W-phase stator 202W along the axial direction in FIG. 61B.

Fortieth Embodiment

Figure 62A:
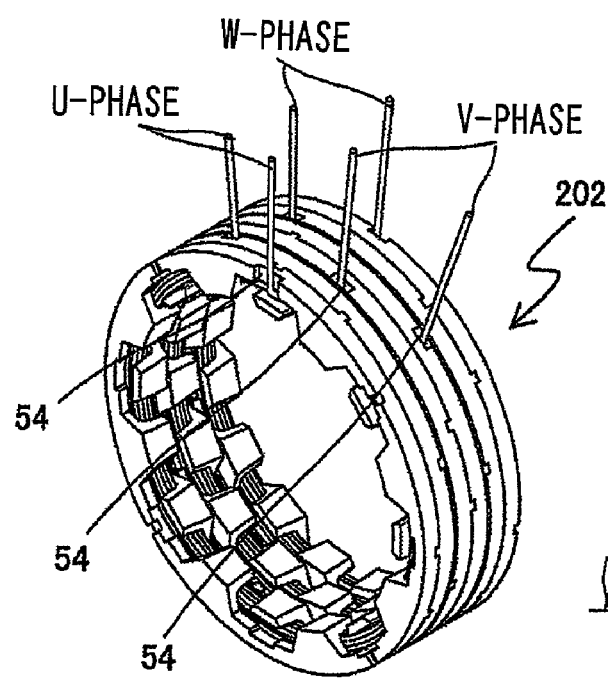
FIGS. 62A and 62B illustrate the stator achieved in a fortieth embodiment.
Figure 62B:
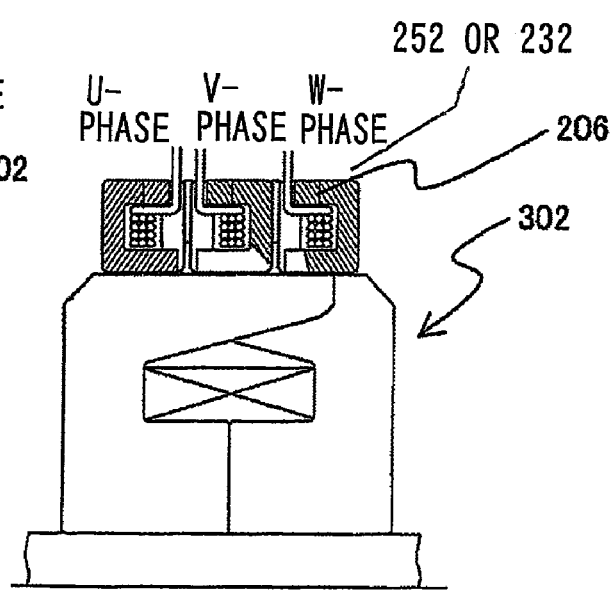

In reference to FIGS. 62A and 62B, the fortieth embodiment of the present invention is described. FIG. 62A is a perspective of the stator 202 achieved in the fortieth embodiment. FIG. 62B is a sectional view of the stator 202 and the rotor 302 achieved in the fortieth embodiment taken along the axial direction. It is to be noted that the same terms and reference numerals are assigned to structural elements identical to those in the other embodiments.

A fourth indented portion 54 is formed at the side surfaces of both the stator cores 232 and 252 along the axial direction at each phase stator and the two terminal lines of the stator coil 206 are drawn out through these fourth indented portions 54 in the fortieth embodiment. The fourth indented portions 54 are formed at a position at which the density of the magnetic flux passing over the phase stator cores is low, and for this reason, the level of induction voltage is not significantly lowered at the fourth indented portions 54. It is to be noted that the positions at which the density of the magnetic flux passing over the stator cores 232 and 252 is low are assumed over the outer circumferential portion of the stator, which faces opposite the front ends of the stator tabs 238 and 258, where the strength of the magnetic flux density is at its lowest. By forming the fourth indented portions 54 at such positions, the induction voltage can be sustained at the highest possible level in the embodiment.

Forty-First Embodiment

Figure 63A:
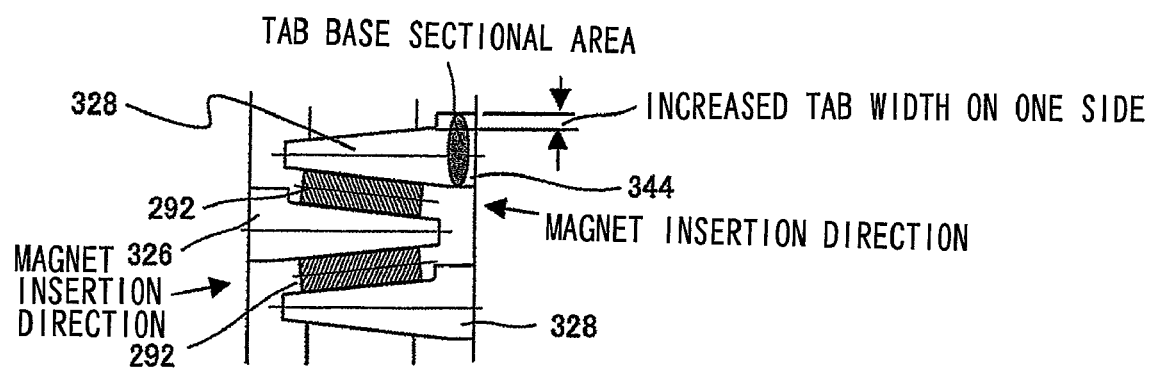
FIGS. 63A and 63B show the magnetic poles of the rotor tabs achieved in a forty-first embodiment.
Figure 63B:
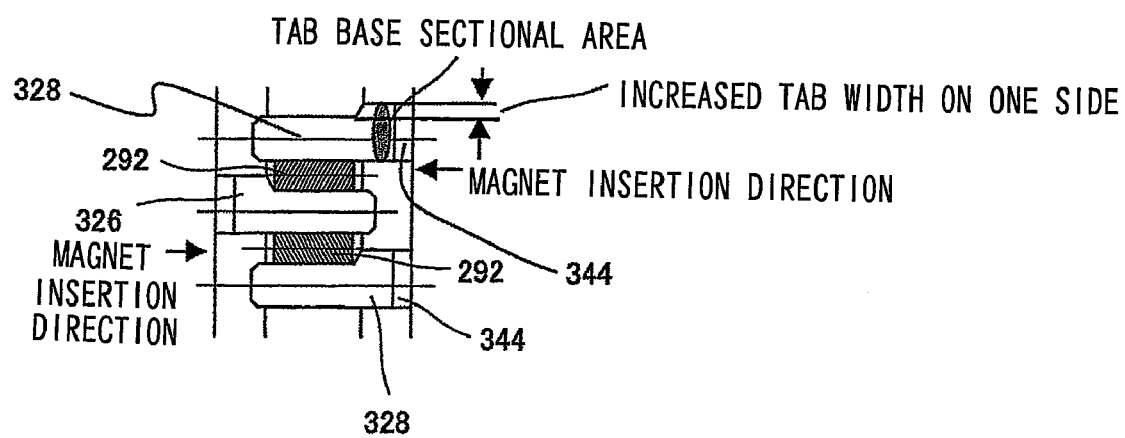
Figure 64A:
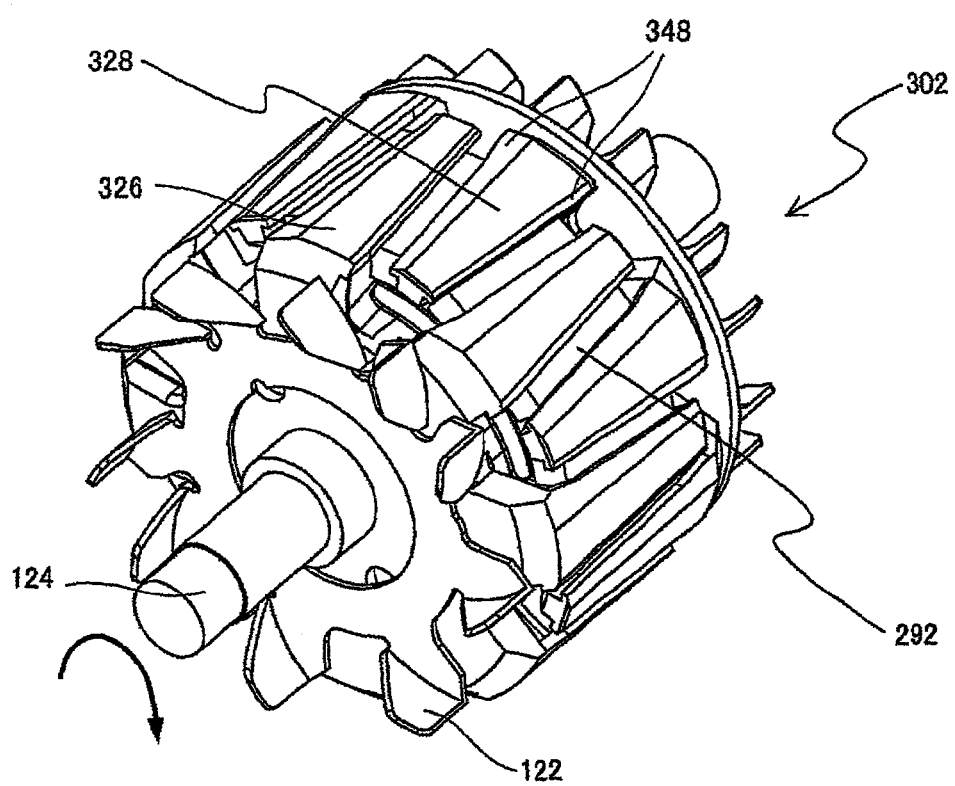
FIGS. 64A to 64C illustrate the rotor achieved in the forty-first embodiment.
Figure 64B:
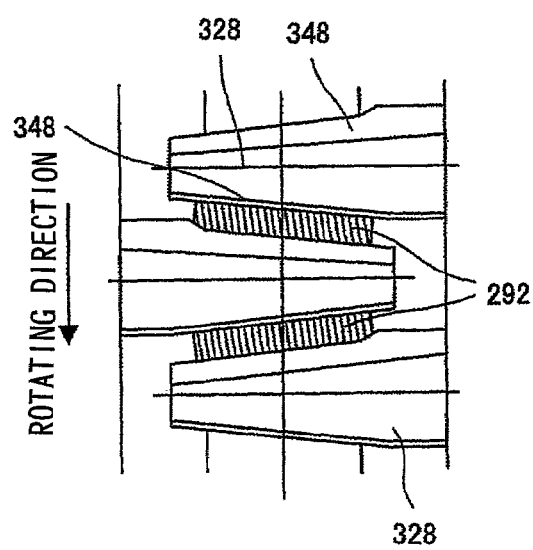
Figure 64C:
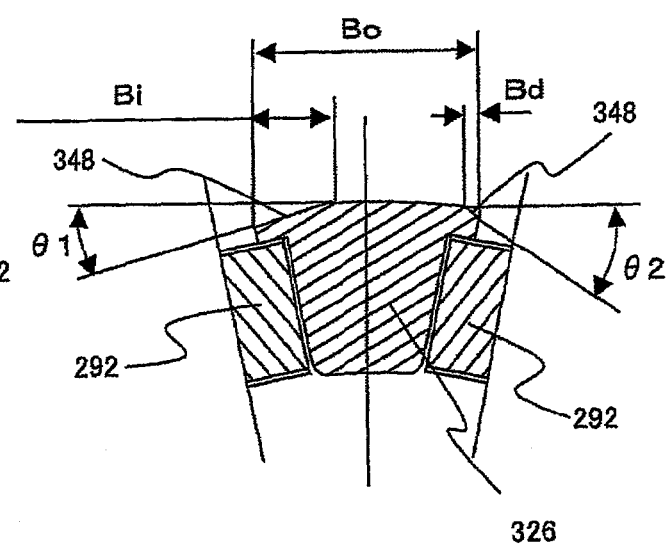
Figure 65:
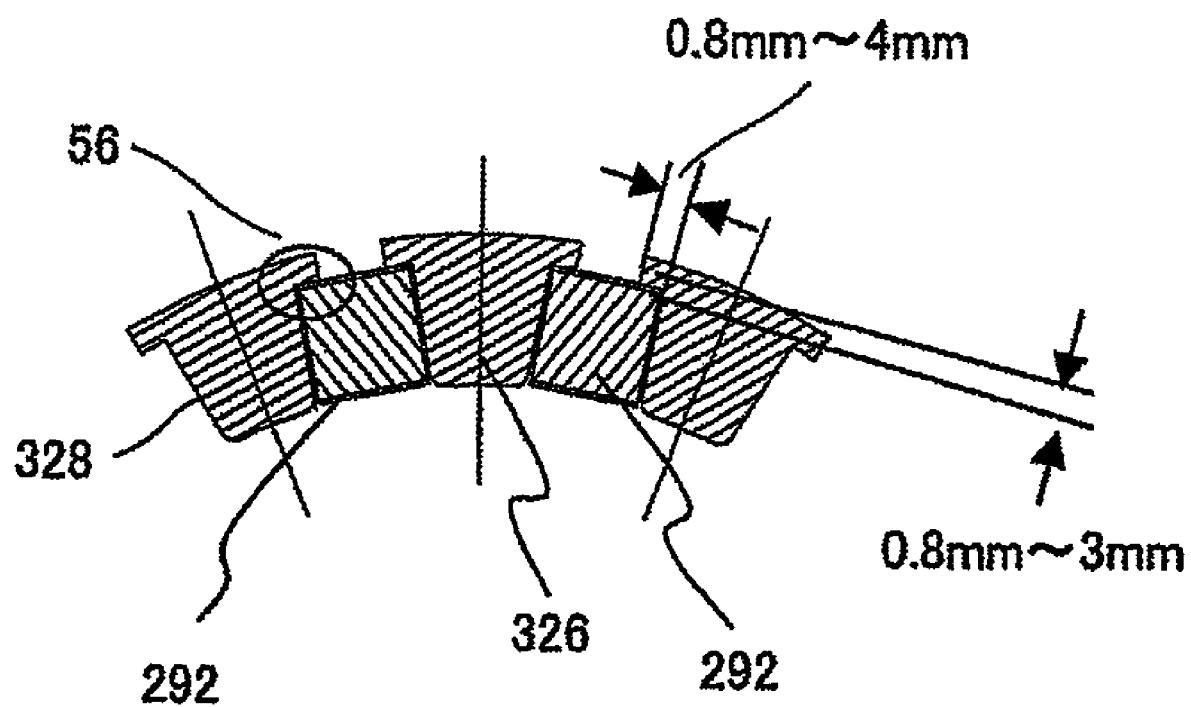
FIG. 65 is a sectional view of the magnetic poles of the rotor tabs achieved in the forty-first embodiment taken through the front surfaces.

The forty-first embodiment of the present invention is described in reference to FIGS. 63 through 65. FIG. 63A is a side elevation of an example of the rotor achieved in the forty-first embodiment. FIG. 63B is a side elevation of another example of the rotor achieved in the forty-first embodiment. FIG. 64A is a perspective showing an example of the rotor 302 achieved in the forty-first embodiment. FIG. 64B is a side elevation of rotor tabs 366 and 368 in FIG. 64A. FIG. 64C is a sectional view of one of the rotor tabs 326 and 328 in FIG. 64A taken through a front side thereof. FIG. 65 is a sectional view of rotor tabs 326 and 328 indicating specific dimensions that may be selected for specific portions thereof. It is to be noted that the same terms and reference numerals are assigned to structural elements identical to those in the other embodiments. The rotor tabs in the previous embodiments assume a tapered shape with the width thereof gradually reduced toward the front end, so as to achieve symmetry along the circumferential direction. Since magnetic saturation occurs readily over a base portion 344 at each stator tab, a sectional area as large as possible should be assured over the base portion 344. However, if the base portion 344 is widened on both sides, the gap between the adjacent rotor tabs becomes too narrow to allow a permanent magnet 292 to be inserted therein with ease in any of the structures achieved in the second through fourth embodiments.

Accordingly, an ample area through which the magnetic flux is allowed to travel with ease is created by simply widening the area of the base portion 344 of the rotor tab only on the side where the magnetic flux travels in a significant quantity, i.e., only on the side located along the opposite direction from the direction in which the rotor 302 rotates. By setting a greater width along the circumferential direction, only on one side along the circumferential direction as described above, the permanent magnet 292 can be installed with ease from the side along the axial direction on which the base portion 344 is not widened, as shown in FIG. 63A. It is to be noted that the technical concept of assuming a greater width in the base portion along the circumferential direction only on one side along the opposite direction from the direction in which the rotor 302 rotates can also be adopted in a rotor 302 such as that shown in FIG. 63B with rotor tabs thereof formed with a substantially uniform width along the axial direction. This structure, too, allows easy installation of the permanent magnets 292 while assuring an ample sectional area through which the magnetic flux can travel with ease.

Furthermore, it is desirable to form a bevel 348 at the two edges of each rotor tab along the circumferential direction. FIGS. 64A and 64B show rotor tabs with bevel 348 formed therein. As these figures clearly indicate, the width Bi of the bevel located on the side along the direction opposite from the direction in which the rotor 302 rotates, i.e., on the side where the base portion 344 assumes a greater width, is set greater than the width Bd of the bevel located on the side located along the direction in which the rotor 302 rotates. Furthermore, the bevel angle $\theta 1$ on the side opposite from the direction in which the rotor 302 rotates is set smaller than the bevel angle $\theta 2$ assumed on the side along the direction in which the rotor 302 rotates, as shown in FIG. 64C. It is to be noted that the ratio Bd/Bo with Bo representing the width of the rotor tabs measured along the circumferential direction should be set within a range of 0.03~0.3 and that the ratio Bi/Bo be set within a range of 0.2~0.55. In addition, it is desirable to set the bevel angle $\theta 1$ within a range of 6°~25°, whereas the bevel angle $\theta 2$ should be set in a range of 6°~45°.

The presence of these bevels 348 assures a smoother magnetic fluctuation to manifest between the stator tabs, which, in turn, allows the level of magnetic noise to be reduced. It is to be noted that since the bevel width on the side opposite from the direction along which the rotor 302 rotates is increased in the embodiment, the magnetic noise can be reduced by averaging the magnetic flux density distribution at the rotor tab surfaces and thus disallowing any reduction in the output attributable to the magnetic flux loss. In addition, while displacement of the permanent magnets 292 along the radial direction is disallowed via tab collars 56 ranging on the sides of the rotor tabs at their edges along the circumferential direction, these tab collars 56 should assume a width of 0.8~4 mm along the circumferential direction in order to assure optimal balance assuring a lowered strength of leakage flux through the rotor tabs and maximized strength. In addition, the thickness is measured along the radial direction should be set within a range of 0.8~3 mm in order to assure a satisfactory level of mechanical strength.

Forty-Second Embodiment

Figure 66A:
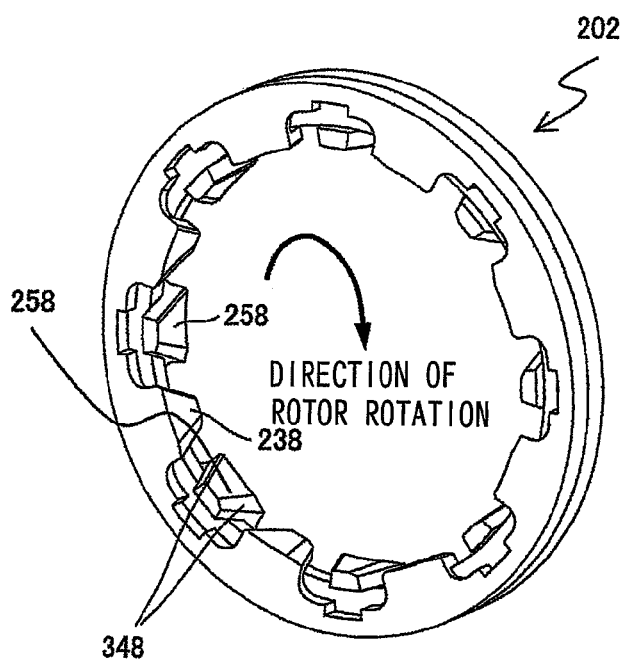
FIGS. 66A to 66C show a stator achieved in a forty-second embodiment.
Figure 66B:
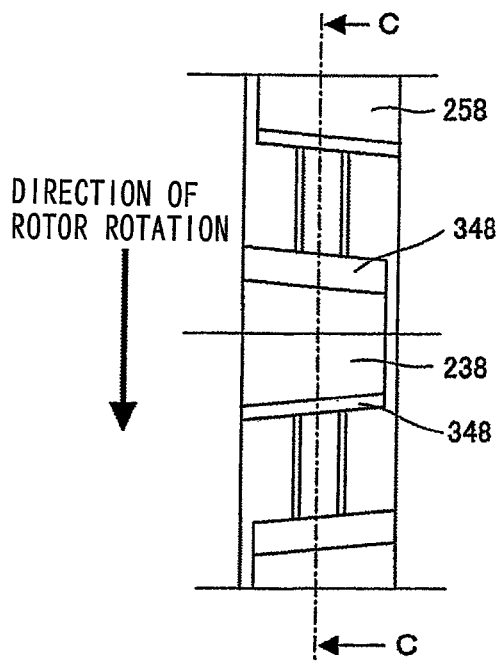
Figure 66C:
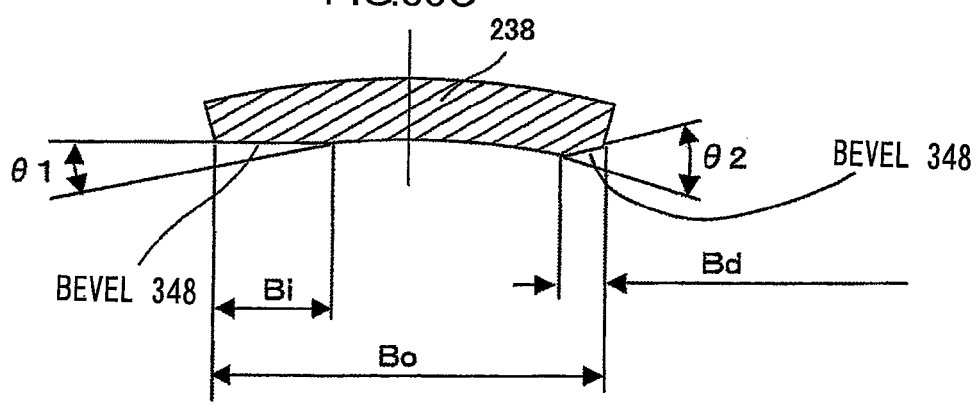

In reference to FIGS. 66A to 66C, the forty-second embodiment of the present invention is described. FIG. 66A is a perspective of a phase stator corresponding to a specific phase achieved in the forty-second embodiment. FIG. 66B is a side elevation of the phase stator achieved in the forty-second embodiment, viewed from the inner circumferential side. FIG. 66C is a sectional view of one of the stator tab magnetic poles achieved in the forty-second embodiment, taken through the front surface thereof. It is to be noted that the same terms and reference numerals are assigned to structural elements identical to those in the other embodiments. Bevels 348 are formed at each of the stator tabs 238 and 258 in the forty-second embodiment. As in the bevels at the rotor tabs described earlier, the bevels 348 are formed so as to achieve a greater bevel width Bi on the side opposite from the direction along which the rotor 302 rotates than the bevel width Bd assumed on the side along the direction in which the rotor 302 rotates. Furthermore, the bevel angle θ1 on the side opposite from the direction in which the rotor 302 rotates is set smaller than the bevel angle θ2 assumed on the side along the direction in which the rotor 302 rotates, as shown in FIG. 66C. It is to be noted that the ratio Bd/Bo with Bo representing the width of the stator tabs 238 and 258 measured along the circumferential direction should be set within a range of 0.03~0.3 and that the ratio Bi/Bo be set within a range of 0.2~0.55. In addition, it is desirable to set the bevel angle θ1 within a range of 6°~25°, whereas the bevel angle θ2 should be set in a range of 6°~45°.

The presence of these bevels 348 assures a smoother magnetic fluctuation to manifest between the stator tabs and the rotor tabs, which, in turn, allows the level of magnetic noise to be reduced. It is to be noted that since the bevel width on the side opposite from the direction along which the rotor 302 rotates is increased in the embodiment, the magnetic noise can be reduced by averaging the magnetic flux density distribution at the stator tabs 238 and 258 and thus disallowing any reduction in the output attributable to the magnetic flux loss.

Figure 67:
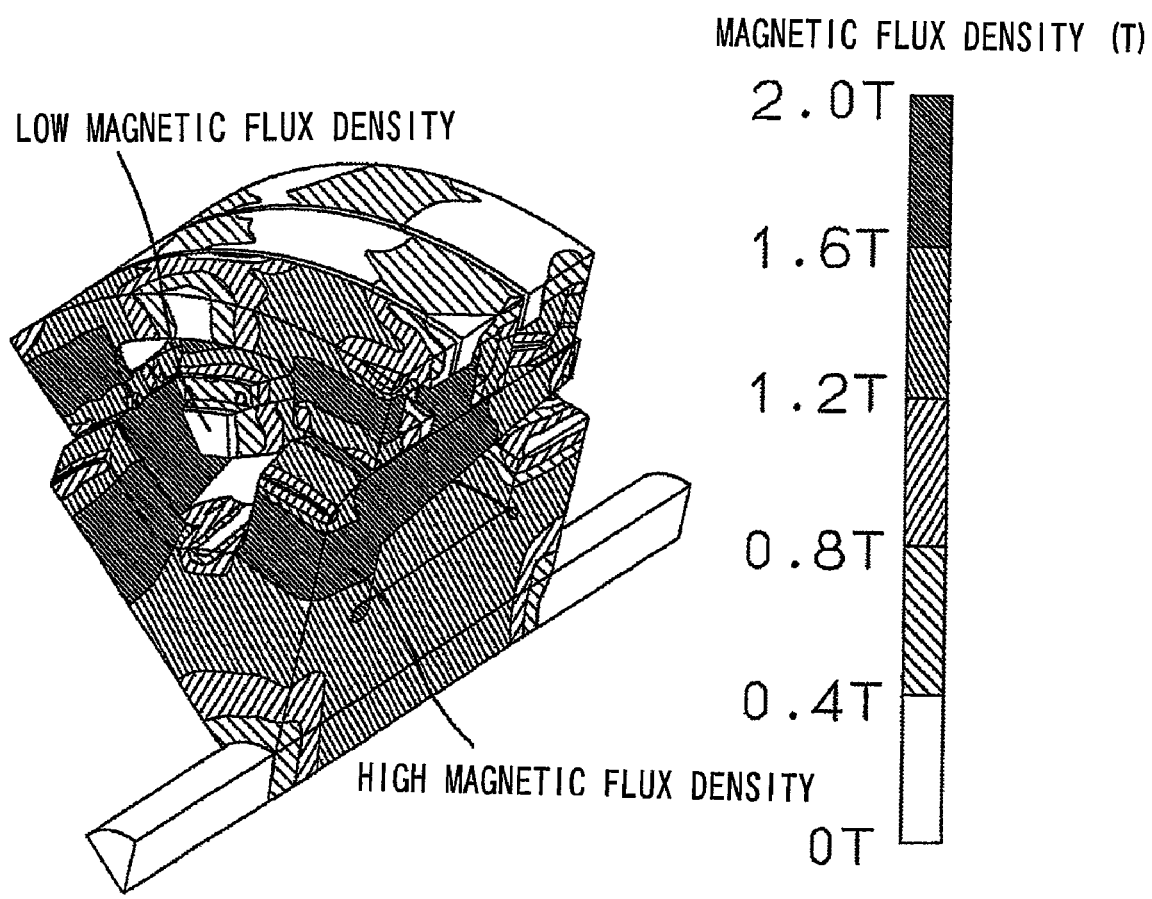
FIG. 67 shows the magnetic flux density distribution that may manifest in an on-vehicle Alternator.

It is to be noted that the front ends of the rotor tabs do not extend beyond a halfway point of the phase stator positioned over the greatest distance along the rotational axis in the embodiments described above. The reasoning for this particular positioning arrangement is as follows. As the magnetic flux density distribution with regard to an alternator rotor presented in FIG. 67 indicates, the magnetic flux density tends to be extremely low at the tab front ends. In other words, the tab front ends do not contribute to the alternator function of the rotor and, accordingly, it can be assumed that the output characteristics will not be affected one way or another regardless of where the front ends with the low magnetic flux density are positioned, since the magnetic flux generated at the rotor will have been absorbed at the stator side before it reaches the stator front ends. The rotation speed is bound to change over a wide range, from a low rotation speed through a high rotation speed. A high level of centrifugal force is applied to the rotor tab front ends during high-speed rotation, which gives rise to a concern that the tab front ends will become displaced further toward the stator. Under such circumstances, the clearance between the stator and the rotor cannot be reduced. These issues can be effectively addressed by setting the front ends of the tabs at the halfway point of the phase stators, as described above.

What is claimed is:

1. An alternator for vehicle, comprising:
   a stator that outputs a U-phase voltage, a V-phase voltage and a W-phase voltage;
   a rotor rotatably mounted further inward relative to the stator, that comprises a field coil and a rotor core; and
   a field current control circuit that controls a field current flowing through the field coil, wherein:
   the stator comprises a U-phase stator that outputs the U-phase voltage, a V-phase stator that outputs the V-phase voltage and a W-phase stator that outputs the W-phase voltage, with the U-phase stator, the V-phase stator and the W-phase stator disposed along a rotational axis of the rotor;
   the U-phase stator, the V-phase stator and the W-phase stator each comprise a phase stator coil wound along a circumferential direction and a phase stator core that forms a magnetic circuit on two outer sides of the phase stator coil along the axial direction and also on an outer circumferential side of the phase stator coil and comprises an even number of stator tabs disposed along the circumferential direction so as to alternately extend from one outer side along the rotational axis toward another outer side and extend from the other outer side toward the one outer side along the rotational axis;
   the rotor core forms a magnetic circuit on an inner side along a radius of the rotor winding and also on two outer sides of the rotor winding along the rotational axis and comprises an even number of rotor tabs disposed along the circumferential direction so as to alternately extend from one outer side toward another outer side along the rotational axis and extend from the other outer side toward the one outer side along the rotational axis;
   the rotor tabs each comprise a surface facing opposite the stator tabs at the U-phase stator, the V-phase stator and the W-phase stator, disposed along the rotational axis;
   the phase stator cores at the U-phase stator, the V-phase stator and the W-phase stator are each formed by laminating a plurality of sheets constituted of a magnetic material, wherein the stator tabs are formed by bending the laminated magnetic sheets so that the magnetic sheets in the stator tabs are layered one on top of another along a radial direction, and wherein each phase stator core is integrally formed to enclose an entire circumference of the phase stator coil;
   an outer circumferential portion of each phase stator core is formed by bending the magnetic sheets so that the magnetic sheets are layered one on top of another along the radial direction in the outer circumferential portion;
   a front end of each stator tab is narrower than a base portion of each stator tab;
   a clearance is formed or a nonmagnetic material is disposed between the phase stator core of each of the U-phase stator, the V-phase stator and the W-phase stator and the phase stator core belonging to an adjacent phase stator; and
   a rotor side surface of each stator tab is formed by layering the magnetic sheets one on top of another in the radial direction and said rotor side surface faces the rotor.

2. An alternator for vehicle, comprising:

a stator that outputs three-phase alternating currents;

a rotor rotatably mounted further inward relative to the stator, that comprises a field coil and a rotor core; and a field current control circuit that controls a field current flowing through the field coil, wherein:

the stator comprises three phase stators, each of which outputs one of the three-phase alternating currents, disposed along a rotational axis of the rotor;

the phase stators each comprise a phase stator coil wound along a circumferential direction and a phase stator core that comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion;

the rotor core is constituted with one rotor core disposed on one outer side of the rotor winding along the rotational axis and another rotor core disposed on another outer side of the rotor winding along the rotational axis;

the one rotor core comprises rotor tabs extending toward the other rotor core and the other rotor core comprises other rotor tabs extending toward the one rotor core;

the rotor tabs at the one rotor core and the rotor tabs at the other rotor core are alternately disposed along the circumferential direction and a sum of a number of rotor tabs at the one rotor core and a number of rotor tabs at the other rotor core matches a number of stator tabs at each of the phase stator cores;

the rotor tabs each comprise a surface facing opposite the stator tabs at the three phase stators disposed along the rotational axis;

the phase stator core at each of the phase stators is formed by laminating one on top of another a plurality of sheets constituted of a magnetic material, wherein the stator tabs are formed by bending the laminated magnetic sheets so that the magnetic sheets in the stator tabs are layered one on top of another along a radial direction, and wherein the phase stator core is integrally formed to enclose an entire circumference of the phase stator coil;

an outer circumferential portion of each phase stator core is formed by bending the magnetic sheets so that the magnetic sheets are layered one on top of another along the radial direction in the outer circumferential portion;

a front end of each stator tab is narrower than a base portion of each stator tab;

a clearance is formed or a nonmagnetic member is disposed between the phase stator core of each of the phase stators and the phase stator core belonging to an adjacent phase stator; and a rotor side surface of each stator tab is formed by layering the magnetic sheets one on top of another in the radial direction and said rotor side surface faces the rotor.

3. An alternator for vehicle, comprising:

a stator that outputs three-phase alternating currents;

a rotor rotatably mounted further inward relative to the stator, that comprises a field coil and a rotor core; and a field current control circuit that controls a field current flowing through the field coil, wherein:

the stator comprises three phase stators, each of which outputs one of the three-phase alternating currents, disposed along a rotational axis of the rotor;

the phase stators each comprise a phase stator coil wound along a circumferential direction and a phase stator core that comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion;

a stator recess is formed between adjacent stator tabs set next to each other at the one phase stator core side portion and the other phase stator core side portion, a stator tab extending from the other phase stator core side portion is set at a position at which the stator recess is formed at the one phase stator core side portion along the circumferential direction and a stator tab extending from the one phase stator core side portion is set at a position at which the stator recess is formed at the other phase stator core side portion along the circumferential direction;

the rotor core comprises one rotor core disposed on one outer side of the rotor winding along the rotational axis and another rotor core disposed on another outer side of the rotor winding along the rotational axis;

the one rotor core comprises rotor tabs extending toward the other rotor core and the other rotor core comprises other rotor tabs extending toward the one rotor core;

the rotor tabs at the one rotor core and the rotor tabs at the other rotor core are alternately disposed along the circumferential direction and a sum of a number of rotor tabs at the one rotor core and a number of rotor tabs at the other rotor core matches a number of stator tabs at each of the phase stator core;

one recess is formed between rotor tabs formed next to each other at the one rotor core, another recess is formed between other rotor tabs formed next to each other at the other rotor core, the other rotor tabs are each set at a position at which the one recess at the one rotor core is formed along the circumferential direction and the rotor tabs at the one rotor core are each set at a position at which the other recess is formed along the circumferential direction;

the rotor tabs each comprise a surface facing opposite the stator tabs at the three phase stators disposed along the rotational axis;

the phase stator core at each of the phase stators is formed by laminating a plurality of sheets constituted of a magnetic material, wherein the stator tabs are formed by bending the laminated magnetic sheets so that the magnetic sheets in the stator tabs are layered one on top of another along a radial direction, and wherein the phase stator core is integrally formed to enclose an entire circumference of the phase stator coil;

an outer circumferential portion of each phase stator core is formed by bending the magnetic sheets so that the magnetic sheets are layered one on top of another along the radial direction in the outer circumferential portion;

a front end of each stator tab is narrower than a base portion of each stator tab; and a rotor side surface of each stator tab is formed by layering the magnetic sheets one on top of another in the radial direction and said rotor side surface faces the rotor.

4. An alternator for vehicle according to claim 1, wherein:

the three phase stators are disposed from one side toward another side along the rotational axis;

front ends of the rotor tabs extending from the one side toward the other side do not extend beyond a point substantially halfway through the stator tabs at the phase stator disposed on the other side among the three phase stator stators disposed along the rotational axis; and front ends of the rotor tabs extending from the other side toward the one side do not extend beyond a point substantially halfway through the stator tabs of the phase stator disposed on the one side among the three phase stators disposed along the rotational axis.

5. An alternator for vehicle according to claim 1, wherein: the laminated sheets to form the stator tabs are fixed onto one another.

6. An alternator for vehicle according to claim 1, wherein: the laminated sheets to form the stator tabs are fixed onto one another through welding.

7. A rotating electrical machine, comprising:

a stator; and a rotor rotatably mounted further inside relative to the stator, wherein:

the stator comprises a U-phase stator that outputs a U-phase alternating current, a V-phase stator that outputs a V-phase alternating current and a W-phase stator that outputs a W-phase alternating current, disposed along a rotational axis of the rotor;

the phase stators each comprise a phase stator coil wound along a circumferential direction and a phase stator core constituted with laminated magnetic sheets;

the phase stator core constituted with the laminated magnetic sheets comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion;

the phase stators each comprise a phase stator coil wound along the circumferential direction and a phase stator core that comprises one phase stator core side portion and another phase stator core side portion located on two outer sides of the phase stator coil along the rotational axis, a phase stator core outer circumferential portion located on an outer circumferential side of the phase stator coil and an even number of stator tabs disposed along the circumferential direction so as to alternately extend from the one phase stator core side portion toward the other phase stator core side portion and extend from the other phase stator core side portion toward the one phase stator core side portion;

a stator recess is formed between adjacent stator tabs set next to each other at the one phase stator core side portion and the other phase stator core side portion, a stator tab extending from the other phase stator core side portion is set at a position at which the stator recess is formed at the one phase stator core side portion along the circumferential direction and a stator tab extending from the one phase stator core side portion is set at a position at which the stator recess is formed at the other phase stator core side portion along the circumferential direction;

the rotor comprises a field coil that generates a magnetic flux to interlink with the phase stator coil at each of the U-phase stator, the V-phase stator and the W-phase stator, one rotor core disposed on one outer side of the rotor winding along the rotational axis and another rotor core disposed on another outer side of the rotor winding along the rotational axis;

the one rotor core comprises rotor tabs extending toward the other rotor core and the other rotor core comprises other rotor tabs extending toward the one rotor core;

the rotor tabs at the one rotor core and the rotor tabs at the other rotor core are alternately disposed along the circumferential direction and a sum of a number of rotor tabs at the one rotor core and a number of rotor tabs at the other rotor core matches a number of stator tabs at each phase stator core;

the rotor tabs each comprise a surface facing opposite the stator tabs at the U-phase stator, the V-phase stator and the W-phase stator disposed along the rotational axis; and a nonmagnetic material is disposed between the phase stator core at each phase stator and the phase stator core belonging to an adjacent phase stator;

the stator tabs of the phase stator core are formed by bending the laminated magnetic sheets so that the magnetic sheets in the stator tabs are layered one on top of another along a radial direction, and the phase stator core is integrally formed to enclose an entire circumference of the phase stator coil;

an outer circumferential portion of each phase stator core is formed by bending the magnetic sheets so that the magnetic sheets are layered one on top of another along the radial direction in the outer circumferential portion;

a front end of each stator tab is narrower than a base portion of each stator tab; and a rotor side surface of each stator tab is formed by layering the magnetic sheets one on top of another in the radial direction and said rotor side surface faces the rotor.

8. An alternator for vehicle according to claim 1, wherein: an even number of stator tabs within a range of 12 to 24 are formed at each phase stator.

9. An alternator for vehicle according to claim 1, wherein a skew angle of each of the stator tabs is set within a range greater than 0 degrees and smaller than 38 degrees in mechanical angle.

10. An alternator for vehicle according to claim 2, wherein a skew angle of each of the stator tabs is set within a range greater than 0 degrees and smaller than 38 degrees in mechanical angle.

11. An alternator for vehicle according to claim 3, wherein a skew angle of each of the stator tabs is set within a range greater than 0 degrees and smaller than 38 degrees in mechanical angle.

12. A rotating electrical machine according to claim 7, wherein a skew angle of each of the stator tabs is set within a range greater than 0 degrees and smaller than 38 degrees in mechanical angle.

13. An alternator for vehicle according to claim 1, wherein the rotor side surface is shaped in an arc.

14. An alternator for vehicle according to claim 2, wherein the rotor side surface is shaped in an arc.

15. An alternator for vehicle according to claim 3, wherein the rotor side surface is shaped in an arc.

16. A rotating electrical machine according to claim 7, wherein the rotor side surface is shaped in an arc.

* * * * *